US012657826B2

(12) United States Patent
Milbert

(10) Patent No.: US 12,657,826 B2
(45) Date of Patent: Jun. 16, 2026

(54) WALL, WINDOW, AND DOOR REPORT GENERATION

(71) Applicant: Primitive LLC, Edina, MN (US)

(72) Inventor: Randy Milbert, Edina, MN (US)

(73) Assignee: Primitive LLC, Edina, MN (US)

( * ) Notice: Subject to any disclaimer, the term of this patent is extended or adjusted under 35 U.S.C. 154(b) by 197 days.

(21) Appl. No.: 18/755,081

(22) Filed: Jun. 26, 2024

(65) Prior Publication Data

US 2025/0005862 A1 Jan. 2, 2025

Related U.S. Application Data

(60) Provisional application No. 63/510,772, filed on Jun. 28, 2023.

(51) Int. Cl.
G06T 17/20 (2006.01)

(52) U.S. Cl.
CPC .................................... G06T 17/20 (2013.01)

(58) Field of Classification Search
CPC ...................................................... G06T 17/20
USPC ......................................................... 345/420
See application file for complete search history.

(56) References Cited

U.S. PATENT DOCUMENTS

| | | | | |
|---|---|---|---|---|
| 8,078,436 B2 * | 12/2011 | Pershing | ................. | G06T 7/337 |
| | | | | 703/2 |
| 8,145,578 B2 * | 3/2012 | Pershing | ................. | G06Q 50/16 |
| 8,170,840 B2 | 5/2012 | Pershing | | |

| | | | |
|---|---|---|---|
| 8,209,152 B2 | 6/2012 | Pershing | |
| 8,422,825 B1 | 4/2013 | Neophytou et al. | |
| 8,649,632 B2 | 2/2014 | Neophytou et al. | |
| 8,731,234 B1 | 5/2014 | Ciarcia et al. | |
| 8,818,770 B2 | 8/2014 | Pershing | |
| 8,825,454 B2 | 9/2014 | Pershing | |
| 8,878,865 B2 | 11/2014 | Altman et al. | |
| 8,995,757 B1 | 3/2015 | Ciarcia et al. | |
| 9,070,018 B1 | 6/2015 | Ciarcia et al. | |
| 9,129,376 B2 | 9/2015 | Pershing | |

(Continued)

OTHER PUBLICATIONS

"Agisoft Metashape", [Online]. Retrieved from the Internet: The Wayback Machine—https: web.archive.org web 20230702002617 https: www.agisoft.com , (Captured Jul. 2, 2023), 3 pages.

(Continued)

*Primary Examiner* — David T Welch
(74) *Attorney, Agent, or Firm* — Schwegman Lundberg & Woessner, P.A.

(57) ABSTRACT

A computer-implemented method for generating wall, window, and door reports. In one embodiment, an application may present a 3D mesh of a structure to an analyst. The application may also display 2D images of the structure for reference. The application may overlay a roof model on the 3D structure mesh. The analyst may begin by using a ground tool and then clicking a location on the 3D mesh. The application may then drop walls down from at or near the roof's outer edges to lower roof facets or to the clicked mesh elevation. The analyst may then use move, delete, and wall tools to adjust the walls. The analyst may then use window, door, and hole tools to draw openings. When the analyst finishes, the application may generate a report. The report may include multiple structure renderings with wall, window, and door labels plus length, perimeter, and area measurements.

16 Claims, 57 Drawing Sheets

(56) References Cited

U.S. PATENT DOCUMENTS

| | | | |
|---|---|---|---|
| 9,135,737 | B2 | 9/2015 | Pershing |
| 9,147,287 | B2 | 9/2015 | Ciarcia |
| 9,430,871 | B2 | 8/2016 | Neophytou et al. |
| 9,437,033 | B2 | 9/2016 | Sun et al. |
| 9,437,044 | B2 | 9/2016 | Ege et al. |
| 9,478,031 | B2 | 10/2016 | Bhatawadekar et al. |
| 9,542,417 | B2 | 1/2017 | Hieronymus et al. |
| 9,599,466 | B2 | 3/2017 | Pershing |
| 9,830,742 | B2 | 11/2017 | Bhatawadekar et al. |
| 9,836,881 | B2 | 12/2017 | Altman et al. |
| 9,934,608 | B2 | 4/2018 | Castillo et al. |
| 9,953,370 | B2 | 4/2018 | Pershing et al. |
| 9,953,459 | B2 | 4/2018 | Pavlidis et al. |
| 9,959,581 | B2 | 5/2018 | Pershing |
| 10,038,838 | B2 | 7/2018 | Castillo et al. |
| 10,127,721 | B2 | 11/2018 | Upendran et al. |
| 10,178,303 | B2 | 1/2019 | Castillo et al. |
| 10,297,007 | B2 | 5/2019 | Upendran et al. |
| 10,410,412 | B2 | 9/2019 | Upendran et al. |
| 10,453,177 | B2 | 10/2019 | Upendran et al. |
| 10,475,156 | B2 | 11/2019 | Upendran et al. |
| 10,503,843 | B2 | 12/2019 | Keane |
| 10,515,414 | B2 | 12/2019 | Pershing |
| 10,515,434 | B2 | 12/2019 | Upendran et al. |
| 10,643,380 | B2 | 5/2020 | Sun et al. |
| 10,657,714 | B2 | 5/2020 | Upendran et al. |
| 10,663,294 | B2 | 5/2020 | Pershing et al. |
| 10,681,264 | B2 | 6/2020 | Castillo et al. |
| 10,685,149 | B2 | 6/2020 | Pershing |
| 10,713,842 | B2 | 7/2020 | Upendran et al. |
| 10,769,847 | B2 | 9/2020 | Sun et al. |
| 10,776,999 | B2 | 9/2020 | Sun et al. |
| 10,803,658 | B2 | 10/2020 | Upendran et al. |
| 10,839,469 | B2 | 11/2020 | Pershing |
| 10,861,224 | B2 | 12/2020 | Halliday et al. |
| 10,861,247 | B2 | 12/2020 | Milbert et al. |
| 10,867,437 | B2 | 12/2020 | Pavlidis et al. |
| 10,902,672 | B2 | 1/2021 | Halliday et al. |
| 10,970,869 | B2 | 4/2021 | Mishra et al. |
| 10,977,862 | B2 | 4/2021 | Upendran et al. |
| 10,991,158 | B2 | 4/2021 | Castillo et al. |
| 11,004,259 | B2 | 5/2021 | Hu et al. |
| 11,017,612 | B2 | 5/2021 | Upendran et al. |
| 11,030,355 | B2 | 6/2021 | Pershing |
| 11,030,358 | B2 | 6/2021 | Pershing |
| 11,030,823 | B2 | 6/2021 | Upendran et al. |
| 11,070,720 | B2 | 7/2021 | Castillo et al. |
| 11,100,704 | B2 | 8/2021 | Mishra et al. |
| 11,113,877 | B2 | 9/2021 | Sun et al. |
| 11,276,229 | B2 | 3/2022 | Halliday et al. |
| 11,380,078 | B2 | 7/2022 | Upendran et al. |
| 11,392,728 | B2* | 7/2022 | Porter ..................... G06F 30/17 |
| 11,416,644 | B2 | 8/2022 | Keane |
| 11,423,614 | B2 | 8/2022 | Pershing et al. |
| 11,468,104 | B2 | 10/2022 | Barrow et al. |
| 11,526,952 | B2 | 12/2022 | Pershing |
| 11,538,219 | B2 | 12/2022 | Upendran et al. |
| 11,551,413 | B2 | 1/2023 | Sehgal et al. |
| 11,566,891 | B2 | 1/2023 | Pershing et al. |
| 11,574,439 | B2 | 2/2023 | Sun et al. |
| 11,574,440 | B2 | 2/2023 | Castillo et al. |
| 11,574,441 | B2 | 2/2023 | Sun et al. |
| 11,574,442 | B2 | 2/2023 | Sun et al. |
| 11,620,714 | B2 | 4/2023 | Pershing |
| 11,663,776 | B2 | 5/2023 | Mishra et al. |
| 11,670,046 | B2 | 6/2023 | Halliday et al. |
| 11,676,243 | B2 | 6/2023 | Upendran et al. |
| 2011/0187713 | A1* | 8/2011 | Pershing ................. G06T 19/20<br>345/420 |
| 2013/0194263 | A1* | 8/2013 | Sakurai ................... G06T 17/20<br>345/420 |
| 2013/0202157 | A1 | 8/2013 | Pershing |
| 2013/0204575 | A1 | 8/2013 | Pershing |
| 2013/0226515 | A1 | 8/2013 | Pershing et al. |
| 2013/0346020 | A1 | 12/2013 | Pershing |
| 2014/0125655 | A1* | 5/2014 | Kunath .............. G01C 21/3878<br>345/419 |
| 2014/0212028 | A1 | 7/2014 | Ciarcia |
| 2014/0320485 | A1 | 10/2014 | Neophytou et al. |
| 2014/0320488 | A1 | 10/2014 | Ege |
| 2015/0187130 | A1* | 7/2015 | Guskov ................... G06T 17/20<br>345/643 |
| 2015/0370928 | A1 | 12/2015 | Pershing |
| 2015/0370929 | A1 | 12/2015 | Pershing |
| 2016/0371882 | A1 | 12/2016 | Ege et al. |
| 2017/0083546 | A1 | 3/2017 | Hieronymus et al. |
| 2017/0084077 | A1* | 3/2017 | Liu ......................... G06T 15/04 |
| 2017/0116707 | A1 | 4/2017 | Upendran et al. |
| 2017/0235018 | A1 | 8/2017 | Foster et al. |
| 2017/0242873 | A1 | 8/2017 | Barrow et al. |
| 2018/0025541 | A1* | 1/2018 | Xie ......................... G06T 17/20<br>345/420 |
| 2018/0225870 | A1 | 8/2018 | Upendran et al. |
| 2019/0066322 | A1 | 2/2019 | Mishra et al. |
| 2019/0080200 | A1 | 3/2019 | Mishra et al. |
| 2019/0156570 | A1 | 5/2019 | Sanjurjo et al. |
| 2020/0159252 | A1 | 5/2020 | Giuffrida et al. |
| 2020/0193701 | A1* | 6/2020 | Ely .................... G06V 10/7515 |
| 2020/0202617 | A1* | 6/2020 | Lachinski ............ H04N 13/204 |
| 2020/0320783 | A1* | 10/2020 | Hopper ................... G06T 17/20 |
| 2020/0334901 | A1 | 10/2020 | Upendran et al. |
| 2021/0065444 | A1 | 3/2021 | Pavlidis et al. |
| 2021/0109987 | A1 | 4/2021 | Avila et al. |
| 2021/0142577 | A1 | 5/2021 | Thomas et al. |
| 2021/0174580 | A1* | 6/2021 | Mundy .................. G06T 15/06 |
| 2021/0201524 | A1 | 7/2021 | Mishra et al. |
| 2021/0201579 | A1 | 7/2021 | Upendran et al. |
| 2021/0217231 | A1 | 7/2021 | Hu et al. |
| 2021/0314484 | A1 | 10/2021 | Castillo et al. |
| 2021/0366187 | A1 | 11/2021 | Sun et al. |
| 2022/0026929 | A1 | 1/2022 | Foster et al. |
| 2022/0284609 | A1 | 9/2022 | Shree et al. |
| 2022/0284617 | A1 | 9/2022 | Mishra et al. |
| 2022/0284618 | A1 | 9/2022 | Mishra et al. |
| 2022/0284668 | A1 | 9/2022 | Hu et al. |
| 2022/0327792 | A1 | 10/2022 | Upendran et al. |
| 2022/0374490 | A1 | 11/2022 | Avila et al. |
| 2023/0021025 | A1 | 1/2023 | Mishra et al. |
| 2023/0092286 | A1 | 3/2023 | Upendran et al. |
| 2023/0154107 | A1 | 5/2023 | Castillo et al. |
| 2023/0169724 | A1 | 6/2023 | Mishra et al. |
| 2023/0186413 | A1 | 6/2023 | Pershing |
| 2023/0186559 | A1 | 6/2023 | Hu et al. |
| 2023/0206555 | A1 | 6/2023 | Caamano et al. |
| 2023/0206557 | A1 | 6/2023 | Caamano et al. |
| 2023/0243649 | A1* | 8/2023 | Pershing ................ G06Q 10/04<br>382/199 |

OTHER PUBLICATIONS

"ITwin Capture Modeler Bentley Systems", [Online]. Retrieved from the Internet: https: web.archive.org web 20230907044103 https: www.bentley.com software itwin-capture-modeler , (Captured Sep. 7, 2023), 6 pages.

"Reality Capture API Autodesk Platform Services", [Online]. Retrieved from the Internet: http: web.archive.org web 20231002053142 https: aps.autodesk.com reality-capture-api, (Capture Oct. 2, 2023), 4 pages.

"Reality Capture Software Drone Deploy", [Online]. Retrieved from the Internet: https: web.archive.org web 20230629160246 https: www.dronedeploy.com , (Capture Jun. 29, 2023), 15 pages.

"Three Js", [Online]. Retrieved from the Internet: http: web.archive. org web 20230703163816 https: threejs.org , (Captured Jul. 3, 2023), 2 pages.

* cited by examiner

100

102

104

106

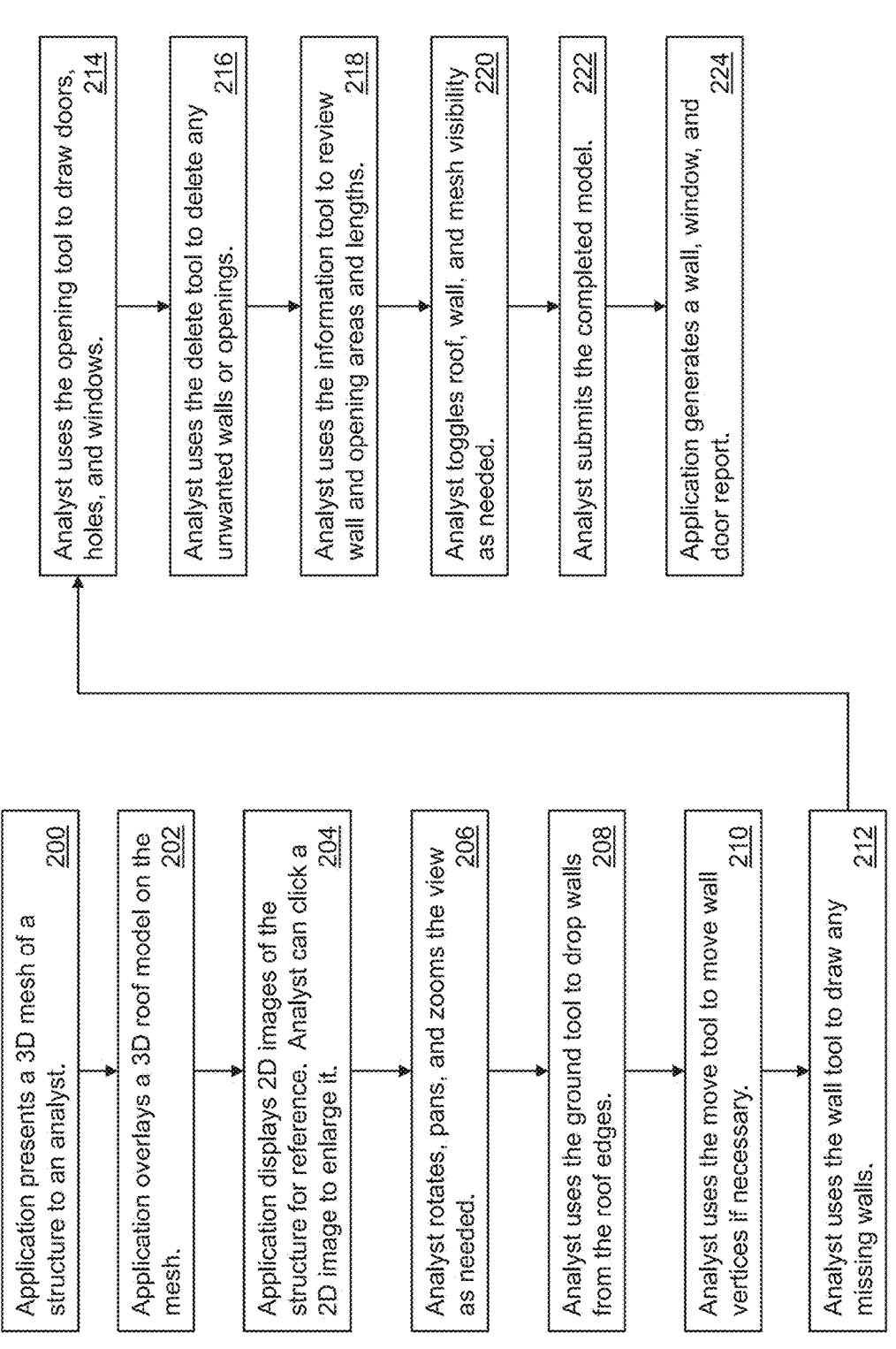

Application presents a 3D mesh of a structure to an analyst.                    200

Application overlays a 3D roof model on the mesh.                    202

Application displays 2D images of the structure for reference. Analyst can click a 2D image to enlarge it.                    204

Analyst rotates, pans, and zooms the view as needed.                    206

Analyst uses the ground tool to drop walls from the roof edges.                    208

Analyst uses the move tool to move wall vertices if necessary.                    210

Analyst uses the wall tool to draw any missing walls.                    212

Analyst uses the opening tool to draw doors, holes, and windows.                    214

Analyst uses the delete tool to delete any unwanted walls or openings.                    216

Analyst uses the information tool to review wall and opening areas and lengths.                    218

Analyst toggles roof, wall, and mesh visibility as needed.                    220

Analyst submits the completed model.                    222

Application generates a wall, window, and door report.                    224

FIG. 2

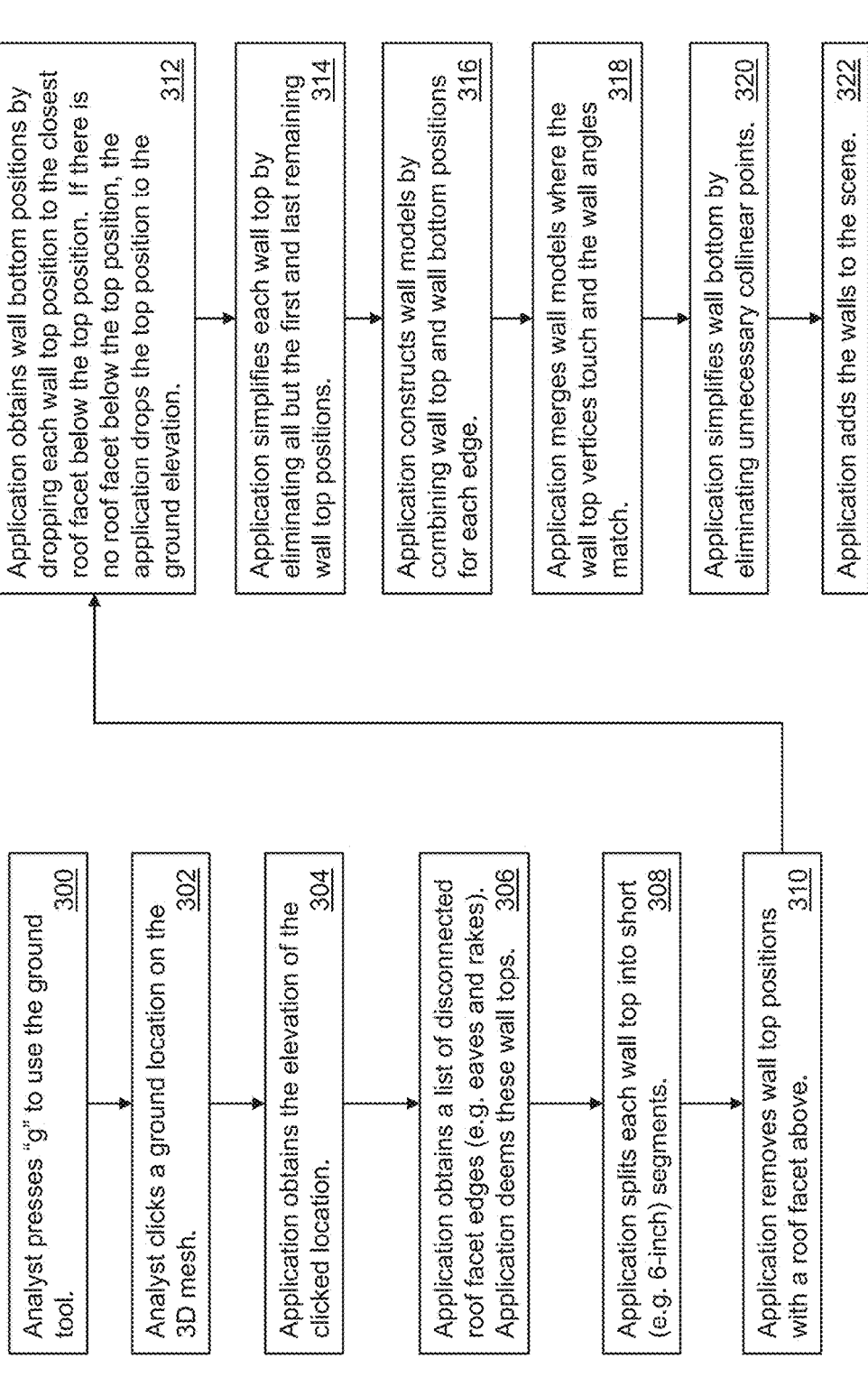

Analyst presses "g" to use the ground tool. 300

Analyst clicks a ground location on the 3D mesh. 302

Application obtains the elevation of the clicked location. 304

Application obtains a list of disconnected roof facet edges (e.g. eaves and rakes). Application deems these wall tops. 306

Application splits each wall top into short (e.g. 6-inch) segments. 308

Application removes wall top positions with a roof facet above. 310

Application obtains wall bottom positions by dropping each wall top position to the closest roof facet below the top position. If there is no roof facet below the top position, the application drops the top position to the ground elevation. 312

Application simplifies each wall top by eliminating all but the first and last remaining wall top positions. 314

Application constructs wall models by combining wall top and wall bottom positions for each edge. 316

Application merges wall models where the wall top vertices touch and the wall angles match. 318

Application simplifies wall bottom by eliminating unnecessary collinear points. 320

Application adds the walls to the scene. 322

FIG. 3

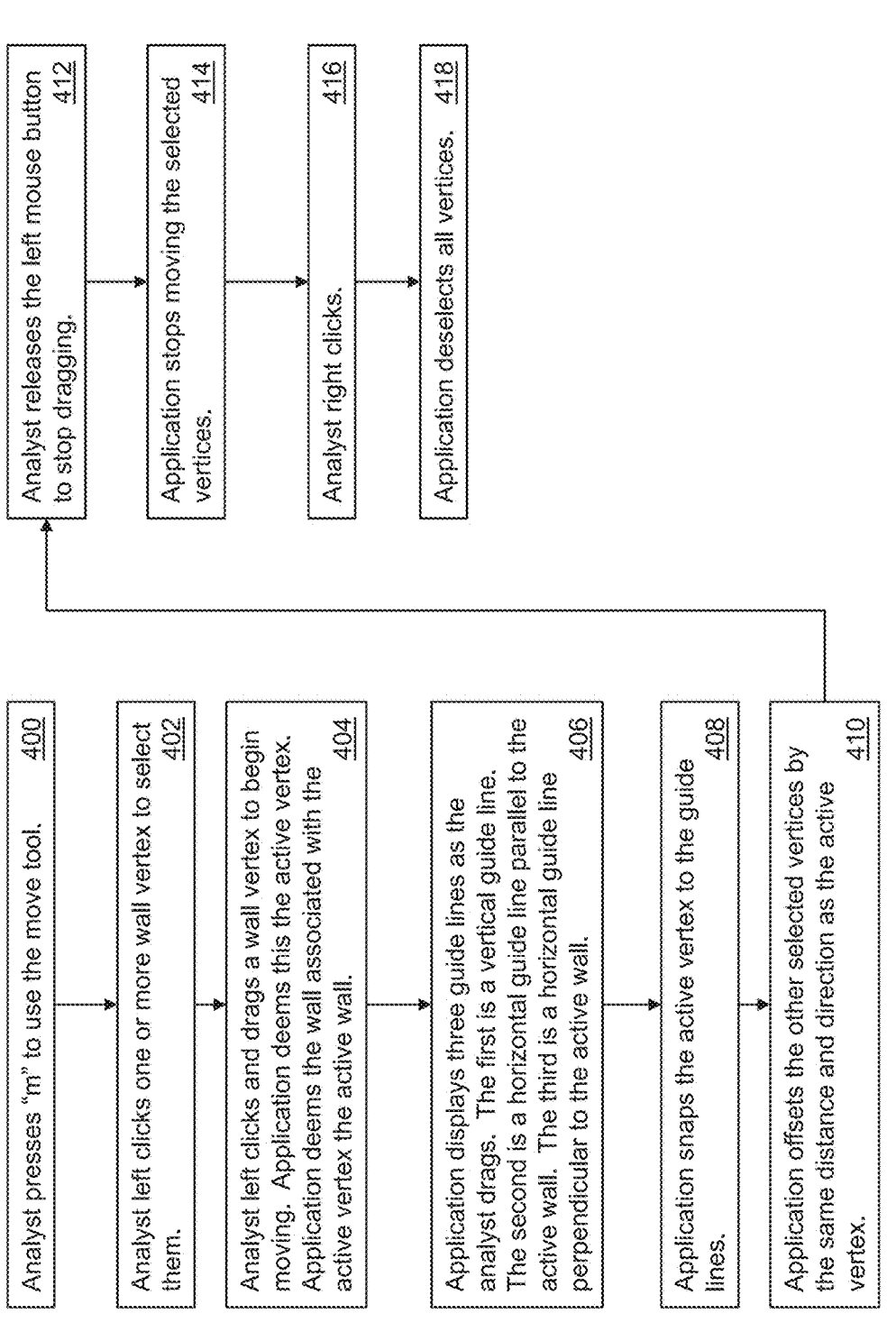

Analyst presses "m" to use the move tool.　400

Analyst left clicks one or more wall vertex to select them.　402

Analyst left clicks and drags a wall vertex to begin moving. Application deems this the active vertex. Application deems the wall associated with the active vertex the active wall.　404

Application displays three guide lines as the analyst drags. The first is a vertical guide line. The second is a horizontal guide line parallel to the active wall. The third is a horizontal guide line perpendicular to the active wall.　406

Application snaps the active vertex to the guide lines.　408

Application offsets the other selected vertices by the same distance and direction as the active vertex.　410

Analyst releases the left mouse button to stop dragging.　412

Application stops moving the selected vertices.　414

Analyst right clicks.　416

Application deselects all vertices.　418

FIG. 4

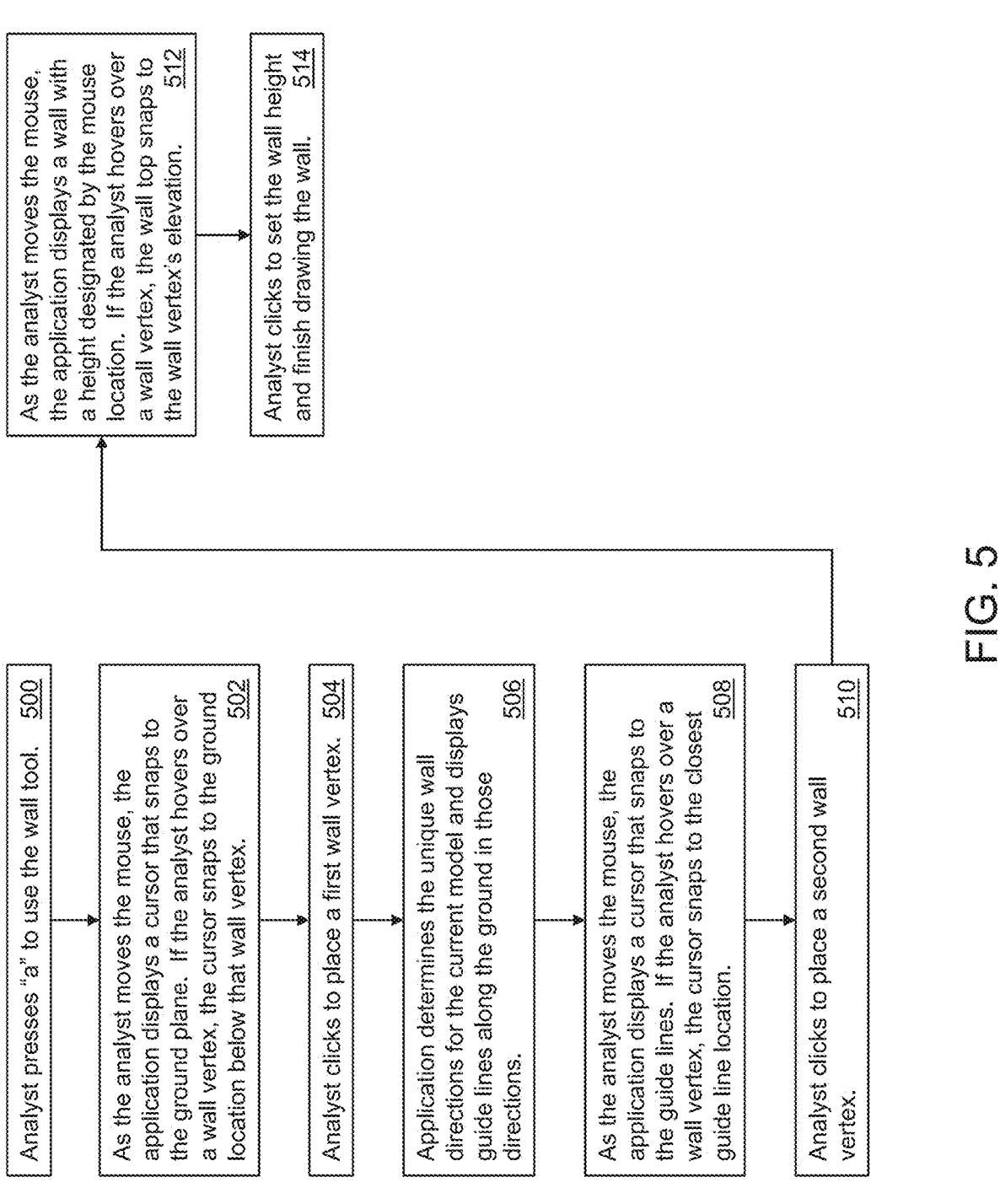

Analyst presses "a" to use the wall tool. 500

As the analyst moves the mouse, the application displays a cursor that snaps to the ground plane. If the analyst hovers over a wall vertex, the cursor snaps to the ground location below that wall vertex. 502

Analyst clicks to place a first wall vertex. 504

Application determines the unique wall directions for the current model and displays guide lines along the ground in those directions. 506

As the analyst moves the mouse, the application displays a cursor that snaps to the guide lines. If the analyst hovers over a wall vertex, the cursor snaps to the closest guide line location. 508

Analyst clicks to place a second wall vertex. 510

As the analyst moves the mouse, the application displays a wall with a height designated by the mouse location. If the analyst hovers over a wall vertex, the wall top snaps to the wall vertex's elevation. 512

Analyst clicks to set the wall height and finish drawing the wall. 514

FIG. 5

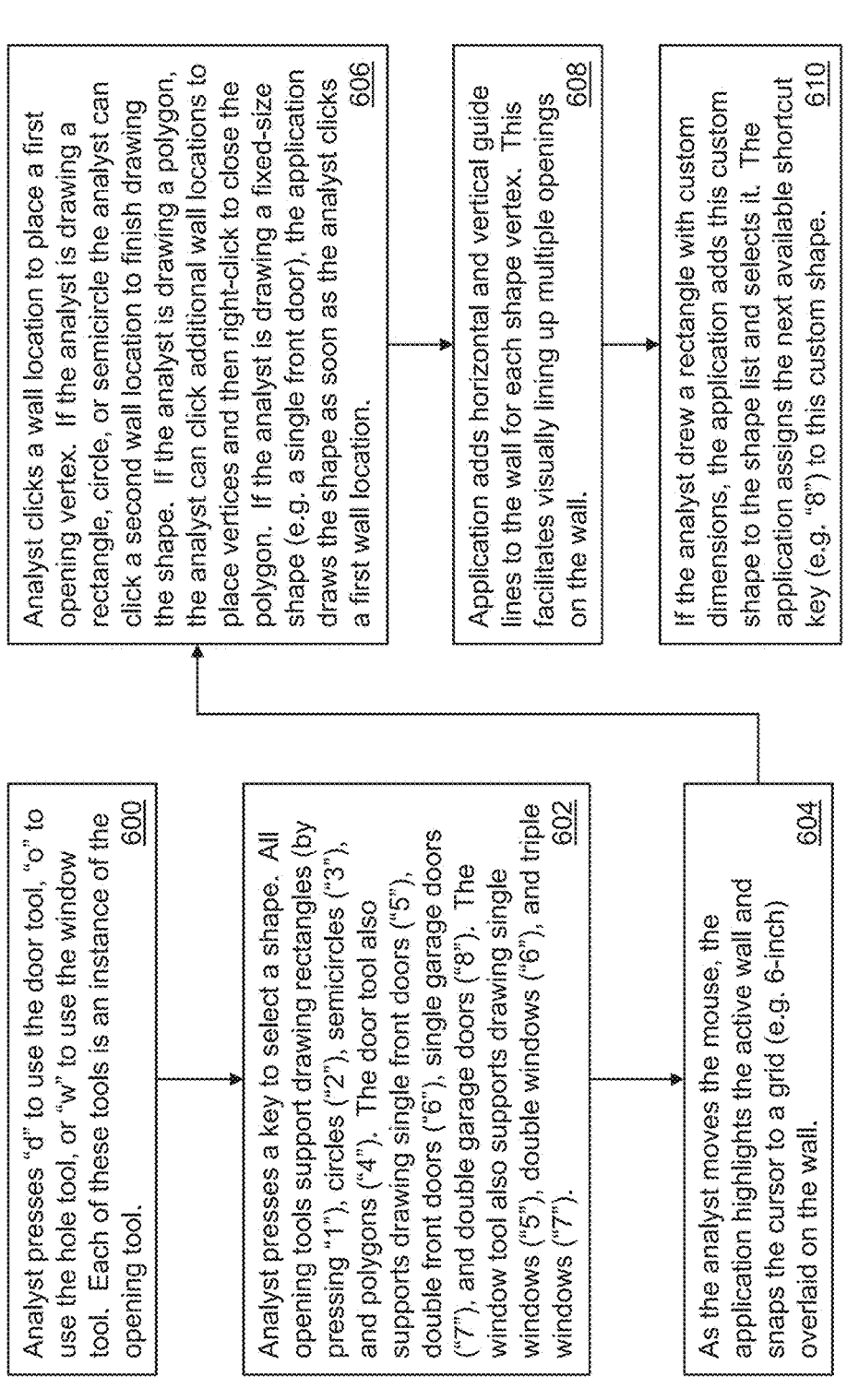

Analyst presses "d" to use the door tool, "o" to use the hole tool, or "w" to use the window tool. Each of these tools is an instance of the opening tool.    600

Analyst presses a key to select a shape. All opening tools support drawing rectangles (by pressing "1"), circles ("2"), semicircles ("3"), and polygons ("4"). The door tool also supports drawing single front doors ("5"), double front doors ("6"), single garage doors ("7"), and double garage doors ("8"). The window tool also supports drawing single windows ("5"), double windows ("6"), and triple windows ("7").    602

As the analyst moves the mouse, the application highlights the active wall and snaps the cursor to a grid (e.g. 6-inch) overlaid on the wall.    604

Analyst clicks a wall location to place a first opening vertex. If the analyst is drawing a rectangle, circle, or semicircle the analyst can click a second wall location to finish drawing the shape. If the analyst is drawing a polygon, the analyst can click additional wall locations to place vertices and then right-click to close the polygon. If the analyst is drawing a fixed-size shape (e.g. a single front door), the application draws the shape as soon as the analyst clicks a first wall location.    606

Application adds horizontal and vertical guide lines to the wall for each shape vertex. This facilitates visually lining up multiple openings on the wall.    608

If the analyst drew a rectangle with custom dimensions, the application adds this custom shape to the shape list and selects it. The application assigns the next available shortcut key (e.g. "8") to this custom shape.    610

FIG. 6

Analyst presses "x" to use the delete tool. 700

To delete a wall or opening, the analyst clicks it. 702

To delete a wall or opening vertex, the analyst holds "Control" and then clicks the vertex. 704

Analyst presses "i" to use the information tool. 800

Analyst hovers over a wall or opening to view its area and the length of each edge. 802

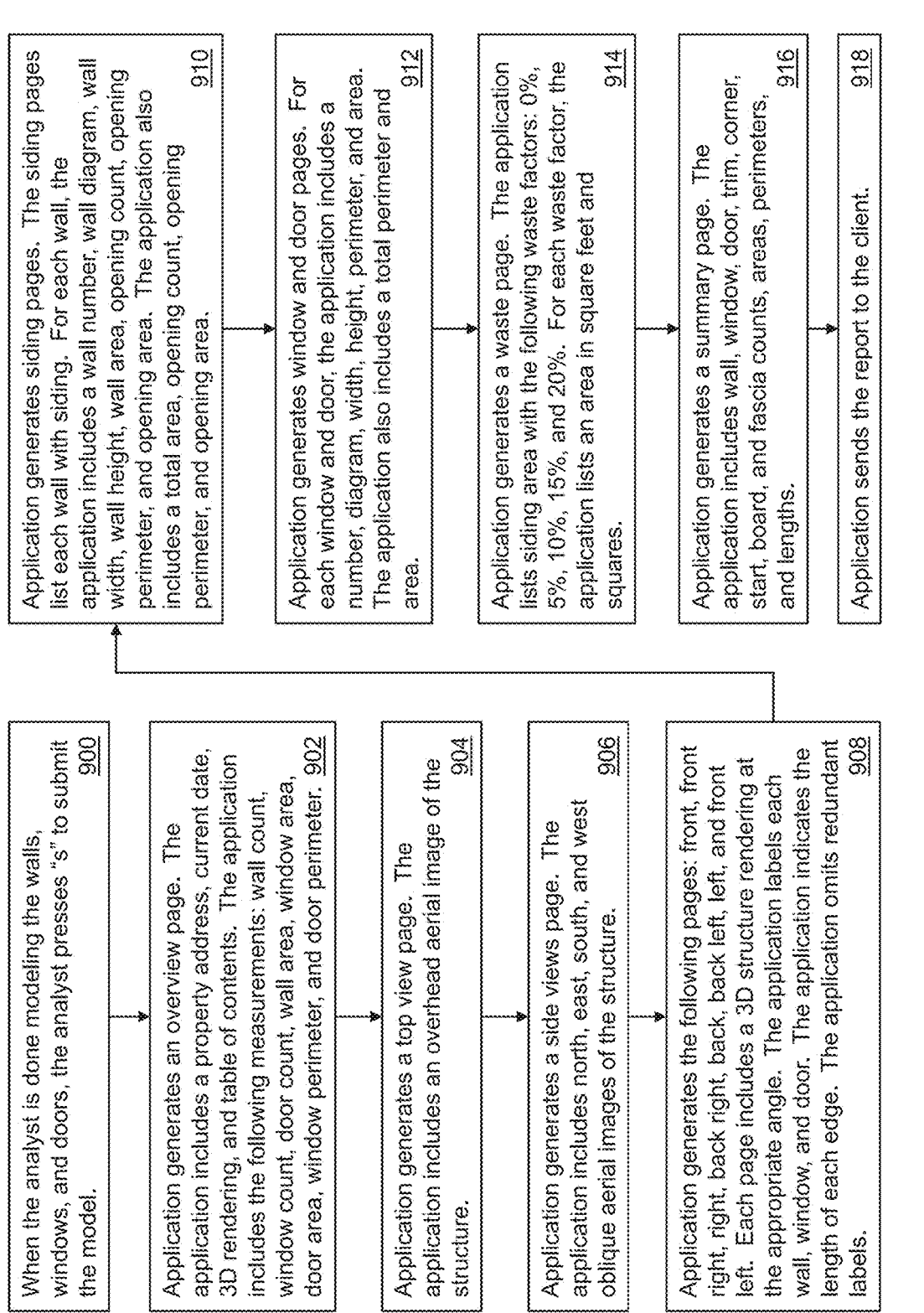

When the analyst is done modeling the walls, windows, and doors, the analyst presses "s" to submit the model. 900

Application generates an overview page. The application includes a property address, current date, 3D rendering, and table of contents. The application includes the following measurements: wall count, window count, door count, wall area, window area, door area, window perimeter, and door perimeter. 902

Application generates a top view page. The application includes an overhead aerial image of the structure. 904

Application generates a side views page. The application includes north, east, south, and west oblique aerial images of the structure. 906

Application generates the following pages: front, front right, right, back right, back, back left, left, and front left. Each page includes a 3D structure rendering at the appropriate angle. The application labels each wall, window, and door. The application indicates the length of each edge. The application omits redundant labels. 908

Application generates siding pages. The siding pages list each wall with siding. For each wall, the application includes a wall number, wall diagram, wall width, wall height, wall area, opening count, opening perimeter, and opening area. The application also includes a total area, opening count, opening perimeter, and opening area. 910

Application generates window and door pages. For each window and door, the application includes a number, diagram, width, height, perimeter, and area. The application also includes a total perimeter and area. 912

Application generates a waste page. The application lists siding area with the following waste factors: 0%, 5%, 10%, 15%, and 20%. For each waste factor, the application lists an area in square feet and squares. 914

Application generates a summary page. The application includes wall, window, door, trim, corner, start, board, and fascia counts, areas, perimeters, and lengths. 916

Application sends the report to the client. 918

GROUND MODE
NEW ALBANY, OH 43054

3700

3702

WALL REPORT

NEW ALBANY, OH 43054

MAY 10, 2023

3704

| CONTENTS | 3706 | | MEASUREMENTS | 3708 |
|---|---|---|---|---|
| OVERVIEW | 1 | | WALLS | 28 |
| TOP VIEW | 2 | | WINDOWS | 23 |
| SIDE VIEWS | 3 | | DOORS | 4 |
| FRONT | 4 | | WALL AREA | 4,467 Sq ft |
| RIGHT | 5 | | WINDOW AREA | 415 Sq ft |
| BACK | 6 | | DOOR AREA | 232 ft |
| LEFT | 7 | | WINDOW PERIMETER | 377 ft |
| MEASUREMENTS | 8 | | DOOR PERIMETER | 123 ft |

1

Wall Report          Siding (1/3)

| | | Wall Width | Height | Area | Opening Count | Perimeter | Area |
|---|---|---|---|---|---|---|---|
| 1 | | 17 | 13 | 65 | 0 | 0 | 0 |
| 2 | | 19 | 20 | 261 | 2 | 56 | 91 |
| 3 | | 25 | 29 | 232 | 1 | 16 | 15 |
| 4 | | 6 | 20 | 99 | 1 | 20 | 22 |
| 5 | | 15 | 25 | 287 | 2 | 38 | 46 |
| 6 | | 49 | 27 | 718 | 3 | 88 | 227 |
| 7 | | 19 | 22 | 323 | 2 | 32 | 31 |
| 8 | | 2 | 9 | 17 | 0 | 0 | 0 |
| 9 | | 20 | 9 | 168 | 1 | 14 | 12 |
| 10 | | 2 | 9 | 17 | 0 | 0 | 0 |
| 11 | | 1 | 11 | 6 | 0 | 0 | 0 |

Units Are Feet/Square Feet

Wall Report        Siding (2/3)

| | | Wall Width | Height | Area | Opening Count | Perimeter | Area |
|---|---|---|---|---|---|---|---|
| 12 | | 14 | 17 | 160 | 2 | 29 | 33 |
| 13 | | 23 | 23 | 371 | 3 | 49 | 46 |
| 14 | | 16 | 14 | 209 | 0 | 0 | 0 |
| 15 | | 14 | 26 | 202 | 2 | 44 | 61 |
| 16 | | 9 | 6 | 27 | 0 | 0 | 0 |
| 17 | | 14 | 16 | 84 | 1 | 16 | 15 |
| 18 | | 5 | 9 | 41 | 0 | 0 | 0 |
| 19 | | 8 | 5 | 20 | 0 | 0 | 0 |
| 20 | | 8 | 14 | 112 | 0 | 0 | 0 |
| 21 | | 57 | 26 | 739 | 6 | 121 | 204 |
| 22 | | 5 | 15 | 83 | 0 | 0 | 0 |

Units Are Feet/Square Feet

Wall Report        Siding (3/3)

| | | Wall Width | Height | Area | Opening Count | Perimeter | Area |
|---|---|---|---|---|---|---|---|
| 23 | | 2 | 10 | 21 | 1 | 8 | 5 |
| 24 | | 5 | 3 | 3 | 0 | 0 | 0 |
| 25 | | 7 | 7 | 28 | 0 | 0 | 0 |
| 26 | | 5 | 10 | 56 | 0 | 0 | 0 |
| 27 | | 6 | 10 | 67 | 0 | 0 | 0 |
| 28 | | 9 | 10 | 53 | 1 | 26 | 40 |
| Total | | | | 4,467 | 28 | 559 | 848 |

Units Are Feet/Square Feet

14

Wall Report                                        Windows (1/3)

| | | Width | Height | Perimeter | Area |
|---|---|---|---|---|---|
| 1 | | 9 | 5 | 28 | 46 |
| 2 | | 9 | 5 | 28 | 46 |
| 3 | | 3 | 5 | 16 | 15 |
| 4 | | 6 | 5 | 22 | 31 |
| 5 | | 3 | 5 | 16 | 15 |
| 6 | | 4 | 3 | 14 | 12 |
| 7 | | 4 | 3 | 14 | 12 |
| 8 | | 3 | 5 | 16 | 16 |
| 9 | | 3 | 5 | 16 | 15 |
| 10 | | 3 | 4 | 14 | 12 |
| 11 | | 3 | 1 | 7 | 3 |

Units Are Feet/Square Feet

| | | Width | Height | Perimeter | Area |
|---|---|---|---|---|---|
| 12 | | 6 | 5 | 22 | 30 |
| 13 | | 3 | 5 | 16 | 15 |
| 14 | | 3 | 5 | 16 | 16 |
| 15 | | 3 | 5 | 16 | 15 |
| 16 | | 6 | 5 | 22 | 30 |
| 17 | | 6 | 5 | 22 | 31 |
| 18 | | 3 | 5 | 16 | 15 |
| 19 | | 2 | 1 | 6 | 2 |
| 20 | | 2 | 1 | 6 | 2 |
| 21 | | 3 | 5 | 16 | 15 |
| 22 | | 3 | 5 | 16 | 15 |

Wall Report          Windows (2/3)

Units Are Feet/Square Feet

Wall Report                                          Windows (3/3)

| | | Width | Height | Perimeter | Area |
|---|---|---|---|---|---|
| 23 | ◯ | 2 | 3 | 8 | 5 |
| Total | | | | 377 | 415 |

Units Are Feet/Square Feet

17

Wall Report                 Doors

| | | Width | Height | Perimeter | Area |
|---|---|---|---|---|---|
| 1 | | 3 | 7 | 20 | 22 |
| 2 | | 8 | 7 | 30 | 57 |
| 3 | | 16 | 7 | 46 | 113 |
| 4 | | 5 | 8 | 26 | 40 |
| Total | | | | 123 | 232 |

Units Are Feet/Square Feet

Wall Report                                          Waste

| Waste | 0% | 5% | 10% | 15% | 20% |
|-------|------|------|------|------|------|
| Siding |  |  |  |  |  |
| Area | 4,467 | 4,690 | 4,914 | 5,137 | 5,360 |
| Squares | 45 | 47 | 50 | 52 | 54 |

Areas In Square Feet

Wall Report                                           Summary

| | |
|---|---|
| Walls | 28 |
| Windows | 23 |
| Doors | 4 |
| Wall Area | 4,467 Sq Ft |
| Window Area | 415 Sq Ft |
| Door Area | 232 Sq Ft |
| Window Perimeter | 377 Ft |
| Door Perimeter | 123 Ft |
| Inside Corners | 7 |
| Inside Corner Length | 87 Ft |
| Outside Corners | 9 |
| Outside Corner Length | 145 Ft |
| Eaves Fascia | 182 Ft |
| Level Frieze Board | 182 Ft |
| Rakes Fascia | 248 Ft |
| Sloped Frieze Board | 227 Ft |
| Level Starter | 275 Ft |
| Sloped Trim | 91 Ft |
| Vertical Trim | 65 Ft |

WALL, WINDOW, AND DOOR REPORT GENERATION

CROSS-REFERENCE TO RELATED APPLICATION(S)

The present application claims the benefit of U.S. Prov. Pat. Appl. No. 63/510,772, titled "Wall, Window, and Door Report Generation," filed Jun. 28, 2023, which is hereby incorporated herein by reference in its entirety.

FIELD OF THE INVENTION

The present disclosure relates to estimating construction projects. Particularly, the present disclosure relates to determining wall, window, and door measurements using imagery and presenting these measurements in a report.

BACKGROUND OF THE INVENTION

The background description provided herein is for generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

When an owner decides to replace walls, windows, or doors on a home or business, he or she will often contact multiple contractors for estimates. To develop an accurate estimate, a contractor needs measurements. To obtain these, the contractor typically has two options. The first option is to send an employee to the building to take measurements manually. The second option is to order a wall, window, and door report. These reports provide measurements based on imagery (e.g. aerial, drone, or ground-based imagery). With this information, the contractor will develop an estimate. Many contractors opt for this second option because it is faster, cheaper, and safer than the first option. There is still room for improvement, however. These wall, window, and door reports are expensive and can take a day or two to arrive. What is needed is a more automated approach for generating wall, window, and door reports that further reduces costs and turnaround time for contractors.

There are multiple companies that provide wall, window, and door reports. For example, see U.S. Pat. Nos. 9,599,466, 10,663,294, and 10,902,672, each of which is incorporated by reference herein in its entirety. In general, these companies use two-dimensional (2D) imagery and leverage manual tools for drawing walls, windows, and doors. Instead of relying on 2D imagery, the present disclosure leverages a three-dimensional (3D) mesh and provides several automated tools that drastically reduce the time and cost of generating wall, window, and door reports.

BRIEF SUMMARY OF THE INVENTION

The following presents a simplified summary of one or more embodiments of the present disclosure to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, is a computer-implemented method for generating wall, window, and door reports. In one embodiment, the application may present a 3D mesh of a structure to an analyst. The application may also display 2D images of the structure for reference. The application may overlay a 3D roof model on the 3D structure mesh. The application may be configured with a ground tool that drops walls from roof edges. The application may be configured to allow an analyst to select the ground tool and then click a location on the 3D mesh. The application may then drop walls down from at or near the roof's outer edges (e.g. eaves and rakes) to lower roof facets or, if none exist, to the clicked mesh elevation. The application may be configured with a delete tool that can be used to delete walls and/or vertices. The application may be configured to allow the analyst to use the delete tool to delete unnecessary walls and vertices. The application may be configured with a wall tool that can be used for drawing walls. The application may be configured to allow an analyst to select the wall tool to draw missing walls. The application may be configured with a move tool that can be used to move walls and/or vertices. The application may be configured to allow an analyst to select the move tool to move walls and vertices. The application may be configured with an opening tool that can be used to create openings in the walls. The application may be configured to allow an analyst to select the opening tool to draw, for example, windows, doors, and holes. The opening tool may support drawing rectangles, circles, semicircles, and polygons. The opening tool may also support drawing windows and doors with standard sizes. The opening tool may also record custom window and door sizes to enable the analyst to quickly add more openings with the same dimensions. The opening tool may use a grid to snap to common dimensions. The opening tool may use guide lines to facilitate aligning openings. The application may be configured with an information tool that can be used to review information about the walls and/or openings. The application may be configured to allow an analyst to select the information tool to review, for example, wall and opening areas and lengths. The application may support setting the visibility or opacity of the mesh, roof, and walls. The application may support displaying total measurements such as the count, perimeter, and area of roof facets, wall facets, windows, doors, and holes. When the analyst finishes modeling the walls, windows, and doors, the application may generate a report. The report may include views of the 3D model from multiple angles along with length and area measurements. The report may include waste measurements and recommended material quantities.

The present disclosure has several advantages over existing methods for generating wall, window, and door reports. Because the application leverages a 3D mesh versus 2D images, there is no need for an analyst to indicate tie points or otherwise form associations among 2D images. The analyst can immediately begin drawing the walls, windows, and doors directly on the 3D mesh. The present disclosure also employs algorithms to automatically generate walls while considering roof edge types, roof facet locations, etc. This enables the application to generate a complete or nearly complete wall model in seconds. The present disclosure also enables analysts to rapidly mark openings such as windows, doors, and holes by snapping to a grid and enabling an analyst to add standard or custom windows and doors often with just one click. The result is that an analyst can generate a detailed and accurate wall, window, and door report in minutes.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 2 is a general overview flowchart for a method of determining wall, window, and door measurements, according to an embodiment of the present disclosure.

FIG. 3 is a flowchart for a ground tool in an embodiment of the present disclosure.

FIG. 4 is a flowchart for a move tool in an embodiment of the present disclosure.

FIG. 5 is a flowchart for a wall tool in an embodiment of the present disclosure.

FIG. 6 is a flowchart for an opening tool in an embodiment of the present disclosure.

FIG. 9 is a flowchart for generating a wall, window, and door report in an embodiment of the present disclosure.

FIG. 48 is a screenshot of a wall report's first siding page in an embodiment of the present disclosure.

FIG. 49 is a screenshot of a wall report's second siding page in an embodiment of the present disclosure.

FIG. 51 is a screenshot of a wall report's first windows page in an embodiment of the present disclosure.

FIG. 52 is a screenshot of a wall report's second windows page in an embodiment of the present disclosure.

FIG. 54 is a screenshot of a wall report's doors page in an embodiment of the present disclosure.

FIG. 55 is a screenshot of a wall report's waste page in an embodiment of the present disclosure.

FIG. 56 is a screenshot of a wall report's summary page in an embodiment of the present disclosure.

DETAILED DESCRIPTION

The present disclosure relates to novel and advantageous systems and methods for estimating construction projects. In particular, the present disclosure relates to novel and advantageous systems and methods for determining wall, window, and door measurements using imagery and presenting these measurements in a report.

Figure 1:
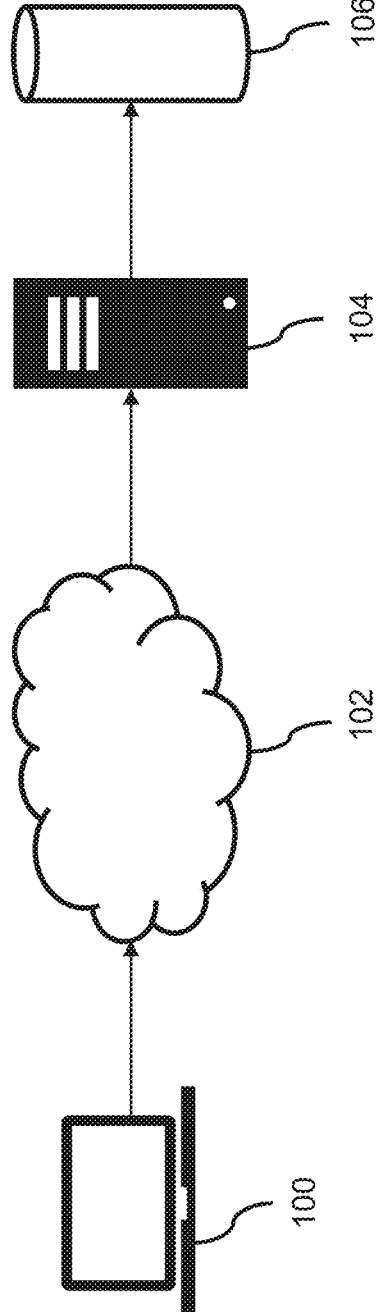
FIG. 1 is a diagram of a system for determining wall, window, and door measurements, according to an embodiment of the present disclosure.

FIG. 1 is a system diagram illustrating an embodiment of the present disclosure. In it, a client 100 may connect via a network 102 to a server 104 which has access to a database 106. The client 100 may be a computer, tablet, phone, etc. The network 102 may be a local area network, wide area network, etc. The server 104 may be on-premises, on cloud computing architecture ("the cloud"), etc. The database 106 may be any kind of database or database architecture (e.g. but not limited to, Amazon SimpleDB, Google Cloud Datastore, MongoDB, Oracle, PostgreSQL, etc.). The client 100 may run an application that is desktop-based, web-based, mobile OS-based, etc. The database 106 may contain imagery, roof models, wall models, and any other data described herein as created, received, or used by part of the systems or during the methods described herein, etc. The imagery may include overhead, oblique, and/or ground-based imagery. The imagery may have been captured by airplanes, drones, satellites, phones, etc. Not to be limited by the foregoing, any one or more of the hardware and software components of the present disclosure may be integral portions of a single computer, server, or controller, or may be connected parts of a computer network. The hardware and software components may be located within a single location or, in other embodiments, portions of the hardware and software components may be divided among a plurality of locations and connected directly or through a global computer information network, such as the network 102, above, or the internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

FIG. 2 is a nonlimiting overview flowchart for a method of an embodiment of the present disclosure. In general, the application may begin by presenting a 3D mesh of a structure (e.g. a single-family home, multifamily home, or commercial building) to an analyst at step 200. One may construct a 3D mesh from 2D images using a variety of applications such as Bentley Context Capture Drone Deploy (https://www.bentley.com/software/contextcapture/), (https://www.dronedeploy.com/), Agisoft Metashape (https://www.agisoft.com/), or Autodesk Reality Capture (https://aps.autodesk.com/reality-capture-api). The application may be running at or accessed through the client 100. The application may alternatively or additionally run at or be accessed through the server 104, or parts of the application may run at or be accessed through the client 100 while other parts of the application may run at or be accessed through the server 104. The 3D mesh may be stored in the database 106, and the application may access the 3D mesh from the database 106. At step 202, the application may overlay a 3D roof model on the 3D mesh. The application may obtain the 3D roof model from the database 106. At step 204, the application may also display 2D images of the structure for reference. These may include one or more vertical images, oblique images, ground-based images, etc. The application may support clicking a 2D image to enlarge it. At step 206, the analyst may rotate, pan, or zoom the model as needed. The analyst may do this at any point while developing the wall, window, and door model. At step 208, the analyst may use a ground tool to drop walls from roof edges. At step 210, the analyst may use a move tool to move wall vertices if necessary. At step 212, the analyst may use a wall tool to draw any missing walls. At step 214, the analyst may use an opening tool to draw doors, holes, and windows. At step 216, the analyst may use a delete tool to delete any unwanted walls or openings. At step 218, the analyst may use the information tool to review wall and opening areas and lengths. At step 220, the analyst may toggle roof, wall, and mesh visibility as needed. At step 222, the analyst may submit the completed model. At step 224, the application may generate a wall, window, and door report.

In an embodiment of the present disclosure, the application may be implemented in a web page using HTML, CSS, JavaScript, and/or any other suitable programming language. To render 3D models, the application may use Three.js (https://threejs.org) or any other suitable 3D rendering library or algorithm.

Roof models in the database 106 may be generated by any suitable method. An example method of generating roof models from imagery is described in U.S. Pat. No. 10,861, 247, which is hereby incorporated by reference herein in its entirety. The following is an example roof model. This roof model is in JSON format, but it could be in many other formats such as XML, CSV, YAML, etc. This example is for a simple roof with two rectangular roof facets. The roof model contains a facet list. Each facet contains an area (in square meters), a constant and normal defining the facet's plane, and a vertex list specifying the facet's boundary. Each facet also has an edge type list. The edge types may include bend, continuous flashing, eave, hip, parapet, rake, ridge, step flashing, valley, etc. Looking at the first facet in this sample, the edge between vertices 1 and 2 represents a rake, the edge between vertices 2 and 3 represents an eave, the edge between vertices 3 and 4 represents a rake, and the edge between vertices 4 and 1 represents a ridge.

```
{
    "facets":[
        {
            "area":64.82643464427314,
            "constant":101.31545990554255,
            "edgeTypes":[
                "Rake",
                "Eave",
                "Rake",
                "Ridge"
            ],
            "normal":{
                "x":0.053622320736070834,
                "y":-0.9457518024736181,
                "z":0.3204343533966232
            },
            "vertices":[
                {
                    "x":-6.721857444010082,
                    "y":107.46466632477622,
                    "z":2.1217561785832886
                },
                {
                    "x":-7.45714524469129,
                    "y":105.93425795909232,
                    "z":-2.2721504583296612
                },
                {
                    "x":6.116105190836929,
                    "y":105.93425795909232,
                    "z":-4.543533599926454
                },
                {
                    "x":6.8513929915181055,
                    "y":107.46466632477622,
                    "z":-0.14962696301350759
```

-continued

```
            }
        ]
    },
    {
        "area":64.82643464427301,
        "constant":-101.95434385222352,
        "edgeTypes":[
            "Rake",
            "Eave",
            "Rake",
            "Ridge"
        ],
        "normal": {
            "x":0.05362232073670855,
            "y":0.9457518024736181,
            "z":0.320434353396623
        },
        "vertices": [
            {
                "x":-6.721857444010082,
                "y":107.46466632477622,
                "z":2.1217561785832886
            },
            {
                "x":-5.986569643328879,
                "y":105.93425795909232,
                "z":6.515662815496241
            },
            {
                "x":7.586680792199282,
                "y":105.93425795909232,
                "z":4.244279673899438
            },
            {
                "x":6.8513929915181055,
                "y":107.46466632477622,
                "z":-0.14962696301350759
            }
        ]
    }
  ]
}
```

FIG. 3 is a flowchart for a ground tool in an embodiment of the present disclosure. The ground tool is configured to, and may enable an analyst to, automatically drop walls from roof edges to an elevation specified by clicking a 3D mesh location. An analyst may begin at step 300 by activating the ground tool, for example by clicking on a ground tool icon or button, tapping on a ground tool icon or button, pressing a shortcut key(s) on keyboard, or actuating any other suitable user interface mechanism. In an example, the analyst may activate the ground tool by pressing a "g" key on a keyboard. At step 302, the analyst may click a ground location on the 3D mesh. At step 304, the application may obtain the elevation of the clicked location from the 3D mesh. At step 306, the application may obtain a list of disconnected roof facet edges. A connected roof facet edge is an edge shared by two facets (e.g. a hip, ridge, or valley). A disconnected roof facet edge is an edge that is not shared (e.g. an cave or a rake). The application may deem these disconnected edges wall tops. At step 308, the application may split each wall top into short (e.g. 3-inch, 6-inch, 12-inch, 18-inch, or other suitable size) segments. At step 310, the application may remove or ignore wall top positions with a roof facet above. That is, at step 310, the application may determine any wall top positions that are below another roof facet edge (e.g., another disconnected roof facet edge) and may remove or ignore those wall top positions. At step 312, the application may obtain wall bottom positions by dropping each wall top position to the closest roof facet below the top position. If there is no roof facet below the top position, the application may drop the top position to the ground elevation obtained in step 304. At step 314, the application may simplify each wall top by eliminating all but the first and last top positions remaining after step 310. At step 316, the application may construct wall models by combining wall top and wall bottom positions for each edge. At step 318, the application may merge wall models where the wall top vertices touch and the wall angles (on the x/z ground plane) match. At step 320, the application may simplify the wall bottom by eliminating unnecessary collinear points. For example, any intermediate points that are between and collinear with two other points defining the ends of a wall bottom can be eliminated, since such collinear points are generally redundant when defining a boundary of a polygon. At step 322, the application may add the walls to the scene.

To better understand FIG. 3, a simple example is provided. In this example, we have a roof with two rectangular facets. The (x, y, z) coordinates are in feet with the x/z plane representing the ground and the y axis pointing up. Facet A has the following coordinates: (0, 9, 0), (12, 12, 0), (12, 12, 36), and (0, 9, 36). Facet B has the following coordinates: (12, 12, 0), (24, 9, 0), (24, 9, 36), and (12, 12, 36). At step 300, the analyst may activate the ground tool (e.g. by pressing "g"). At step 302, the analyst may click a ground location on the 3D mesh. For this example, we will assume that the analyst clicked a ground location with an elevation of 0. At step 306, the application may obtain a list of disconnected roof facet edges (e.g. caves and rakes) and deem these wall tops. For this example, we have two caves and four rakes. The caves are (0, 9, 0)/(0, 9, 36) and (24, 9, 0)/(24, 9, 36). The rakes are (0, 9, 0)/(12, 12, 0), (12, 12, 0)/(24, 9, 0), (12, 12, 36)/(0, 9, 36), and (24, 9, 36)/(12, 12, 36). At step 308, the application may split each wall top into short (e.g. 6-inch) segments. For example, the application may split the cave (0, 9, 0)/(0, 9, 36) into 6-inch segments: (0, 9, 0), (0, 9, 0.5), (0, 9, 1), . . . , (0, 9, 36). At step 310, the application may remove segmented wall top positions with a roof facet above. In this example, there are no roof facets above the wall top positions, so there is no need to do anything. At step 312, the application may obtain wall bottom positions by dropping each segmented wall top position to the closest roof facet below the top position. If there is no roof facet below the top position, the application may drop the top position to the ground elevation. For our example cave, there are no facets below the eave's top positions, so the application would drop the segmented top positions to the ground elevation. The application would construct bottom positions of (0, 0, 0), (0, 0, 0.5), (0, 0, 1), . . . , (0, 0, 36). At step 314, the application may simplify each wall top by eliminating all but the first and last remaining segmented wall top positions. For our example cave, we would obtain top positions of (0, 9, 0) and (0, 9, 36). At step 316, the application may construct wall models by combining wall top and wall bottom positions for each edge. For our example cave, the combined positions would be (0, 9, 0) and (0, 9, 36) plus (0, 0, 0), (0, 0, 0.5), (0, 0, 1), . . . , (0, 0, 36). At step 318, the application may merge wall models where the wall top vertices touch and the wall angles match. For this example, the application would merge the walls for the adjacent rakes because their wall top vertices touch and they have the same wall angles on the x/z plane. At step 320, the application may simplify the wall bottom by eliminating unnecessary collinear points. For our example cave, the bottom positions would become (0, 0, 0) and (0, 0, 36). In the end, our example would result in a wall with four positions: (0, 9, 0), (0, 9, 36), (0, 0, 36), and (0, 0, 0). At step 322, the application may add the walls to the scene.

FIG. 4 is a flowchart for a move tool in an embodiment of the present disclosure. The move tool is configured to, and may enable an analyst to, move wall vertices if any adjustments are necessary after using the ground tool. An analyst may begin at step 400 by activating the move tool (e.g. pressing "m"). At step 402, the analyst may click (e.g., left click on a mouse) one or more wall vertices to select them. At step 404, the analyst may click (e.g., left click on a mouse) and drag a wall vertex to begin moving. The application may deem this clicked vertex the active vertex. The application may deem the wall associated with the clicked vertex the active wall. At step 406, the application may display three guide lines. The first is a vertical guide line (parallel to the vertical y axis). The second is a horizontal guide line parallel to the active wall (parallel to the x/z ground plane). The third is a horizontal guide line perpendicular to the active wall (parallel to the x/z ground plane). At step 408, the application may snap the active vertex to the guide lines. At step 410, the application may offset the other selected vertices by the same distance and direction as the active vertex. At step 412, the analyst may release whatever mechanism was used to click the active vertex (e.g., the left mouse button) to stop dragging. At step 414, the application may stop moving the selected vertices. At step 416, the analyst may click again or, for example, right click. At step 418, the application may deselect all vertices.

FIG. 5 is a flowchart for a wall tool in an embodiment of the present disclosure. The wall tool is configured to, and may enable an analyst to, draw walls if any are missing after using the ground tool. An analyst may begin at step 500 by activating the wall tool (e.g. by pressing "a"). At step 502, as the analyst moves the mouse, the application may display a cursor that snaps to the ground plane. If the analyst hovers over a wall vertex, the application may snap the cursor to the ground location below the wall vertex. At step 504, the analyst may click the mouse to place a first wall vertex. At step 506, the application may determine the unique wall directions for the current model and display guide lines along the ground plane in those directions. At step 508, as the analyst moves the mouse, the application may display a cursor that snaps to the guide lines. If the analyst hovers over a wall vertex, the application may snap the cursor to the closest guide line location. At step 510, the analyst may click the mouse to place a second wall vertex. At this point, the user has placed two wall vertices along the ground plane. The next step is specifying the wall height. At step 512, as the analyst moves the mouse, the application may display a wall with a height designated by the mouse location. If the analyst hovers over a wall vertex, the application may snap the top of the new wall to the existing wall vertex's elevation. At step 514, the analyst may click the mouse to set the wall height and finish drawing the wall.

FIG. 6 is a flowchart for an opening tool in an embodiment of the present disclosure. The opening tool is configured to, and may enable an analyst to, draw openings (e.g. windows, doors, and holes) in walls. An analyst may begin at step 600 by activating the door tool (e.g. by pressing "d"), activating the hole tool (e.g. by pressing "o"), or activating the window tool (e.g. by pressing "w"). Each of these tools is an instance of the opening tool. At step 602, the analyst may press a key to select a shape. For example, the opening tools may support drawing rectangles (e.g. by pressing "1"), circles (e.g. by pressing "2"), semicircles (e.g. by pressing "3"), and polygons (e.g. by pressing "4"). The door tool may also support drawing fixed-size shapes, such as but not limited to, 3'×7' single front doors (e.g. by pressing "5"), 6'×7' double front doors (e.g. by pressing "6"), 8'×7' single garage doors (e.g. by pressing "7"), and 16'×7' double garage doors (e.g. by pressing "8"). The window tool may also support drawing fixed-size shapes, such as but not limited to, 3'×5' single windows (e.g. by pressing "5"), 6'×5' double windows (e.g. by pressing "6"), and 9'×5' triple windows (e.g. by pressing "7"). At step 604, as the analyst moves the mouse, the application may highlight the active wall and snap the cursor to a grid (e.g. 6-inch) overlaid on the active wall. At step 606, the analyst may click a wall location to place a first opening vertex. If the analyst is drawing a rectangle, circle, or semicircle the analyst may click a second wall location to finish drawing the shape. If the analyst is drawing a polygon, the analyst may click additional wall locations to place vertices and then right click to close the polygon. If the analyst is drawing a fixed-size shape (e.g. a single front door), the application may draw the shape as soon as the analyst clicks a first wall location. At step 608, the application may add horizontal and vertical guide lines to the wall for each shape vertex. This may help the analyst visually align multiple openings on the wall. At step 610, if the analyst drew a rectangle with custom dimensions, the application may add this custom shape to the shape list and select it. The application may assign the next available shortcut key (e.g. "8") to this custom shape. This may help the analyst quickly draw multiple openings with the same custom dimensions.

Figure 7:
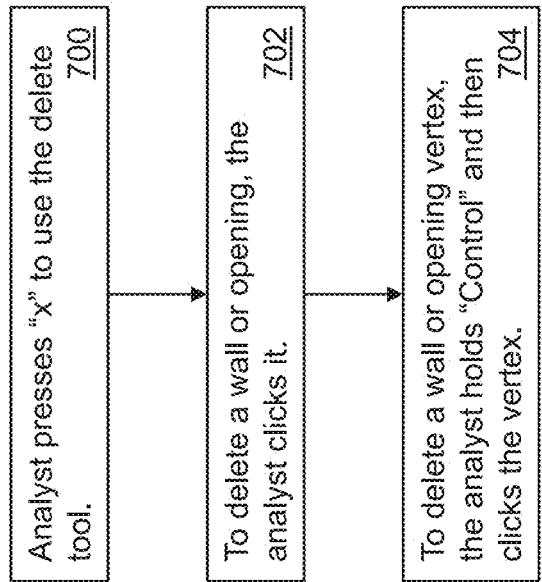
FIG. 7 is a flowchart for a delete tool in an embodiment of the present disclosure.

FIG. 7 is a flowchart for a delete tool in an embodiment of the present disclosure. The delete tool is configured to, and may enable an analyst to, delete items such as walls, windows, doors, and holes. The delete tool may also enable an analyst to delete vertices from these items. An analyst may begin at step 700 by activating the delete tool (e.g. by pressing "x"). At step 702, the analyst may click a wall or opening to delete it. At step 704, the analyst may hold "Control" and then click a vertex to delete the vertex. However, other mechanisms may be used to select a wall, opening, or vertex for deletion.

Figure 8:
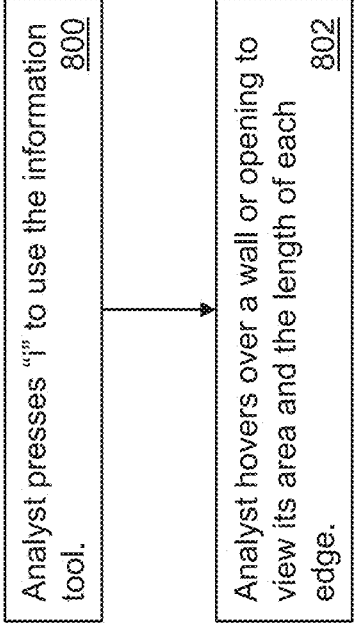
FIG. 8 is a flowchart for an information tool in an embodiment of the present disclosure.
Figure 35:
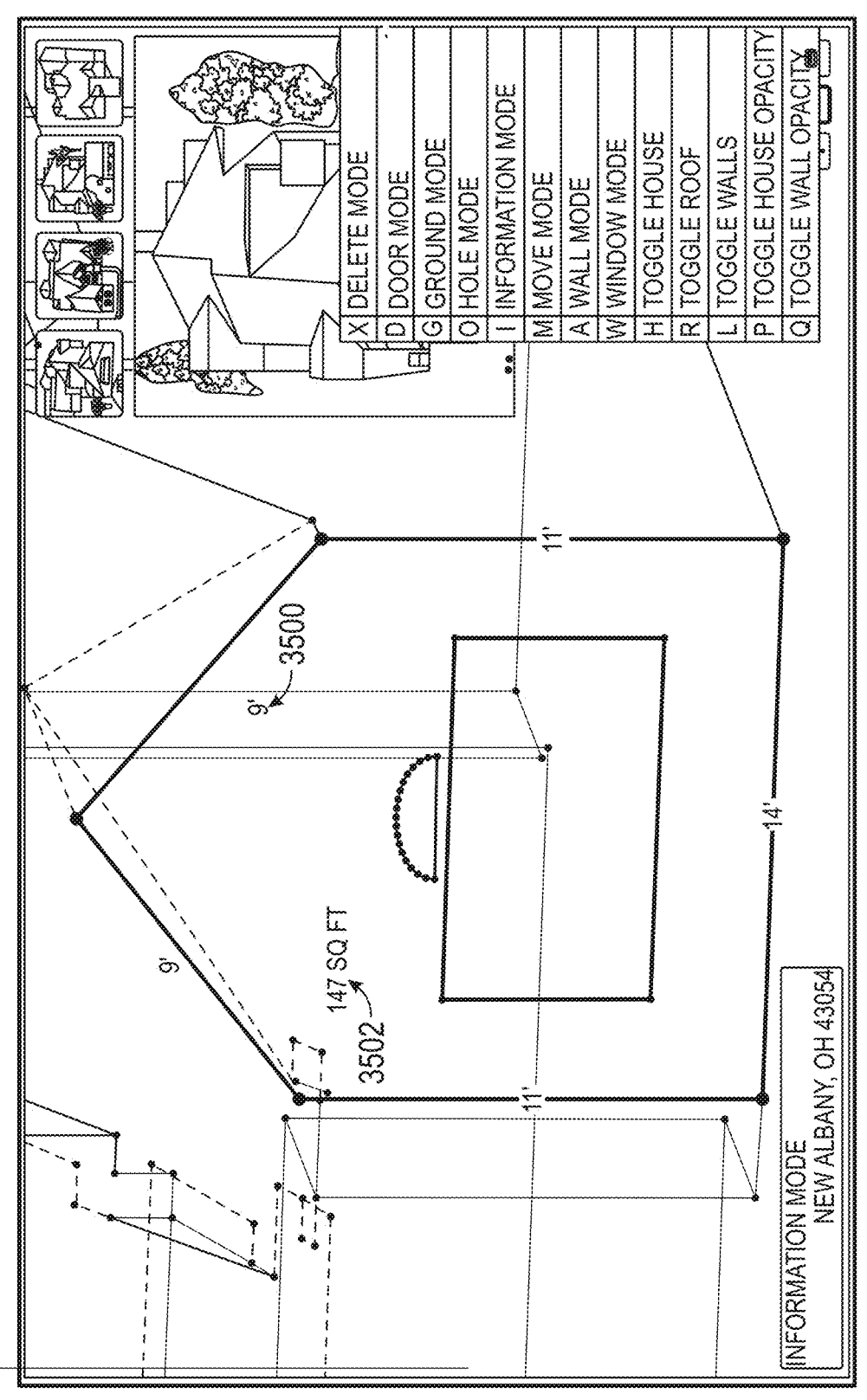
FIG. 35 is a screenshot after an analyst displayed wall information in an embodiment of the present disclosure.
Figure 36:
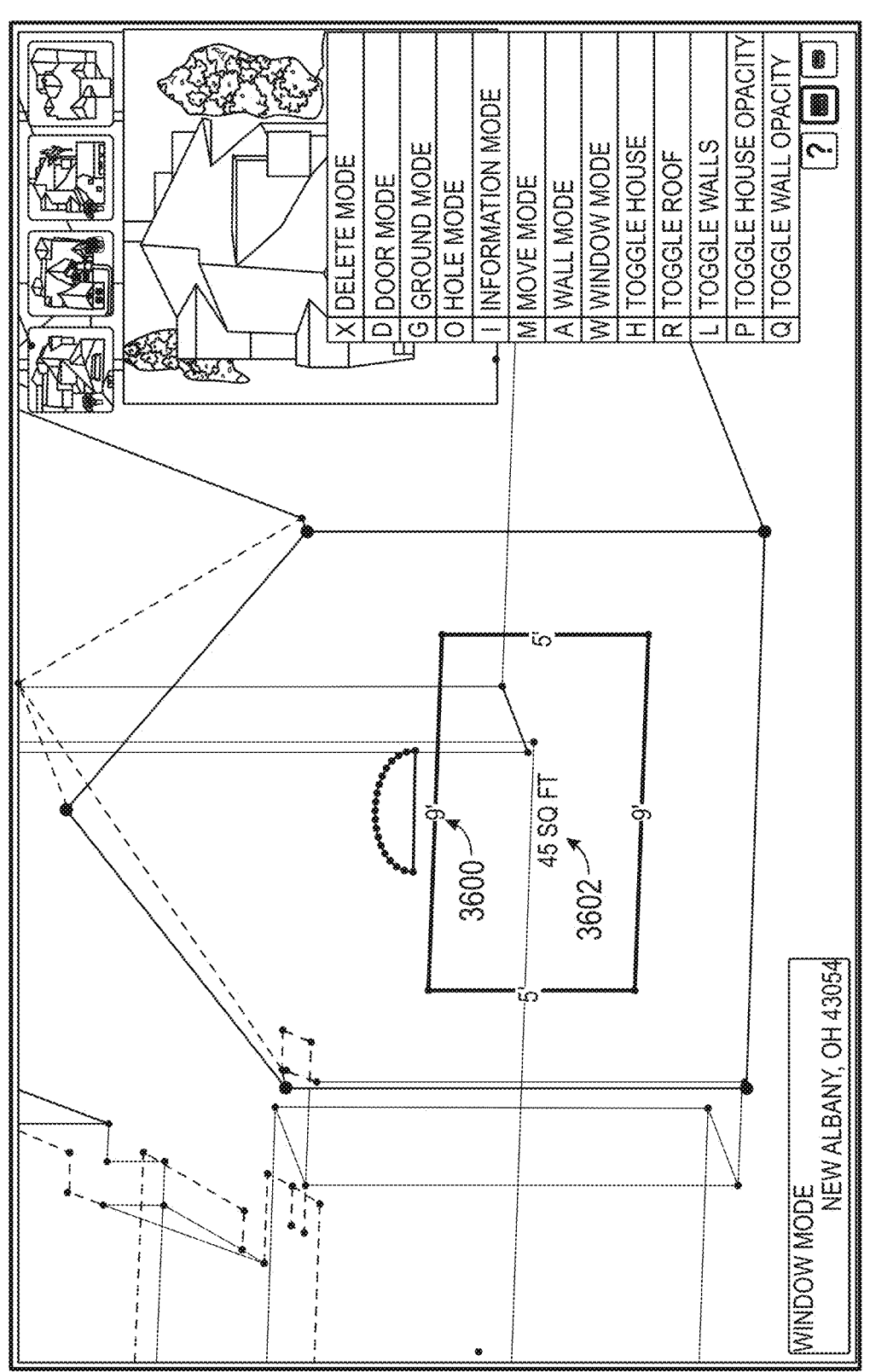
FIG. 36 is a screenshot after an analyst displayed window information in an embodiment of the present disclosure.

FIG. 8 is a flowchart for an information tool in an embodiment of the present disclosure. The information tool is configured to, and may enable an analyst to, view information (e.g. areas and lengths) for items (e.g. walls, windows, door, and holes). An analyst may begin at step 800 by activating the information tool (e.g. by pressing "i"). At step 802, the analyst may hover over a wall or opening to view its area and the length of each edge. The application may display an edge's length by placing a label at the edge's midpoint. The application may display an item's area by placing a label at the item's centroid. However, other ways and locations for showing such information are also suitable. FIG. 35 illustrates using an information tool to display edge lengths and an area for a wall. FIG. 36 illustrates using an information tool to display edge lengths and an area for a window.

FIG. 9 is a flowchart for generating a wall, window, and door report in an embodiment of the present disclosure. The wall report may come in many different forms such as a PDF file, a word-processing file, an interactive web page, data in a table, etc. At step 900, when an analyst is done modeling walls, windows, and doors, the analyst may submit the model (e.g. by pressing "s"). At step 902, the application may generate an overview page. On the overview page, the application may include one or more of a property address, current date, 3D rendering, and table of contents. On the overview page, the application may also include one or more of the following measurements: wall count (e.g. the number of walls), window count (e.g. the number of windows), door count (e.g. the number of doors), wall area (e.g. a combined area of the walls), window area (e.g. a combined area of the windows), door area (e.g. a combined area of the windows), window perimeter (e.g. a combined perimeter of the windows), and/or door perimeter (e.g. a combined perimeter of the doors). At step 904, the application may generate a top view page. On the top view page, the application may include an overhead aerial image of the structure. At step 906, the application may generate a side views page. On the side views page, the application may include one or more of north, east, south, or west oblique aerial images of the structure. At step 908, the application may generate the following pages: front view, front right view, right view, back right view, back view, back left view, left view, and front left view. Each page may include a 3D rendering of the structure at the corresponding angle (e.g. front of the structure for the front view page, left side of the structure for the left side view page, etc.). The application may provide an identifying label for each wall, window, and/or door. For example, the application may label the item's sequentially, so a first wall may be labelled "1", a second wall may be labeled "2", etc. Similarly, a first window may be labeled "1", a second window may be labeled "2", etc. Labels other than numerals, such as any other alphanumeric characters, may alternatively or additionally be used. The application may color the labels to distinguish walls, windows, and doors. For example, the application may use blue for wall labels, green for window labels, and gold for door labels. The application may indicate the length of each edge by placing a label corresponding to the length on the edge's midpoint or other suitable location relative to the edge. The application may omit redundant labels (e.g. the application may label the left edge of a window, but not the right edge because it has the same length). At step 910, the application may generate one or more siding pages. The siding page(s) may list each wall with siding. For each wall, the application may include a wall label or number and a corresponding wall diagram, wall width, wall height, wall area, opening count (e.g. number of openings in the wall), opening perimeter (e.g. a combined perimeter of any opening(s)), and/or opening area (e.g. a combined area of any opening(s)). The wall area for a given wall may be the net wall area of that wall, which is equal to the gross wall area of that wall minus the area of any openings in that wall. The application may also include a total area (e.g. a combined area of the walls), total opening count (e.g. a total number of openings in all the walls), opening perimeter (e.g. a combined perimeter of the openings in all the walls), and/or opening area (e.g. a combined area of the openings in all the walls). At step 912, the application may generate one or more window and/or one or more door pages. The one or more window pages may provide information about each window (e.g. number, width, height, perimeter, and area). The one or more door pages may provide information about each door. For each window and door, the application may include a label or number and a corresponding diagram, width, height, perimeter, and/or area corresponding to that window or door. The application may also include a total perimeter (e.g. a combined perimeter of all windows and/or all doors) and area (e.g. a combined area of all windows and/or all doors). At step 914, the application may generate a waste page. When ordering materials for a structure (e.g. siding for a home), there is often some waste (e.g. due to cutting siding to fit a wall). A contractor often uses a waste factor (e.g. 20%) to account for this. This waste factor represents how much extra material the contractor plans on ordering to account for anticipated waste. In an example, on the waste page, the application may list siding area based on one or more of the following waste factors: 0%, 5%, 10%, 15%, 20%, or any other suitable waste factor(s). For each waste factor, the application may list an area in square feet and/or squares (1 square=100 square feet). At step 916, the application may generate one or more summary pages. In an example, on the summary page, the application may include one or more of the following measurements: wall count (e.g. the number of walls), window count (e.g. the number of windows), door count (e.g. the number of doors), wall area (e.g. a combined area of the walls), window area (e.g. a combined area of the windows), door area (e.g. a combined area of the doors), window perimeter (e.g. a combined perimeter of the windows), door perimeter (e.g. a combined perimeter of the doors), inside corner count (e.g. the number of inside corners), inside corner length (e.g. a combined length of inside corners), outside corner count (e.g. the number of outside corners), outside corner length (e.g. a combined length of outside corners), caves fascia length (e.g. a combined length of caves fascia), level frieze board length (e.g. a combined length of level frieze board), rakes fascia length (e.g. a combined length of rakes fascia), sloped frieze board length (e.g. a combined length of sloped frieze board), level starter length (e.g. a combined length of level starter), sloped trim (e.g. an amount of sloped trim), and vertical trim (e.g. an amount of vertical trim). At step 918, the application may send the report to the client 100.

Figure 10:
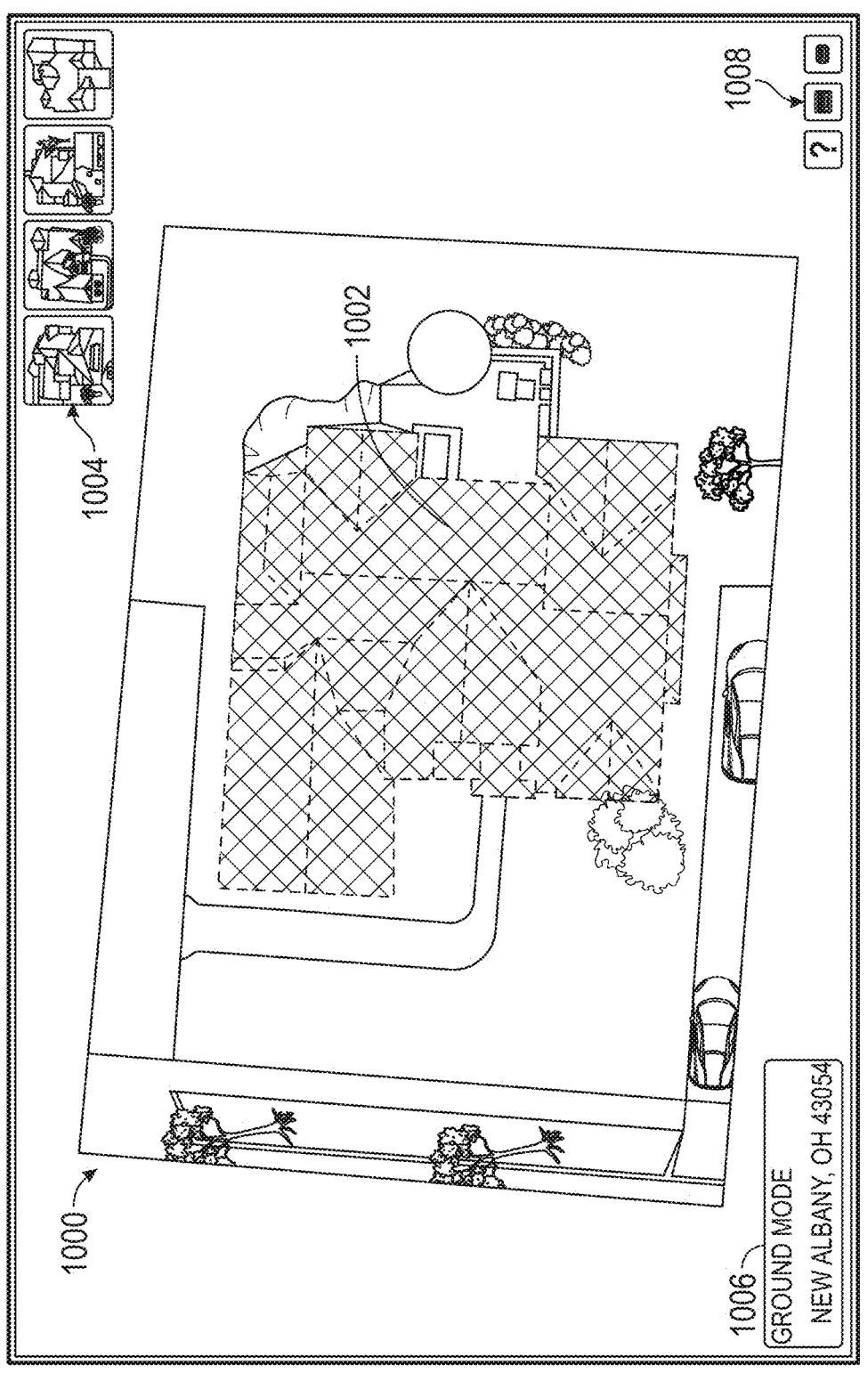
FIG. 10 is a screenshot of an initial analyst view in an embodiment of the present disclosure.

FIG. 10 is a screenshot of an analyst interface in an embodiment of the present disclosure. This screenshot shows an initial view that an analyst may see when starting to generate a model for a given structure. The interface may include a 3D mesh 1000 of the given structure, a roof model 1002 corresponding to the given structure and/or 3D mesh, one or more 2D images 1004 of the given structure, an information panel 1006, and buttons 1008. The application may retrieve the 3D mesh 1000, roof model 1002, and 2D images 1004 from a database 106. The information panel 1006 may indicate the current mode (e.g. ground mode, move mode, delete mode, etc.) and the structure's address. The buttons 1008 may include a help button that shows help for the current mode, a shortcut button that shows the application's shortcut keys, and a measurements button that shows measurements for one or more of the currently modeled walls, windows, and doors. The analyst may be able to rotate the model using, for example, the left mouse button, pan the model using, for example, the right mouse button, and zoom using, for example, the scroll wheel. Alternatively, on a touchscreen, the user may be able to rotate the model with, for example, one finger, pan the model with, for example, two fingers, and zoom, for example, by pinching with two fingers.

Figure 11:
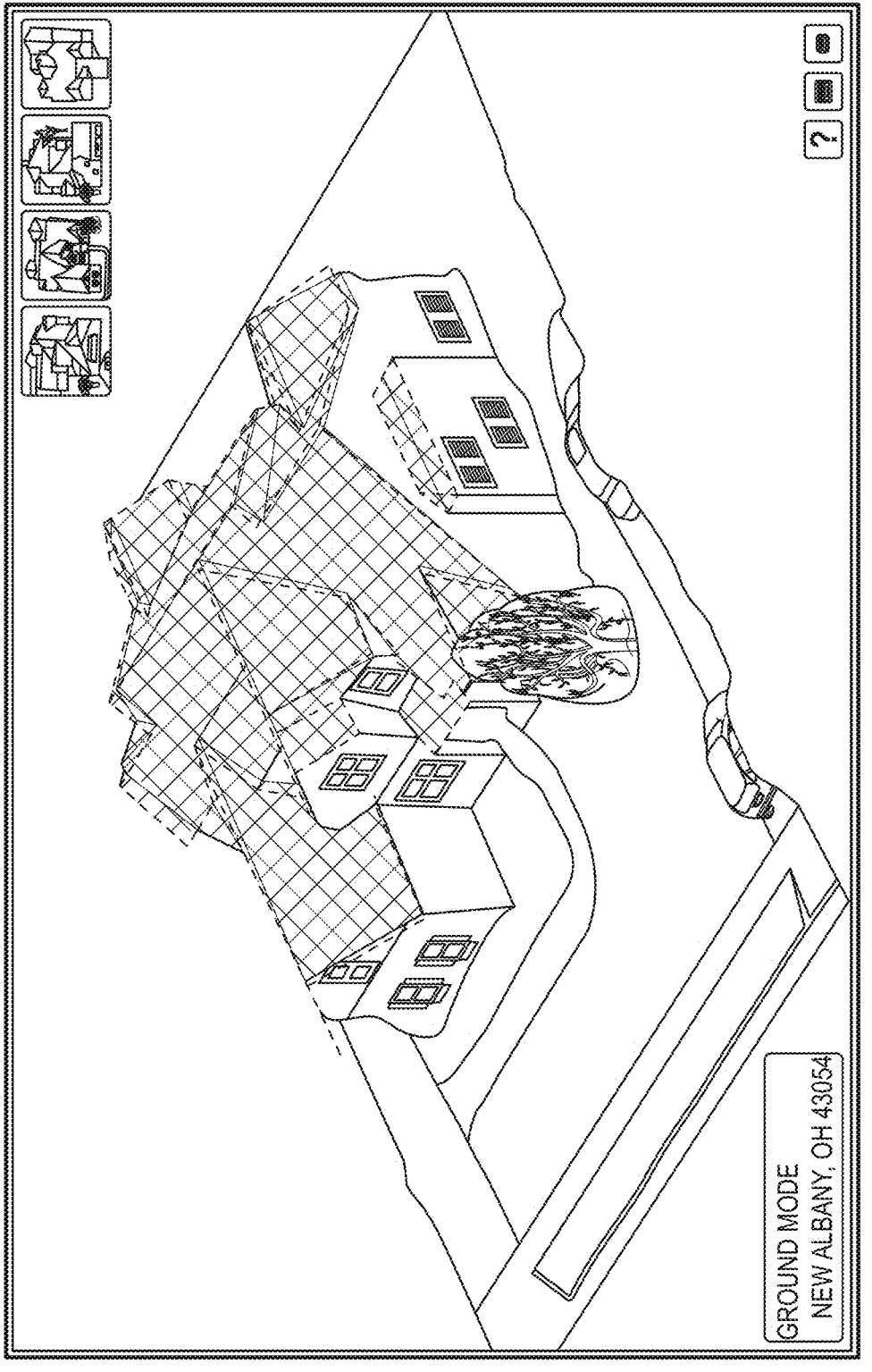
FIG. 11 is a screenshot after an analyst rotated the view in an embodiment of the present disclosure.

FIG. 11 is a screenshot of the analyst interface after the analyst has rotated the view in an embodiment of the present disclosure. The analyst may rotate, pan, and zoom the 3D mesh 1000 to view it from any angle.

Figure 12:
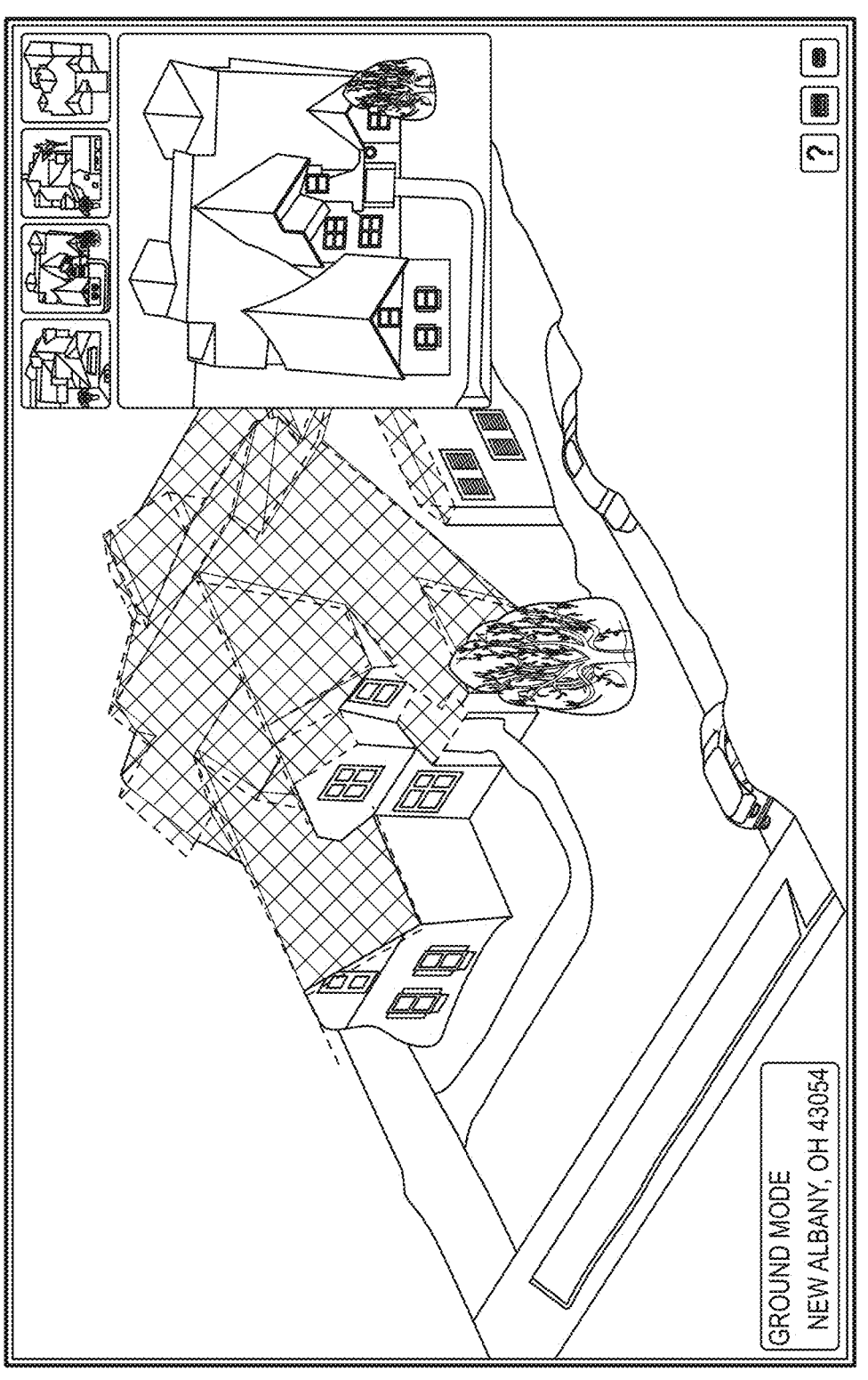
FIG. 12 is a screenshot after an analyst enlarged an image in an embodiment of the present disclosure.

FIG. 12 is a screenshot of the analyst interface after the analyst has clicked a 2D image 1004 to enlarge it in an embodiment of the present disclosure. The analyst may click the 2D image 1004 again to minimize it.

Figure 13:
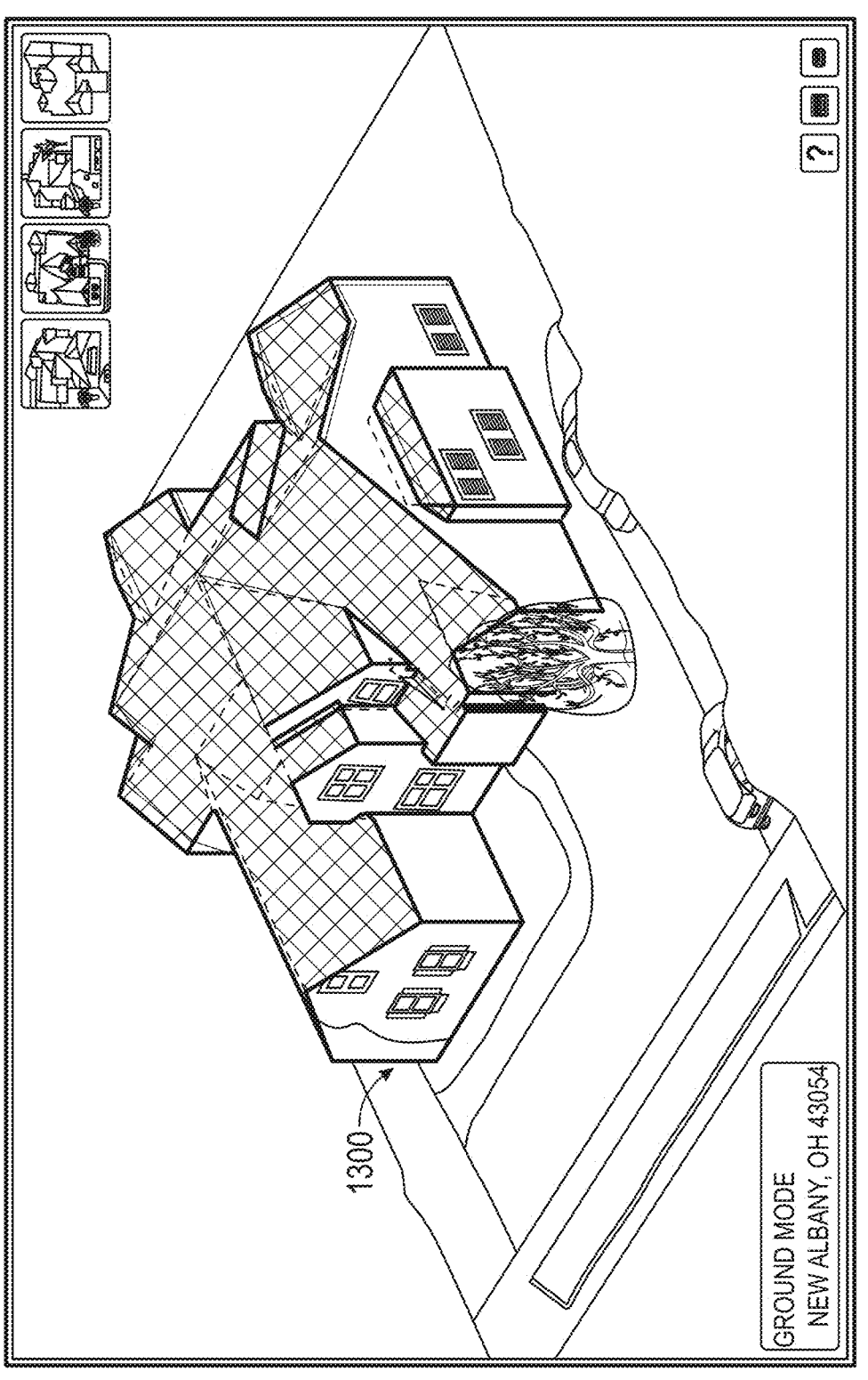
FIG. 13 is a screenshot after an analyst dropped walls in an embodiment of the present disclosure.

FIG. 13 is a screenshot of the analyst interface after the analyst has dropped walls 1300 from roof edges in an embodiment of the present disclosure. The analyst used the ground tool to add walls as explained in FIG. 3.

Figure 14:
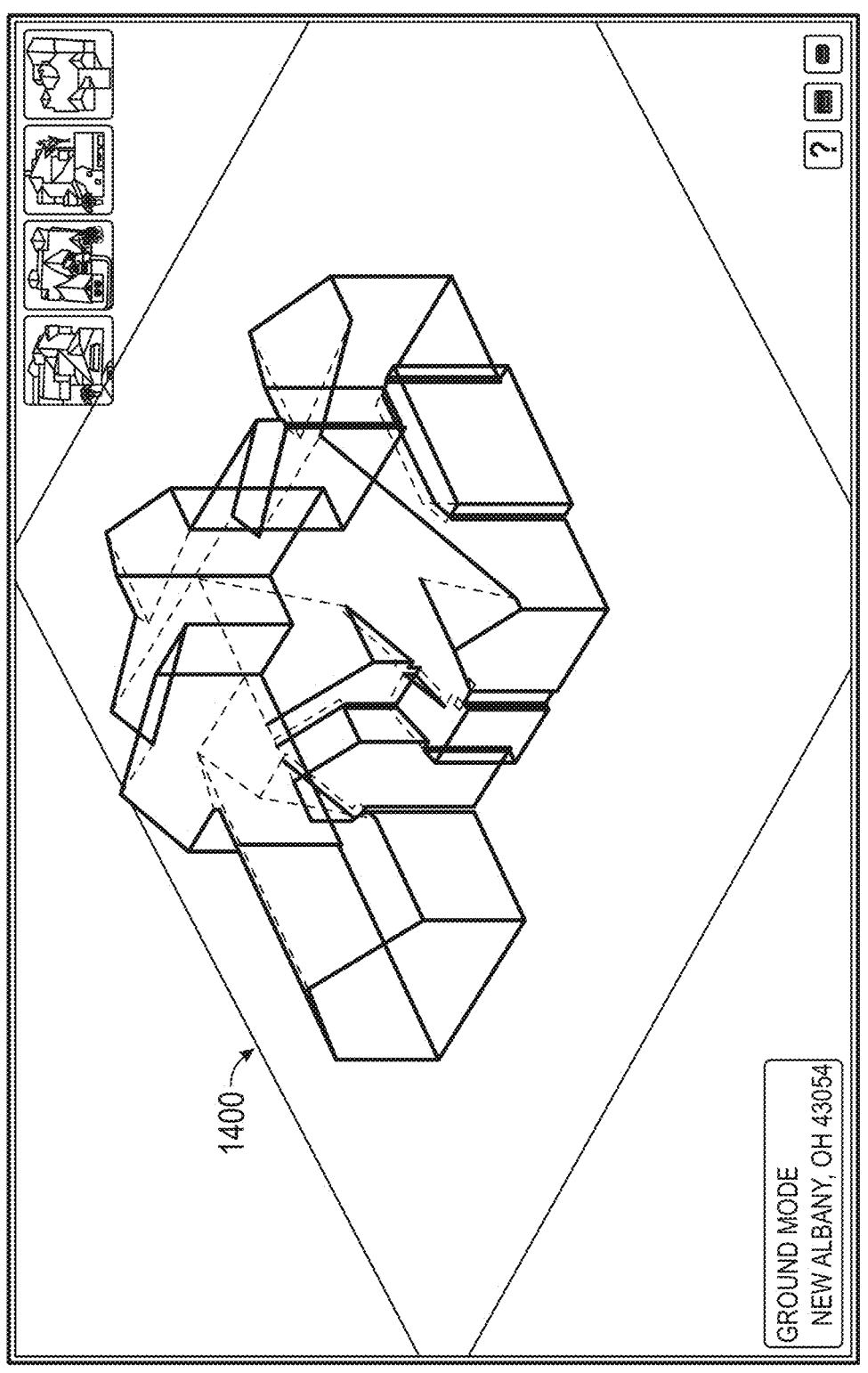
FIG. 14 is a screenshot after an analyst hid the mesh in an embodiment of the present disclosure.

FIG. 14 is a screenshot of the analyst interface after the analyst hid the 3D mesh 1000 in an embodiment of the present disclosure. The application may support toggling the 3D mesh's 1000 visibility (e.g. pressing "h"). The application may display a ground plane 1400 when the 3D mesh 1000 is hidden.

Figure 15:
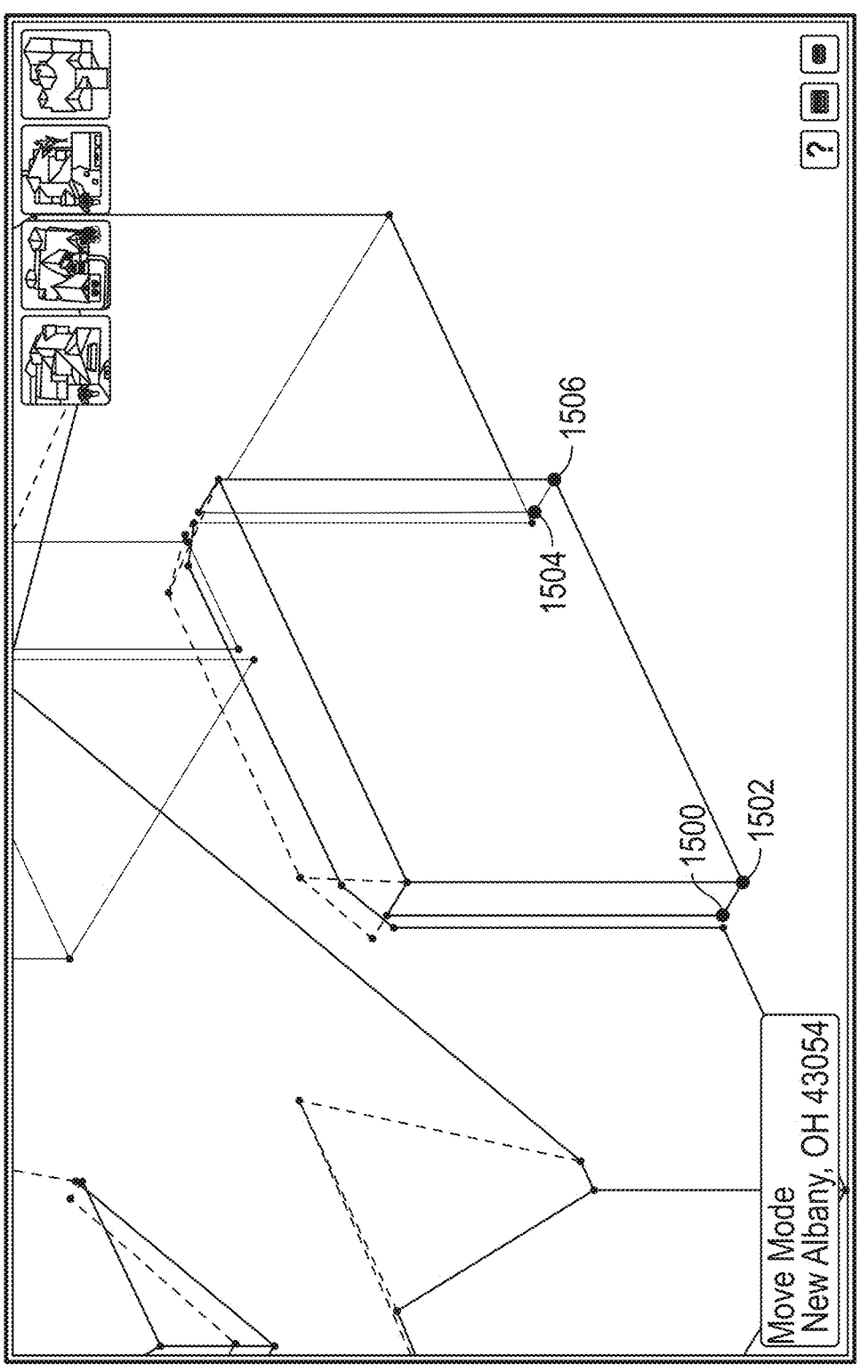
FIG. 15 is a screenshot after an analyst selected vertices to move in an embodiment of the present disclosure.

FIG. 15 is a screenshot of the analyst interface after the analyst has selected vertices 1500, 1502, 1504, and 1506 to move in an embodiment of the present disclosure. The analyst is using the move tool to move vertices as explained in FIG. 4.

Figure 16:
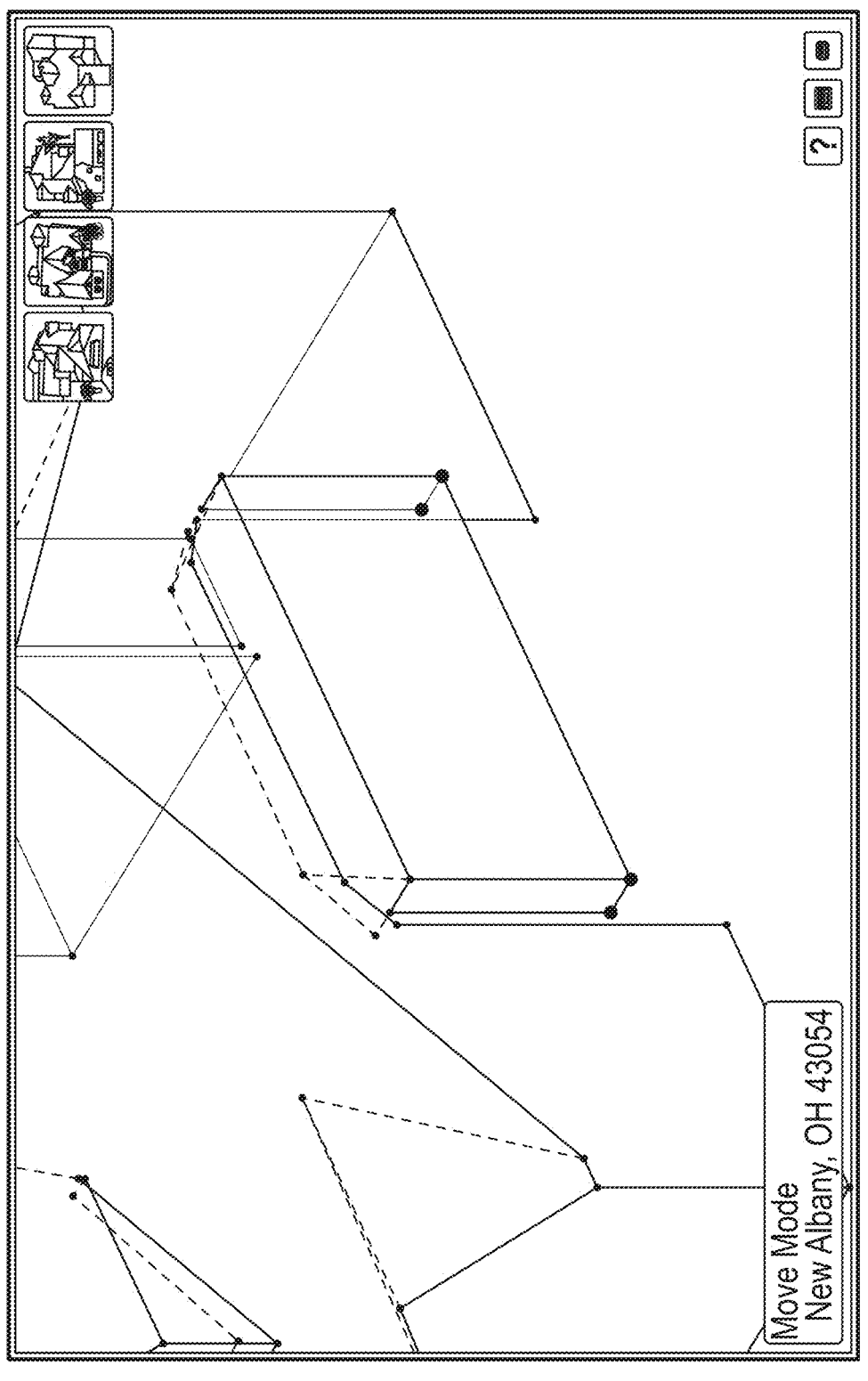
FIG. 16 is a screenshot after an analyst moved vertices in an embodiment of the present disclosure.

FIG. 16 is a screenshot of the analyst interface after the analyst has moved vertices 1500, 1502, 1504, and 1506 in an embodiment of the present disclosure. The analyst used the move tool to move vertices as explained in FIG. 4.

Figure 17:
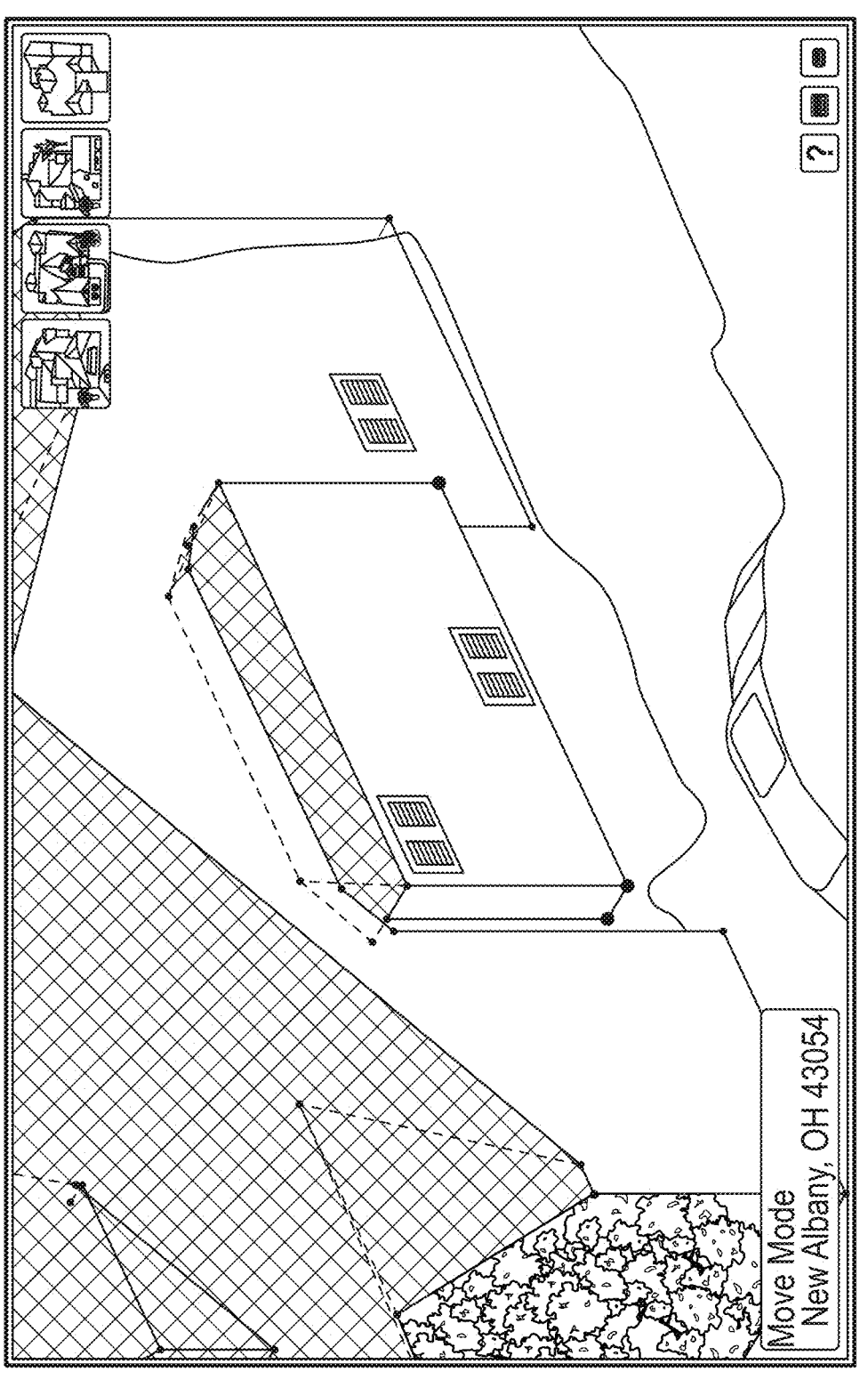
FIG. 17 is a screenshot after an analyst showed the mesh in an embodiment of the present disclosure.

FIG. 17 is a screenshot of the analyst interface after the analyst toggled the 3D mesh 1000 in an embodiment of the present disclosure. After moving vertices, the analyst, for example, pressed "h" to show the 3D mesh 1000.

Figure 18:
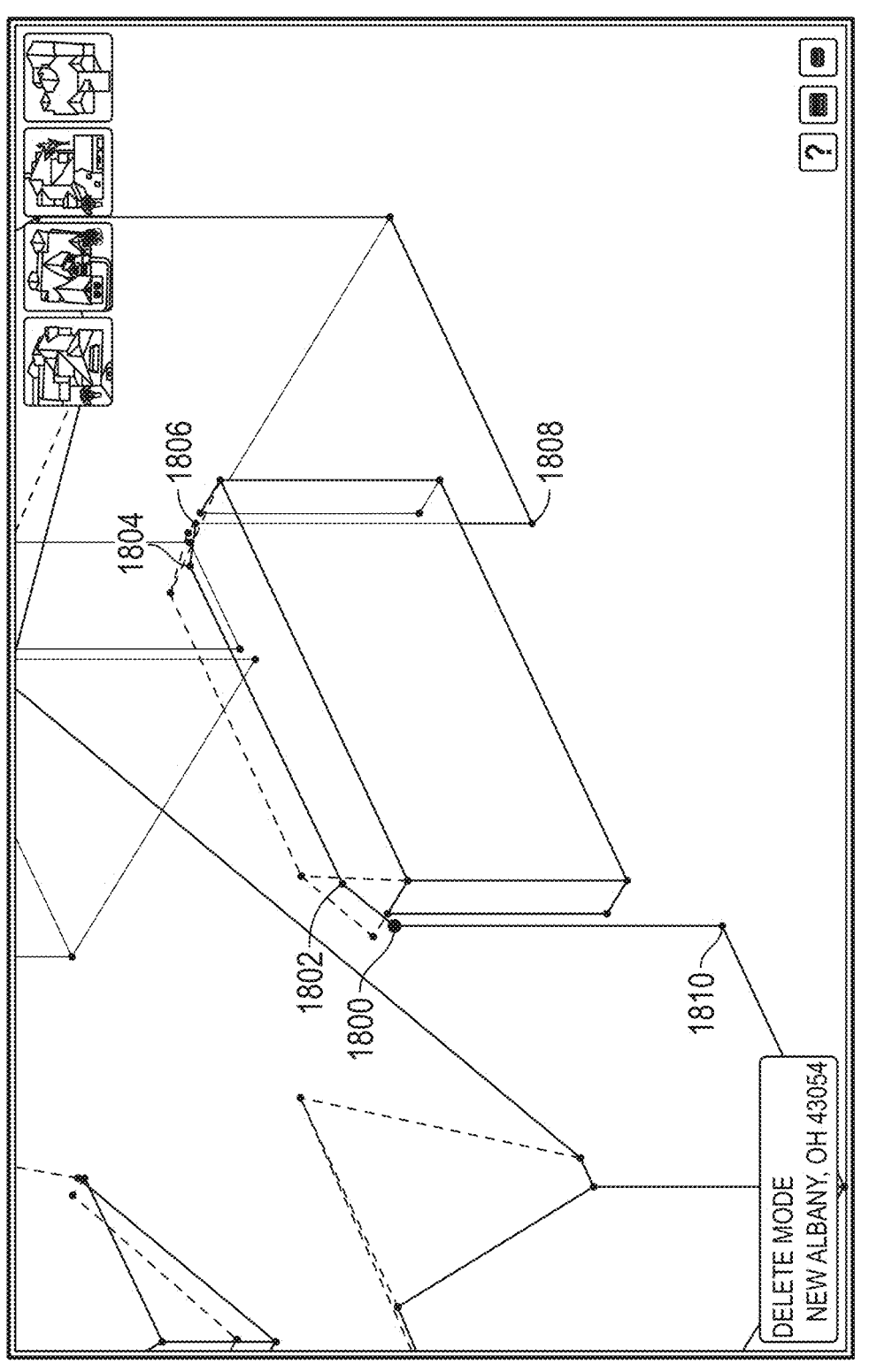
FIG. 18 is a screenshot after an analyst selected a vertex to delete in an embodiment of the present disclosure.

FIG. 18 is a screenshot of the analyst interface after the analyst has selected a vertex 1800 to delete in an embodiment of the present disclosure. The analyst selected a vertex to delete using the delete tool as described in FIG. 7.

Figure 19:
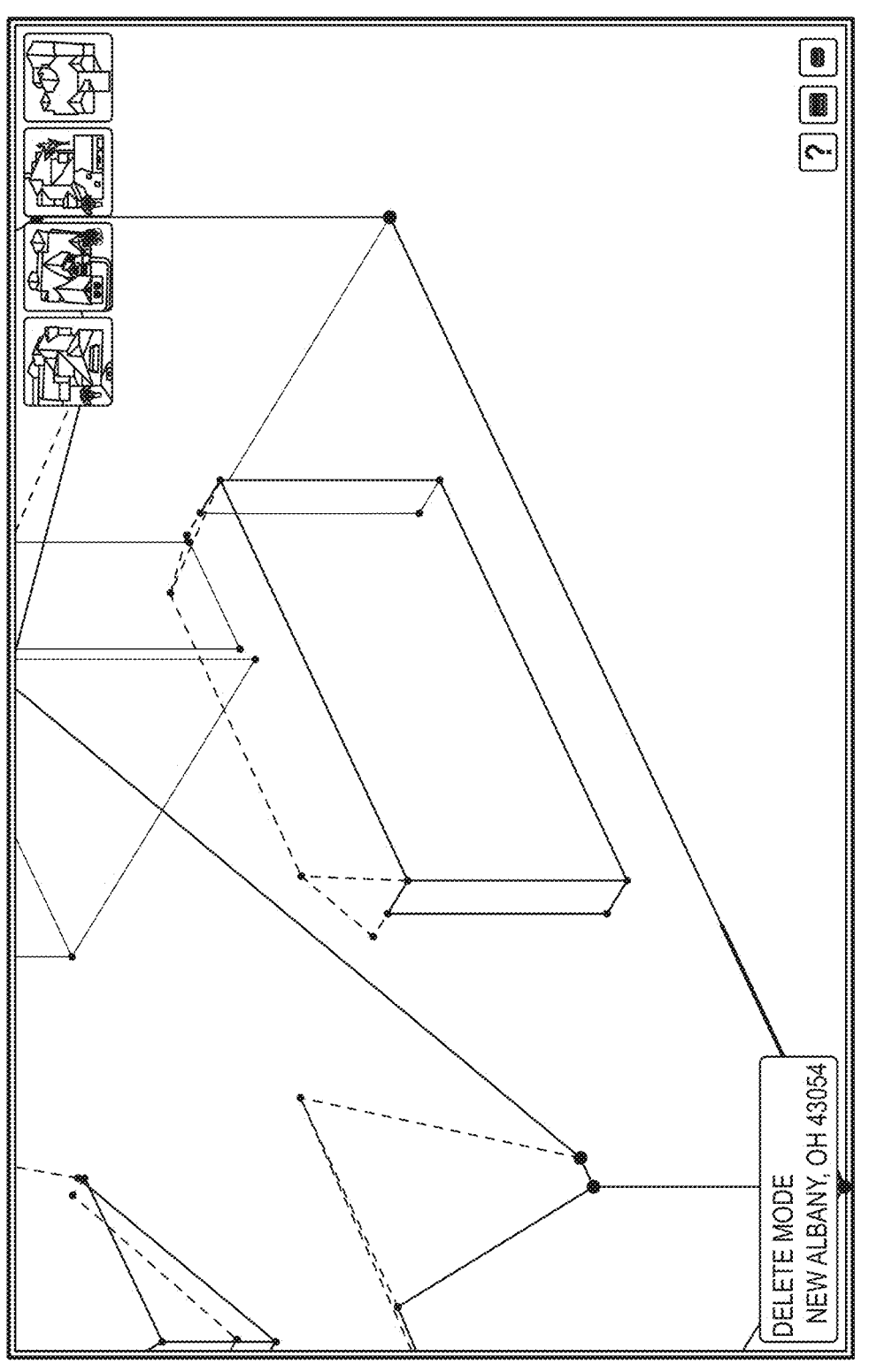
FIG. 19 is a screenshot after an analyst deleted vertices in an embodiment of the present disclosure.

FIG. 19 is a screenshot of the analyst interface after the analyst has deleted vertices 1800, 1802, 1804, 1806, 1808, and 1810 in an embodiment of the present disclosure. The analyst deleted wall vertices using the delete tool as described in FIG. 7.

Figure 20:
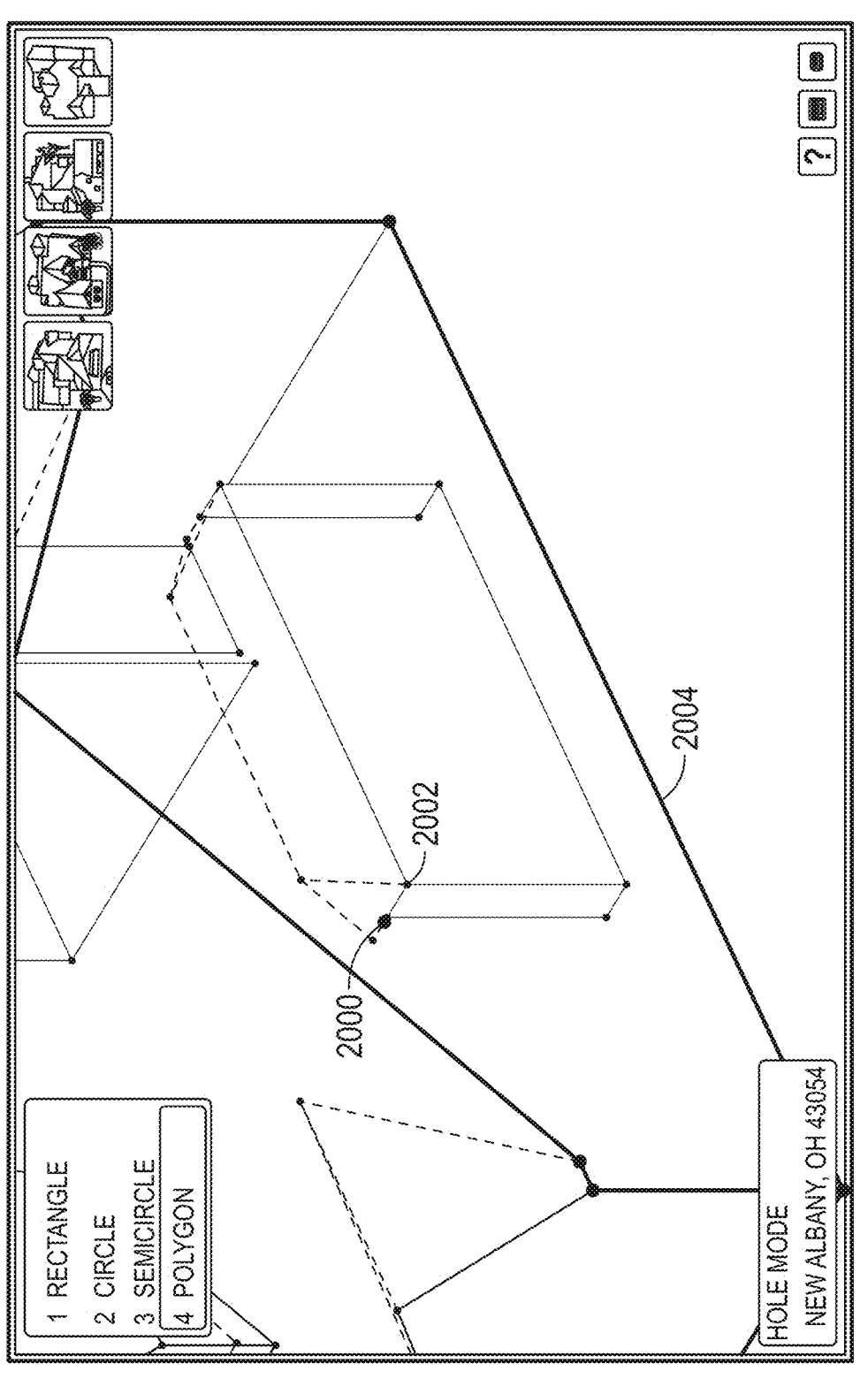
FIG. 20 is a screenshot after an analyst added a hole vertex in an embodiment of the present disclosure.

FIG. 20 is a screenshot of the analyst interface after the analyst has added a hole vertex 2000 in an embodiment of the present disclosure. The analyst is using the hole tool as described in FIG. 6. The analyst hovered over a wall vertex 2002 and the hole vertex 2000 snapped to the active wall 2004.

Figure 21:
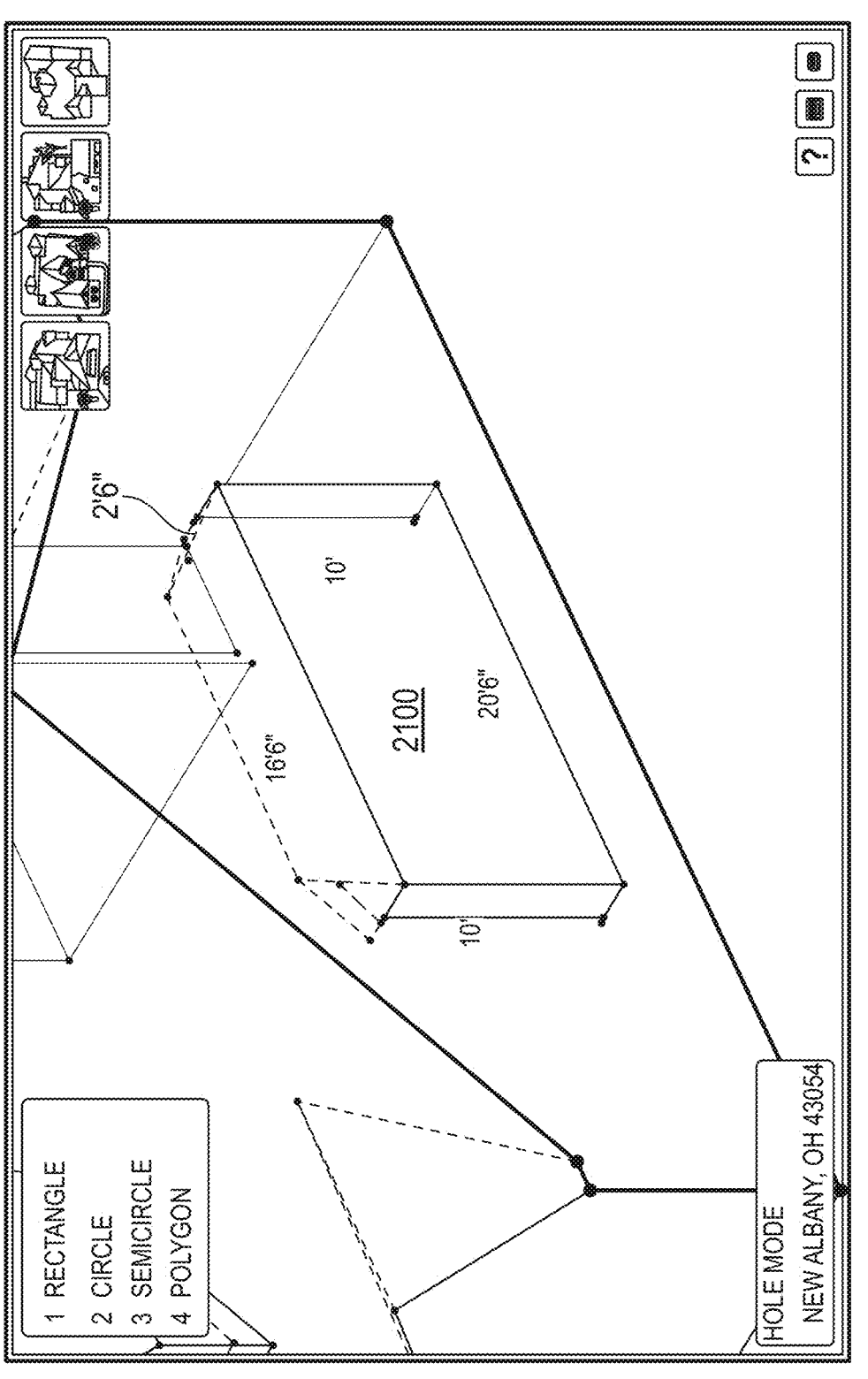
FIG. 21 is a screenshot after an analyst added a hole in an embodiment of the present disclosure.

FIG. 21 is a screenshot of the analyst interface after the analyst has added a hole 2100 in an embodiment of the present disclosure. The analyst used the hole tool as described in FIG. 6 to draw a hole in the active wall.

Figure 22:
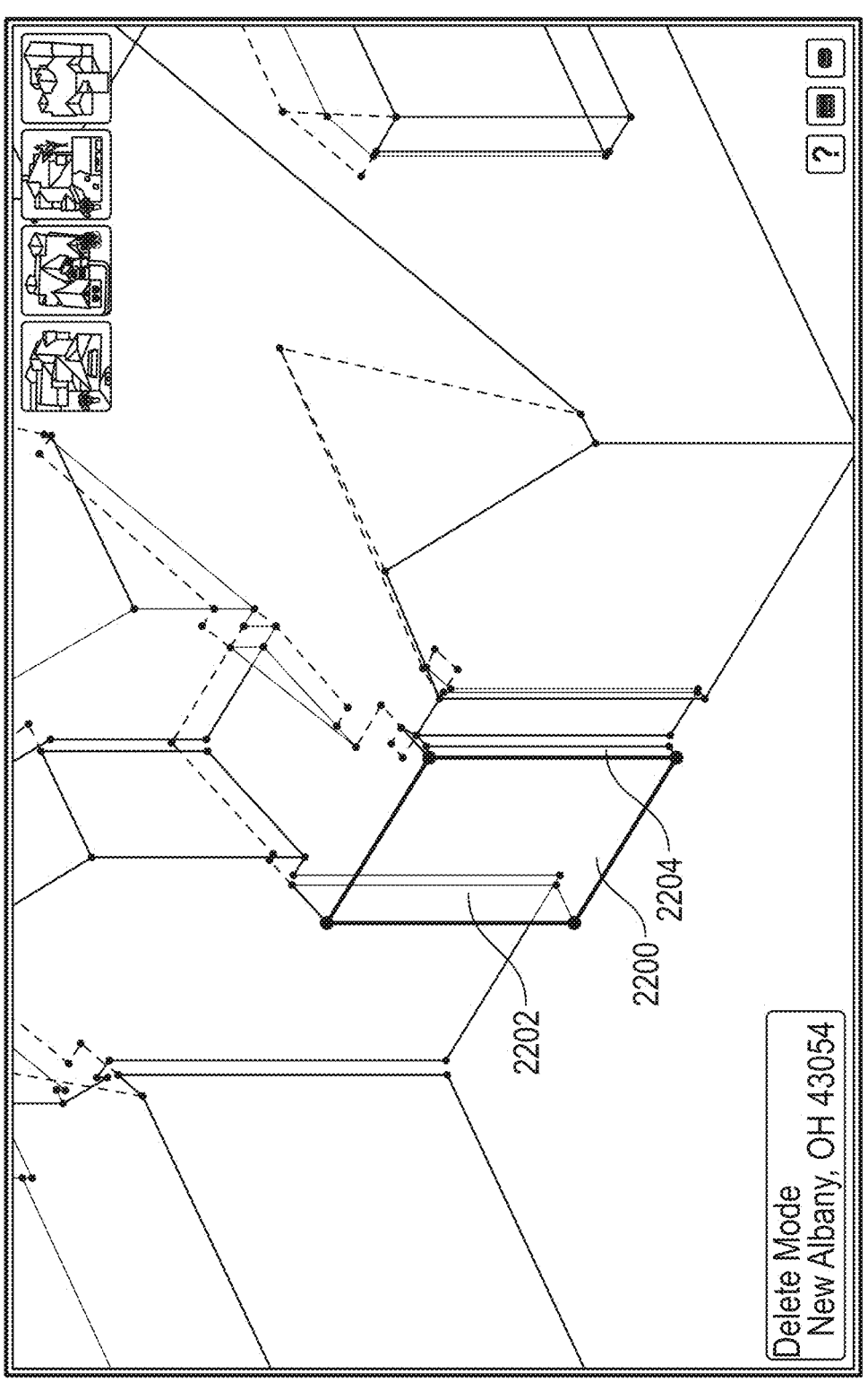
FIG. 22 is a screenshot after an analyst selected a wall to delete in an embodiment of the present disclosure.

FIG. 22 is a screenshot of the analyst interface after the analyst has selected a wall to delete 2200 in an embodiment of the present disclosure. The analyst is using the delete tool as described in FIG. 7.

Figure 23:
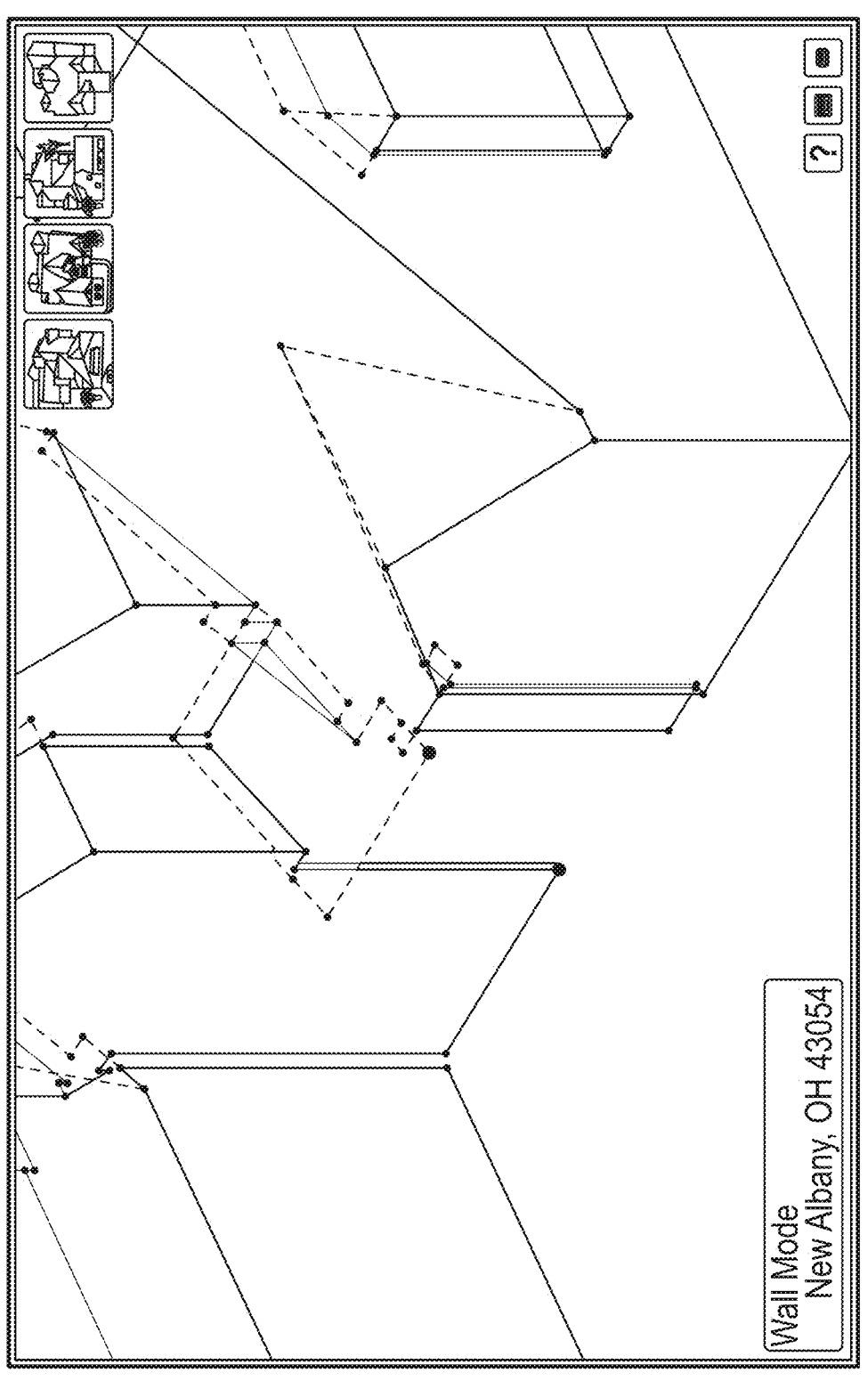
FIG. 23 is a screenshot after an analyst deleted walls in an embodiment of the present disclosure.

FIG. 23 is a screenshot of the analyst interface after the analyst has deleted walls 2200, 2202, and 2204 in an embodiment of the present disclosure. The analyst used the delete tool as described in FIG. 7.

Figure 24:
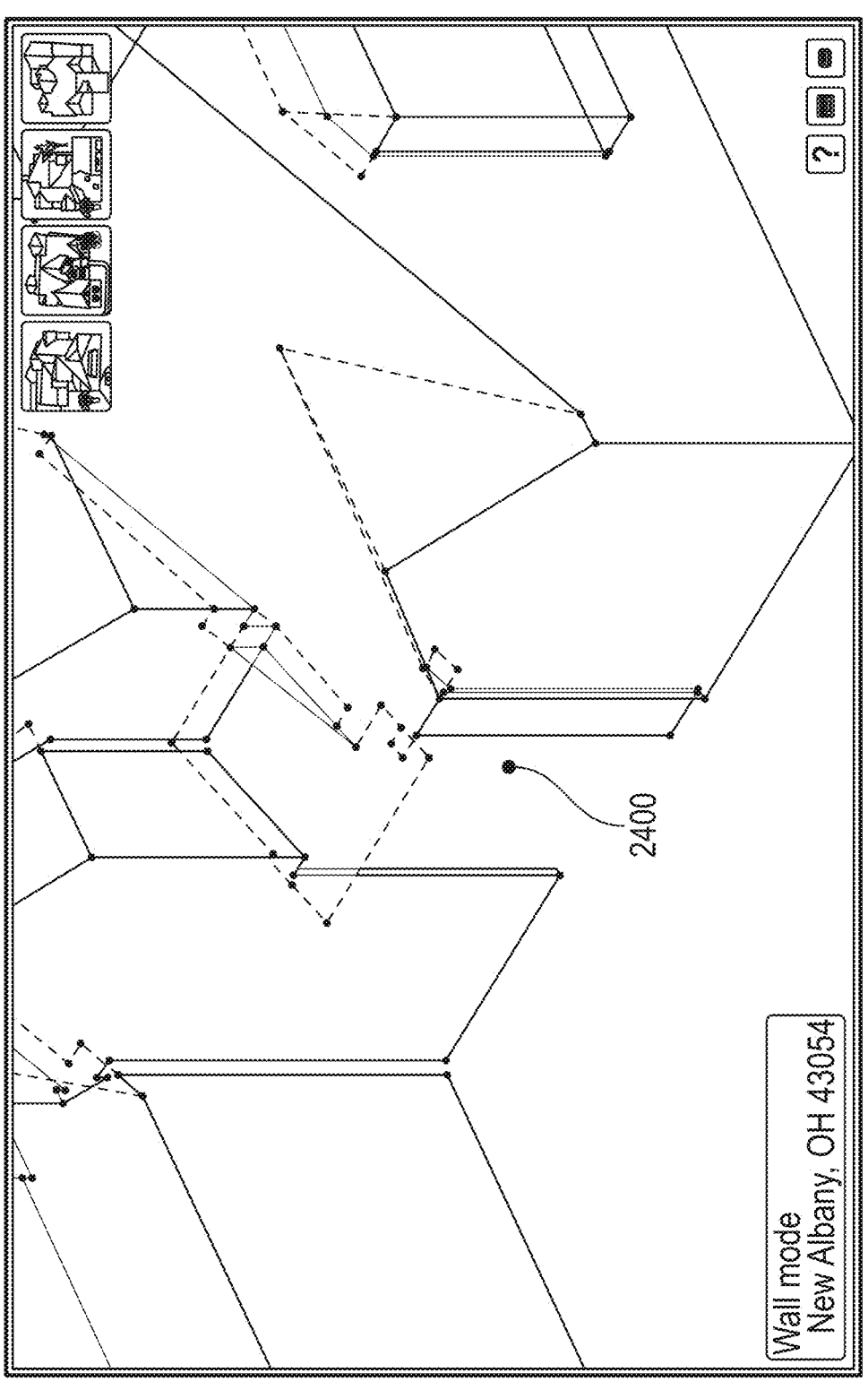
FIG. 24 is a screenshot after an analyst added a wall vertex in an embodiment of the present disclosure.

FIG. 24 is a screenshot of the analyst interface after the analyst has added a wall vertex 2400 in an embodiment of the present disclosure. The analyst is using the wall tool as described in FIG. 5.

Figure 25:
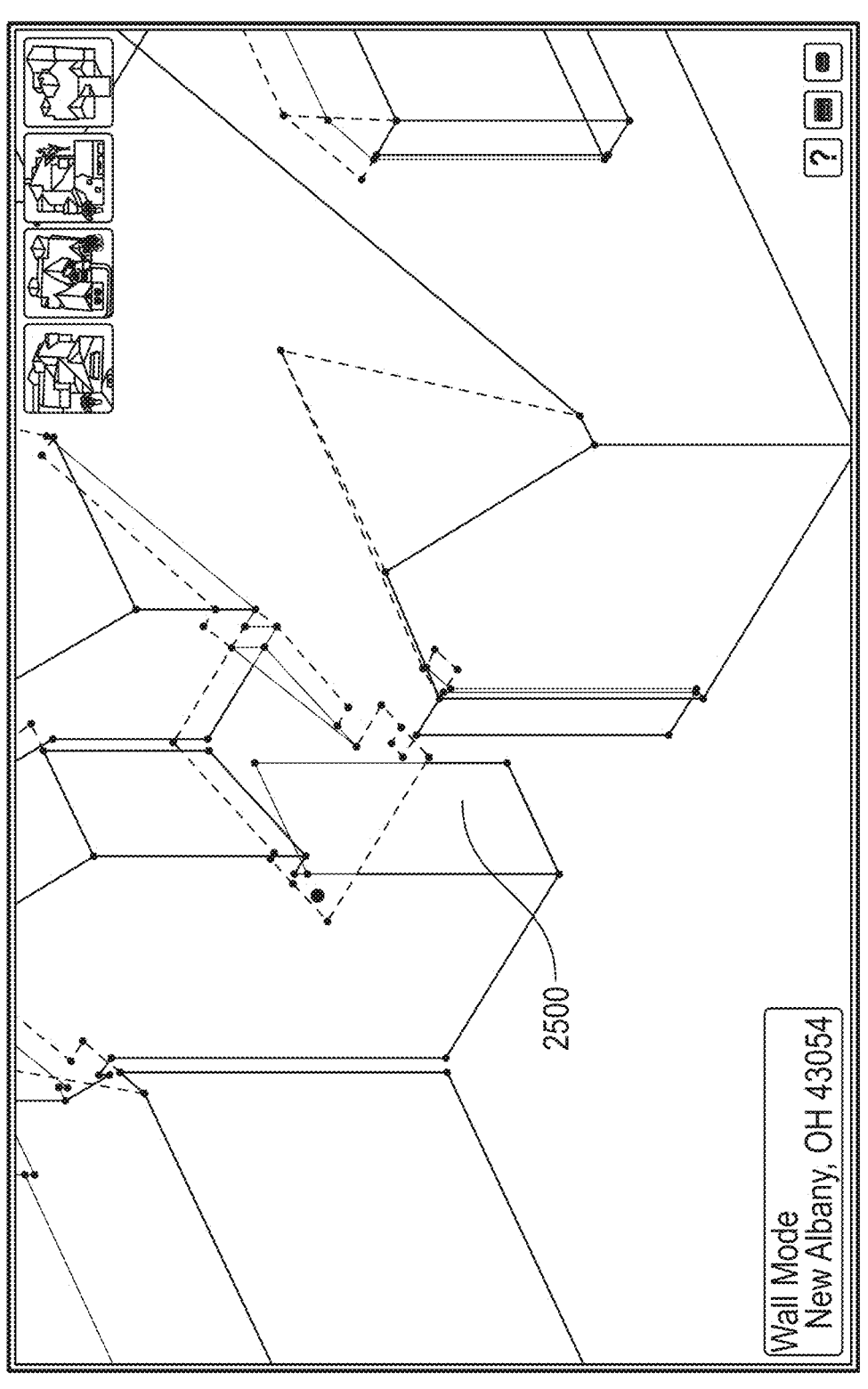
FIG. 25 is a screenshot after an analyst added a wall in an embodiment of the present disclosure.

FIG. 25 is a screenshot of the analyst interface after the analyst has added a wall 2500 in an embodiment of the present disclosure. The analyst used the wall tool as described in FIG. 5.

Figure 26:
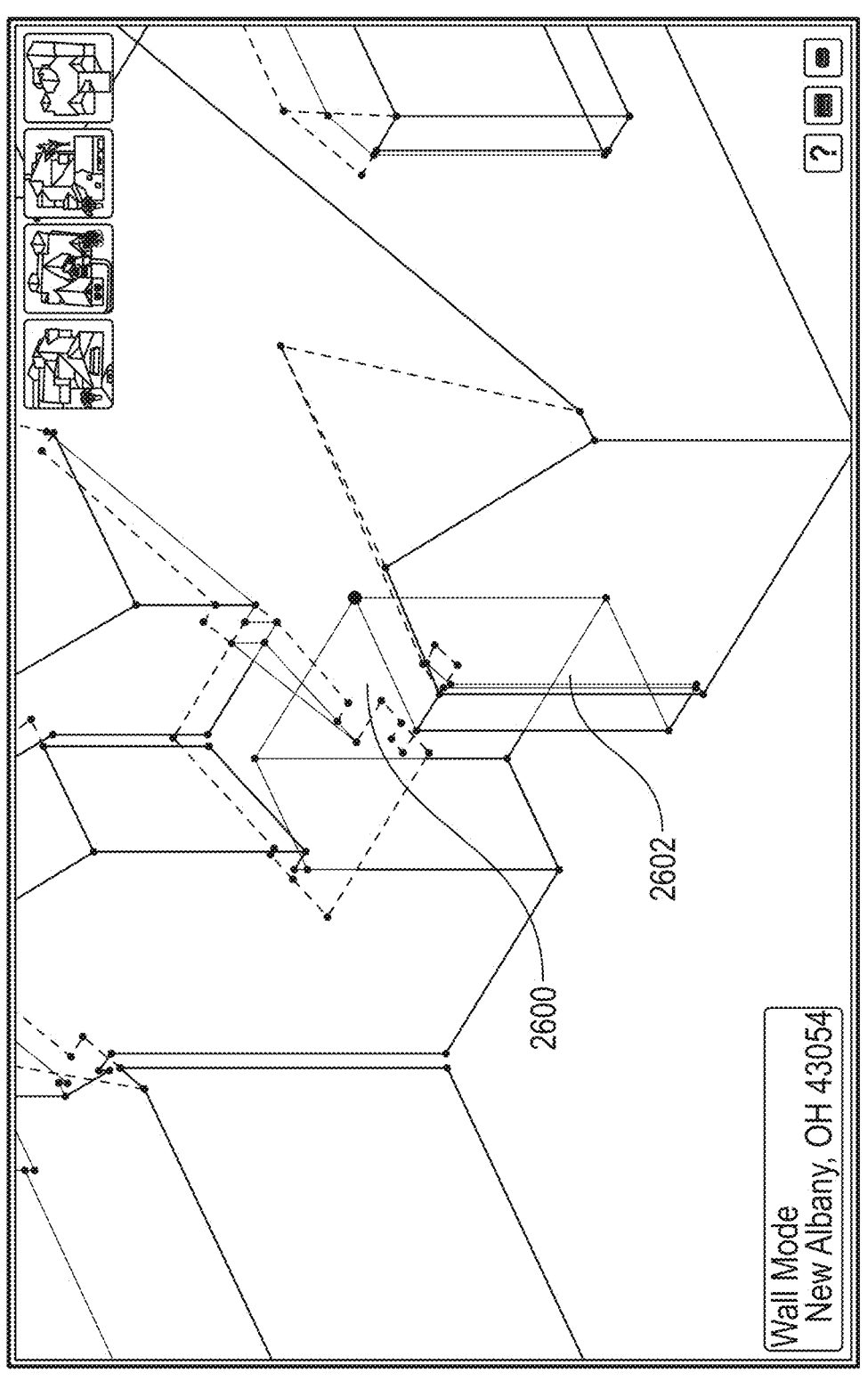
FIG. 26 is a screenshot after an analyst added walls in an embodiment of the present disclosure.

FIG. 26 is a screenshot of the analyst interface after the analyst has added walls 2600 and 2602 in an embodiment of the present disclosure. The analyst used the wall tool as described in FIG. 5.

Figure 27:
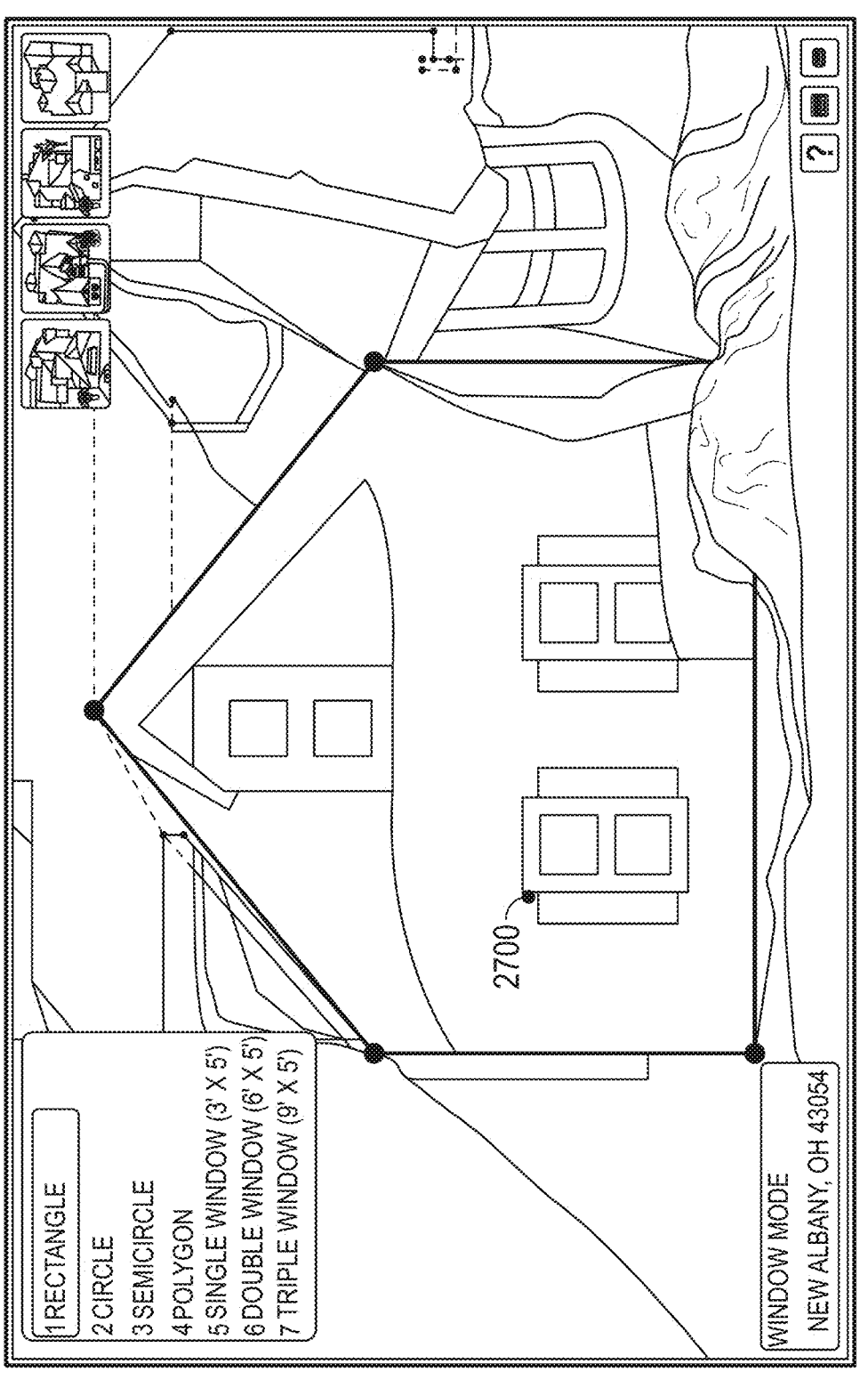
FIG. 27 is a screenshot after an analyst added a window vertex in an embodiment of the present disclosure.

FIG. 27 is a screenshot of the analyst interface after the analyst has added a window vertex 2700 in an embodiment of the present disclosure. The analyst is using the window tool as described in FIG. 6.

Figure 28:
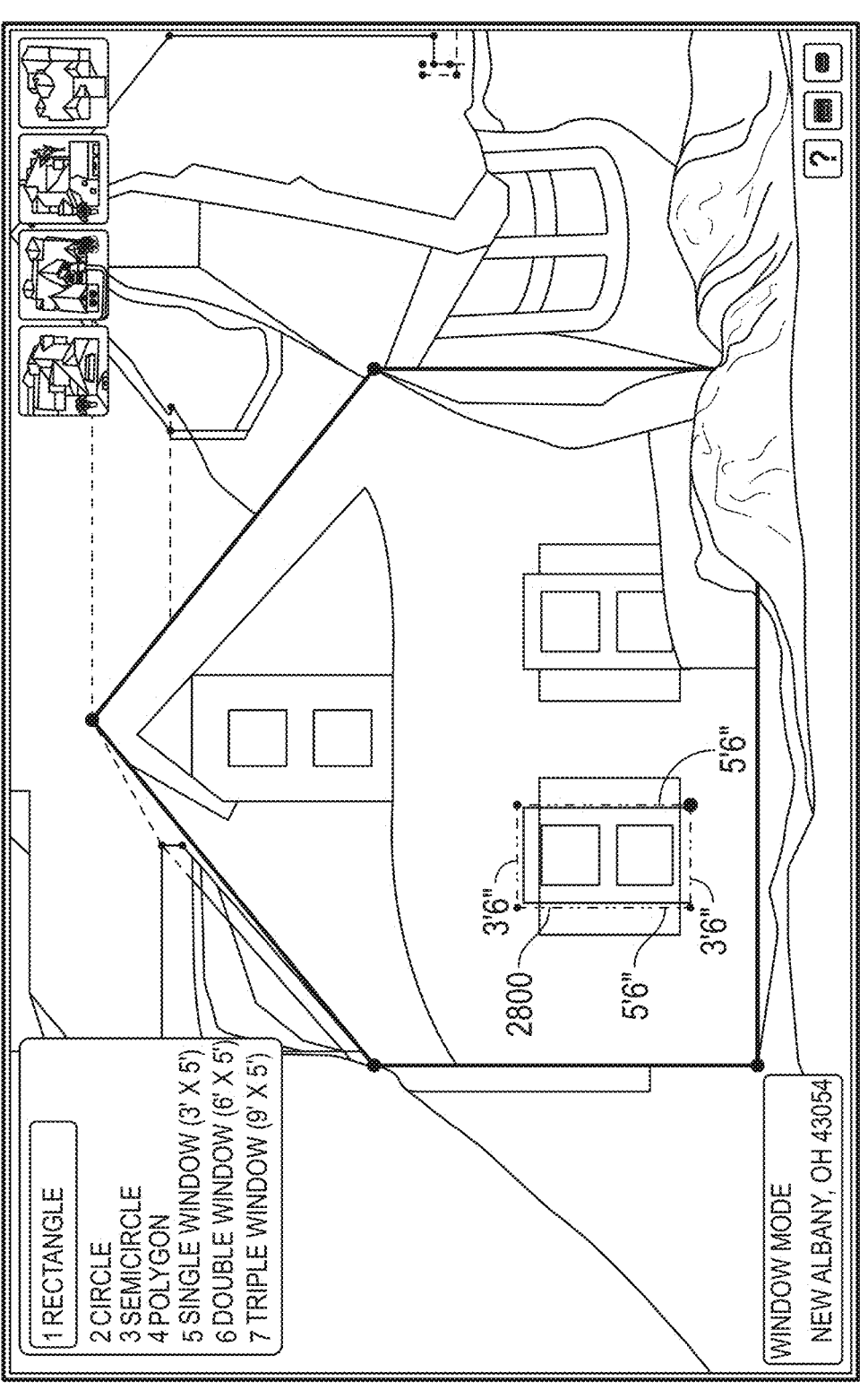
FIG. 28 is a screenshot after an analyst added a first window in an embodiment of the present disclosure.

FIG. 28 is a screenshot of the analyst interface after the analyst has added a first window 2800 in an embodiment of the present disclosure. The analyst is using the window tool as described in FIG. 6.

Figure 29:
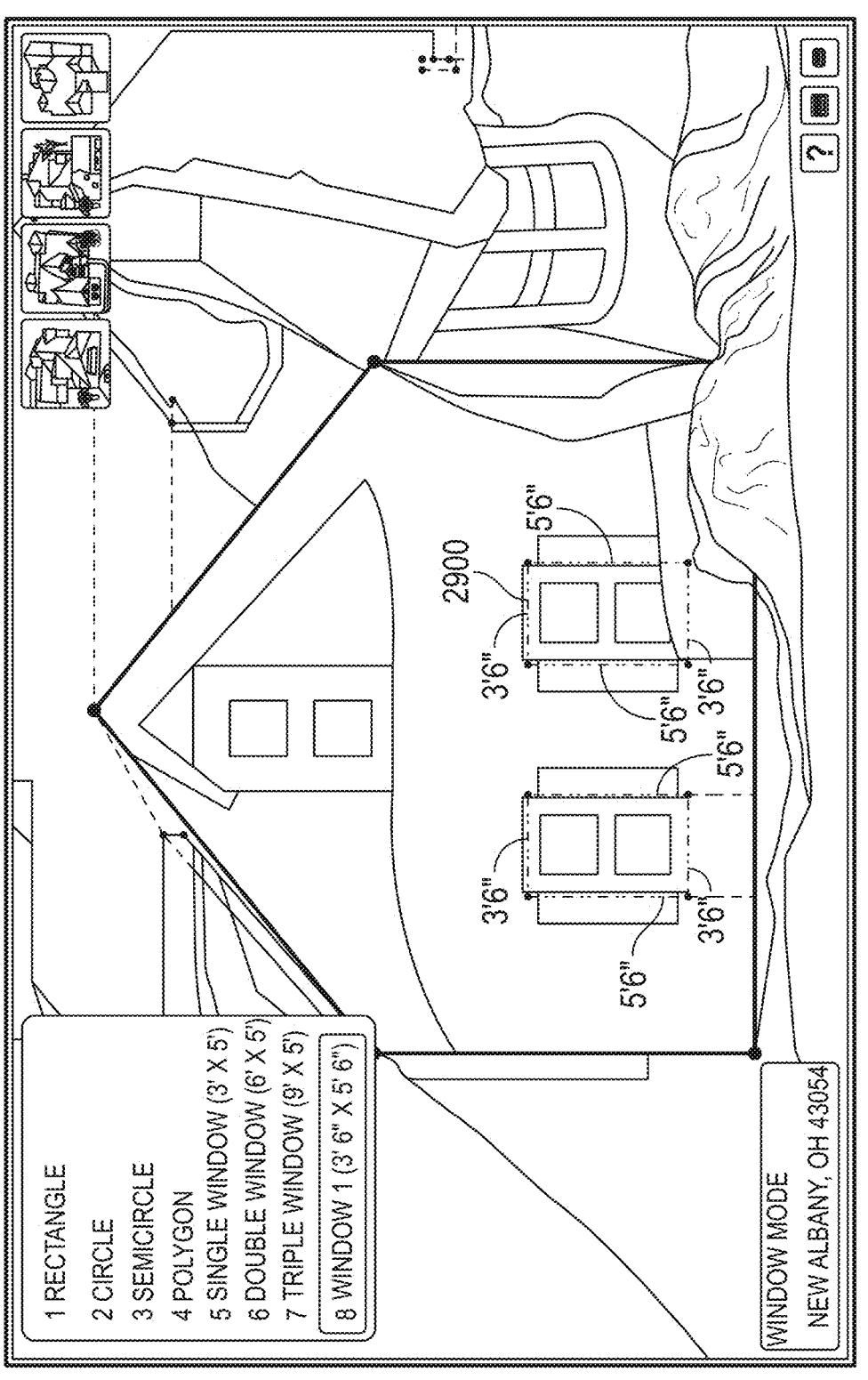
FIG. 29 is a screenshot after an analyst added a second window in an embodiment of the present disclosure.

FIG. 29 is a screenshot of the analyst interface after the analyst has added a second window 2900 in an embodiment of the present disclosure. The analyst is using the window tool as described in FIG. 6.

Figure 30:
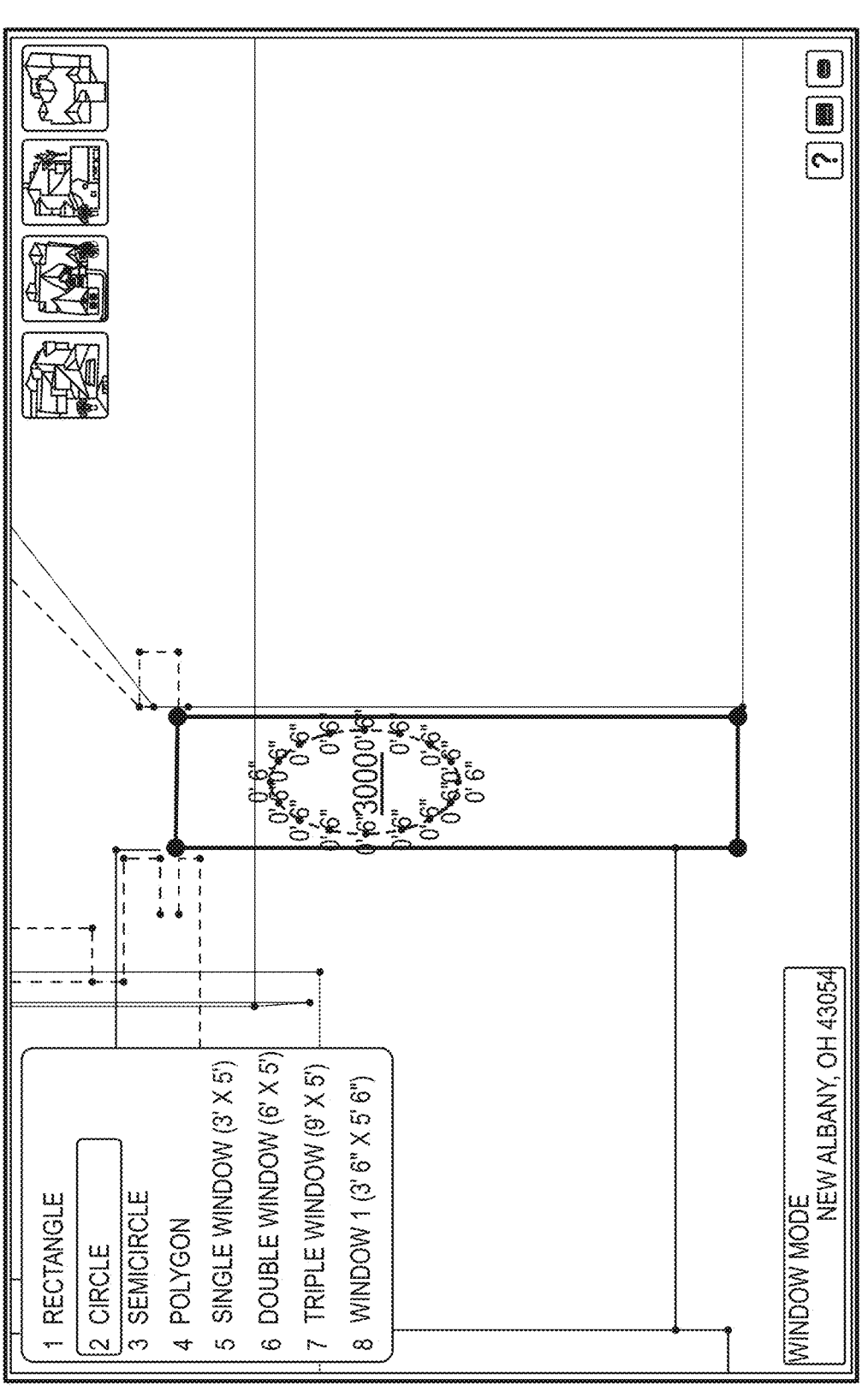
FIG. 30 is a screenshot after an analyst added a round window in an embodiment of the present disclosure.

FIG. 30 is a screenshot of the analyst interface after the analyst has added a round window 3000 in an embodiment of the present disclosure. The analyst is using the window tool as described in FIG. 6.

Figure 31:
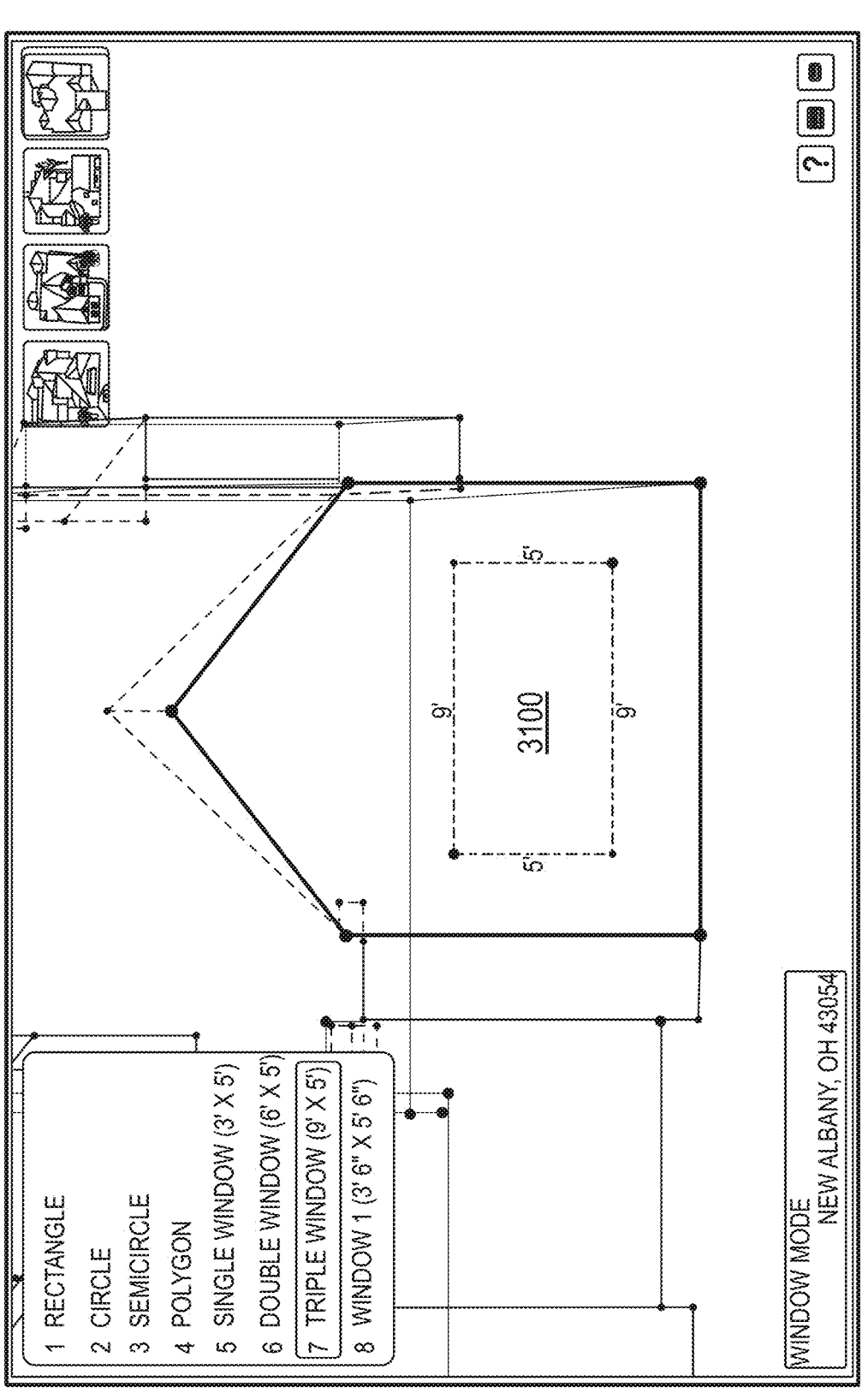
FIG. 31 is a screenshot after an analyst added a triple window in an embodiment of the present disclosure.

FIG. 31 is a screenshot of the analyst interface after the analyst has added a triple window 3100 in an embodiment of the present disclosure. The analyst is using the window tool as described in FIG. 6.

Figure 32:
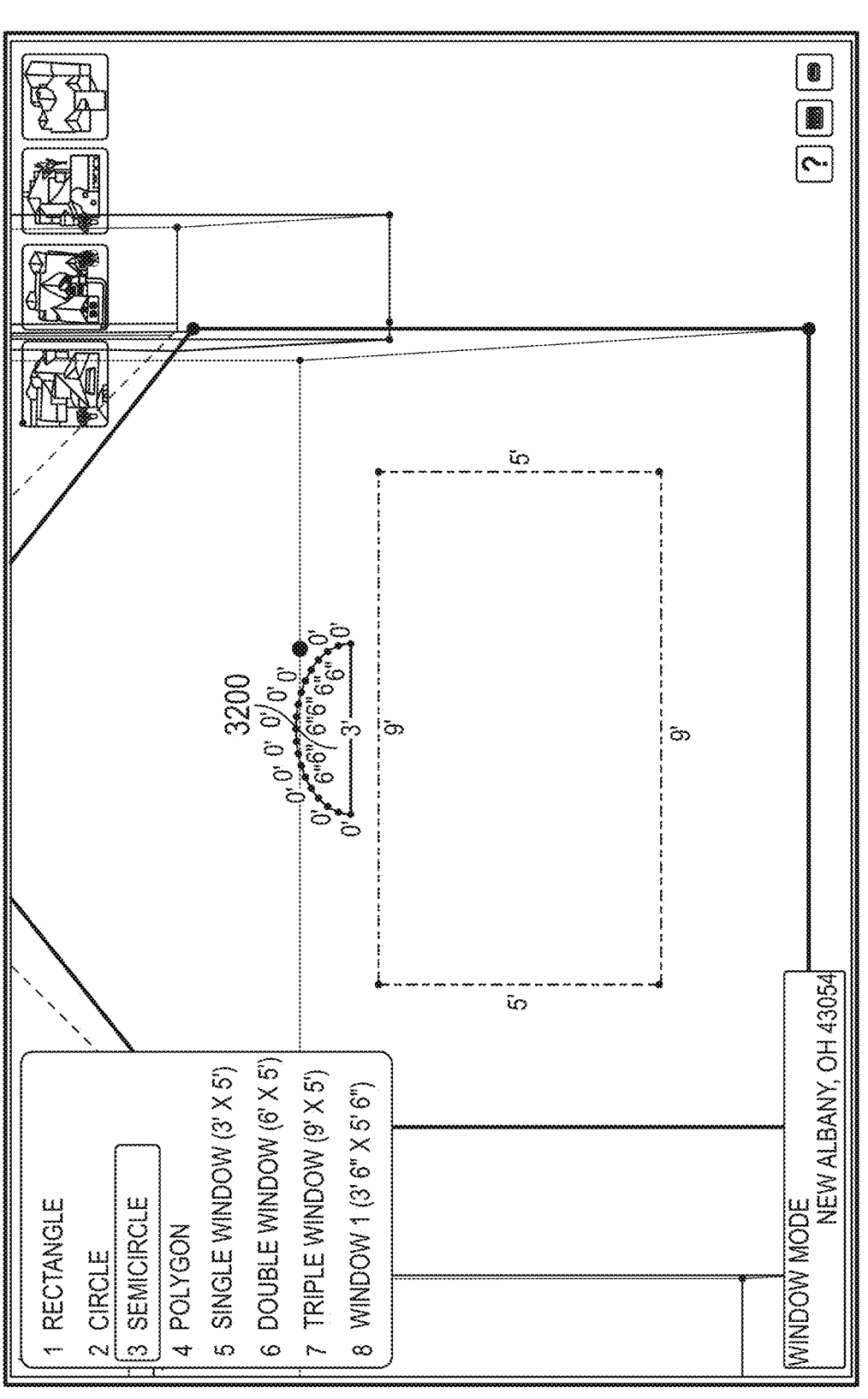
FIG. 32 is a screenshot after an analyst added a semicircular window in an embodiment of the present disclosure.

FIG. 32 is a screenshot of the analyst interface after the analyst has added a semicircular window 3200 in an embodiment of the present disclosure. The analyst is using the window tool as described in FIG. 6.

Figure 33:
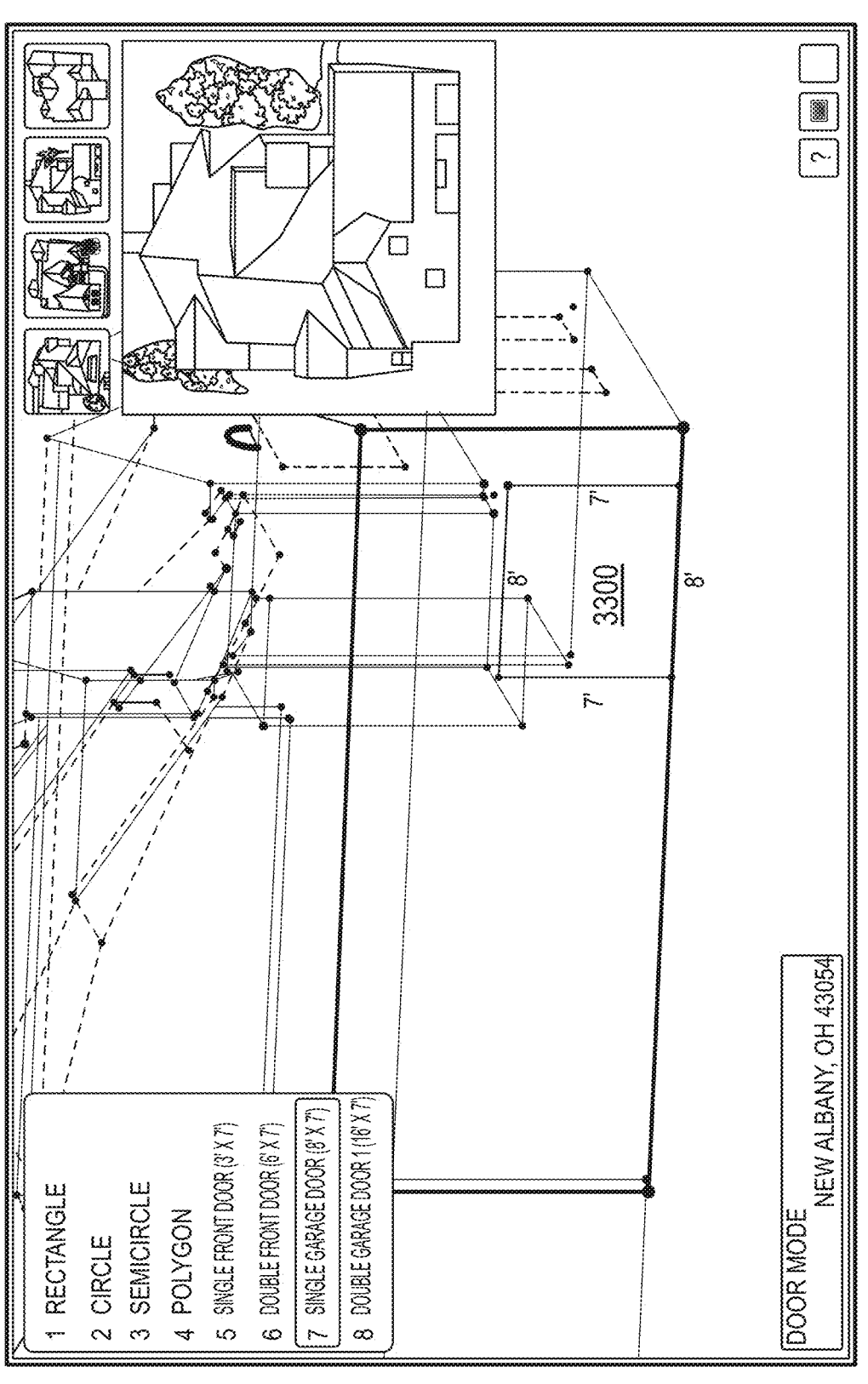
FIG. 33 is a screenshot after an analyst added a single garage door in an embodiment of the present disclosure.

FIG. 33 is a screenshot of the analyst interface after the analyst has added a single garage door 3300 in an embodiment of the present disclosure. The analyst is using the door tool as described in FIG. 6.

Figure 34:
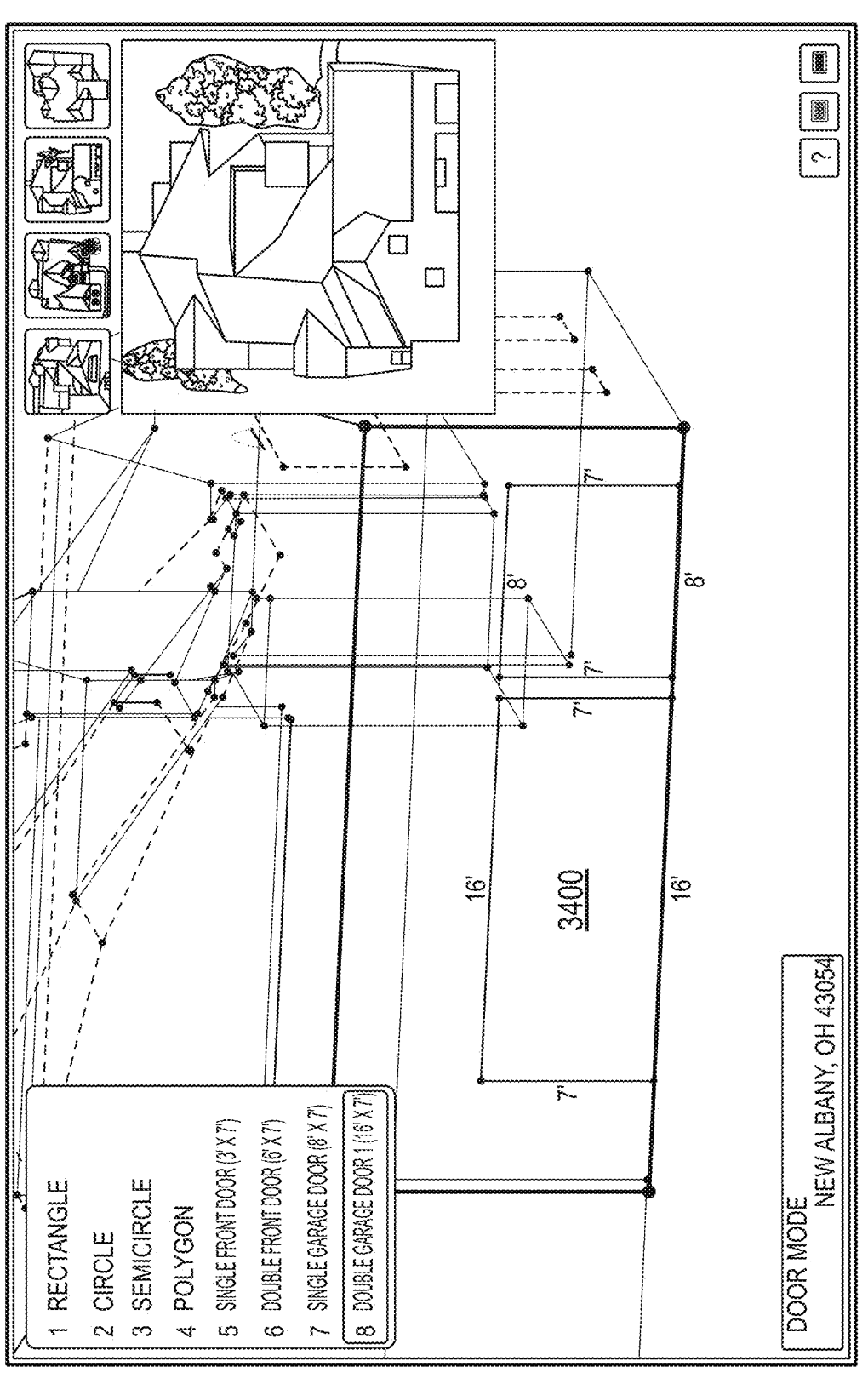
FIG. 34 is a screenshot after an analyst added a double garage door in an embodiment of the present disclosure.

FIG. 34 is a screenshot of the analyst interface after the analyst has added a double garage door 3400 in an embodiment of the present disclosure. The analyst is using the door tool as described in FIG. 6.

FIG. 35 is a screenshot of the analyst interface after the analyst has displayed wall information in an embodiment of the present disclosure. The wall information may include edge lengths 3500 and a wall area 3502. The analyst is using the information tool as described in FIG. 8.

FIG. 36 is a screenshot of the analyst interface after the analyst has displayed window information in an embodiment of the present disclosure. The window information may include edge lengths 3600 and a window area 3602. The analyst is using the information tool as described in FIG. 8.

Figure 37:
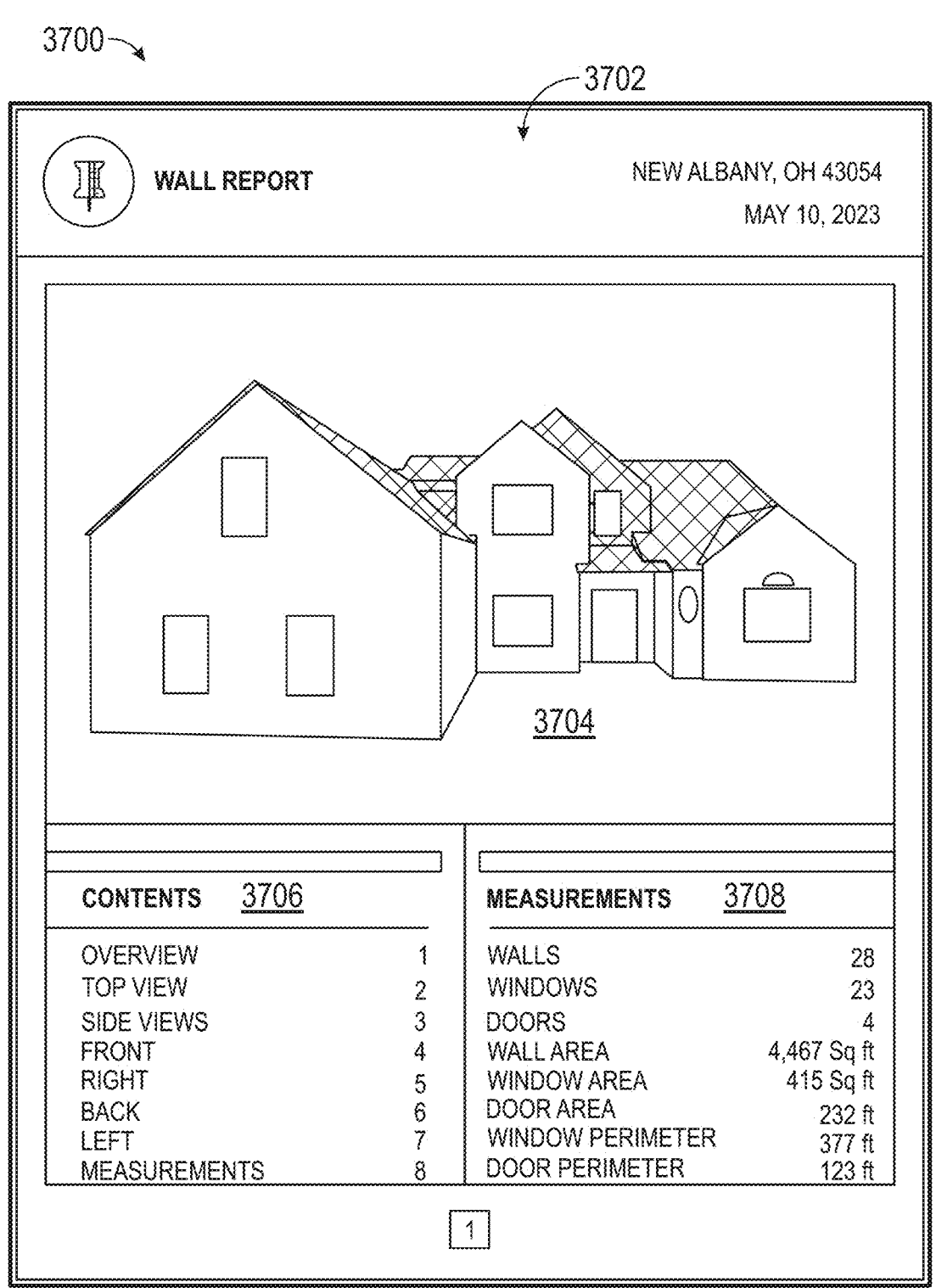
FIG. 37 is a screenshot of a wall report's overview page in an embodiment of the present disclosure.

FIG. 37 is a screenshot of a wall report's overview page in an embodiment of the present disclosure. This is part of the wall report described in FIG. 9. The overview page may include a title 3700, heading 3702, diagram 3704, table of contents 3706, and measurements 3708. The heading 3702 may include the property address and current date. The diagram 3704 may be a 3D rendering of the property including roof, walls, windows, and doors. The measurements 3708 may include wall count, window count, door count, wall area, window area, door area, window perimeter, and/or door perimeter, as described above.

Figure 38:
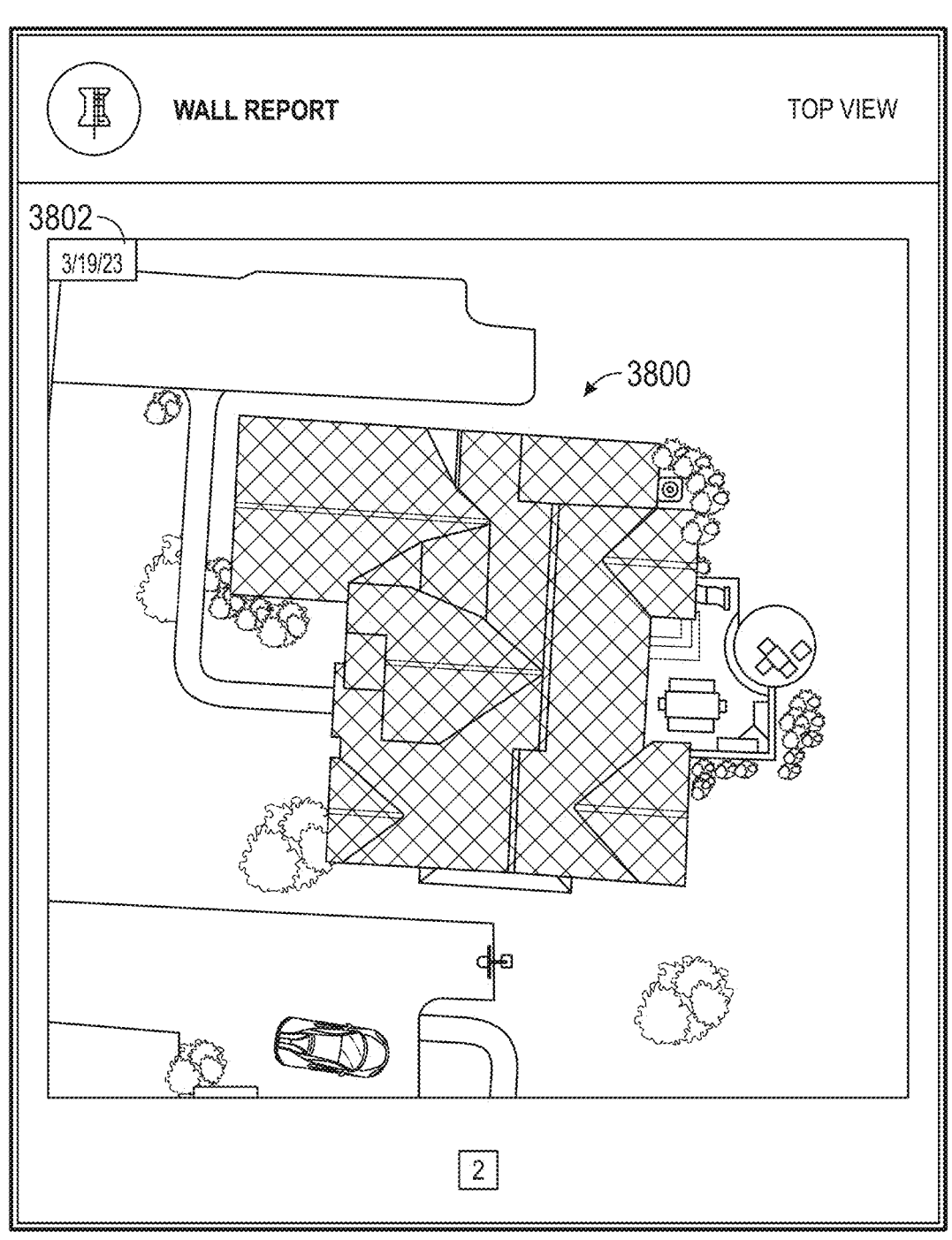
FIG. 38 is a screenshot of a wall report's top view page in an embodiment of the present disclosure.

FIG. 38 is a screenshot of a wall report's top view page in an embodiment of the present disclosure. This is part of the wall report described in FIG. 9. The top view page may include an overhead aerial image 3800. The page may also include an image capture date 3802.

Figure 39:
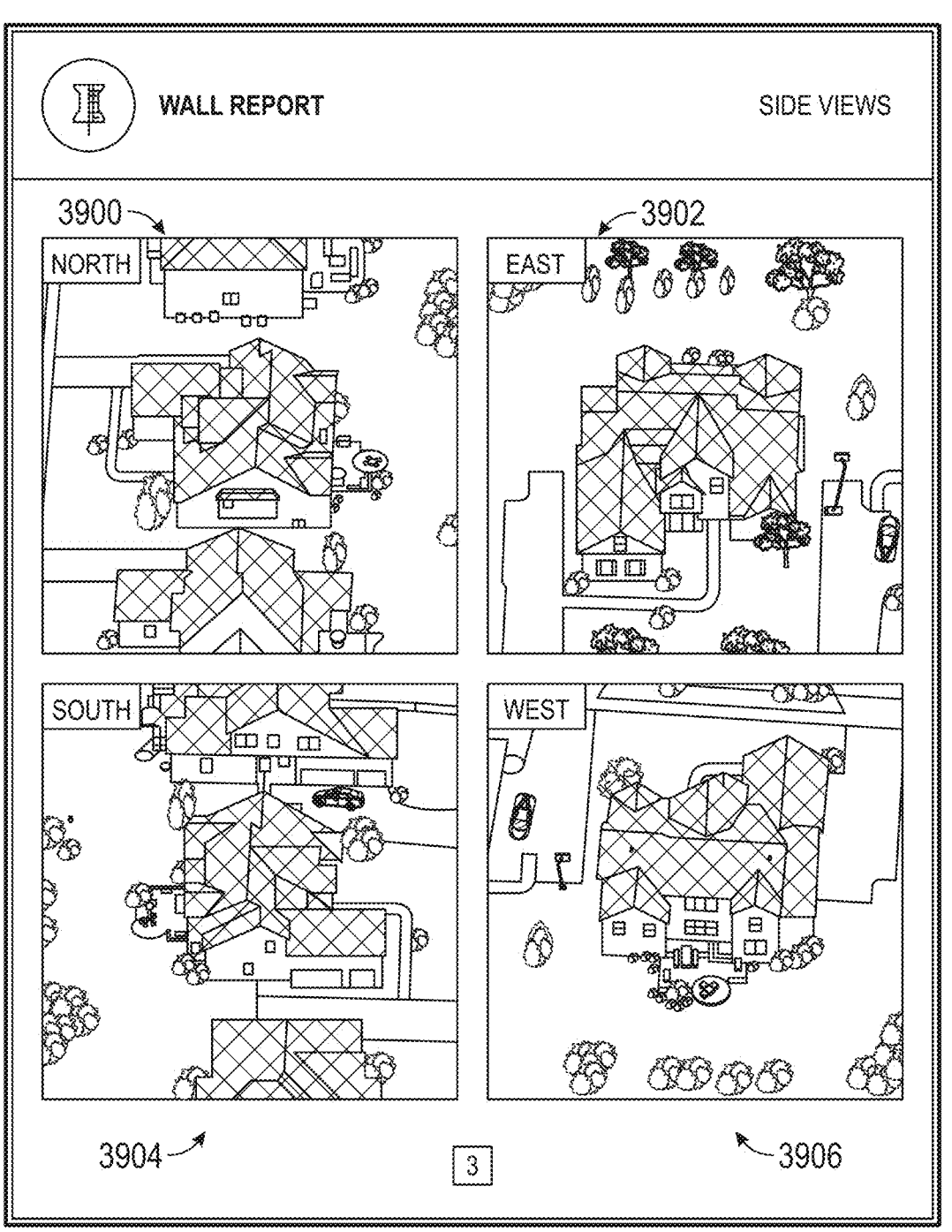
FIG. 39 is a screenshot of a wall report's side views page in an embodiment of the present disclosure.

FIG. 39 is a screenshot of a wall report's side views page in an embodiment of the present disclosure. This is part of the wall report described in FIG. 9. The side views page may include a north image 3900, east image 3902, south image 3904, and west image 3906. These may be oblique aerial images of the structure. Each image may include an identifying label (e.g. "North").

Figure 40:
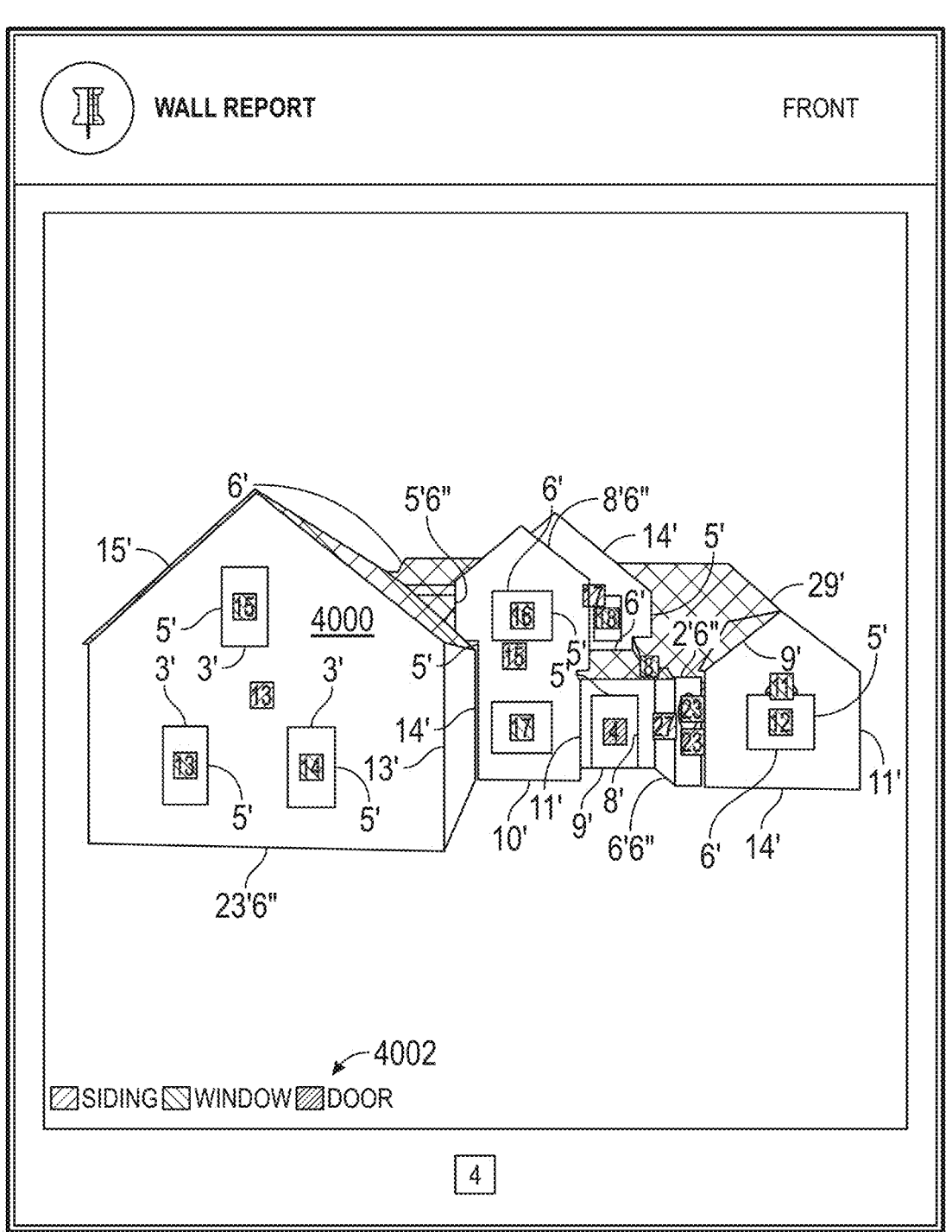
FIG. 40 is a screenshot of a wall report's front page in an embodiment of the present disclosure.

FIG. 40 is a screenshot of a wall report's front view page in an embodiment of the present disclosure. This is part of the wall report described in FIG. 9. The page may include a 3D model 4000. The 3D model 4000 may include wall, window, and/or door labels. The 3D model 4000 may include length and area measurements. Each length may be displayed as a label positioned at, for example, an edge midpoint. Each area may be displayed as a label positioned at a wall, window, or door centroid. The page may include a key 4002 indicating siding, window, and door colors.

Figure 41:
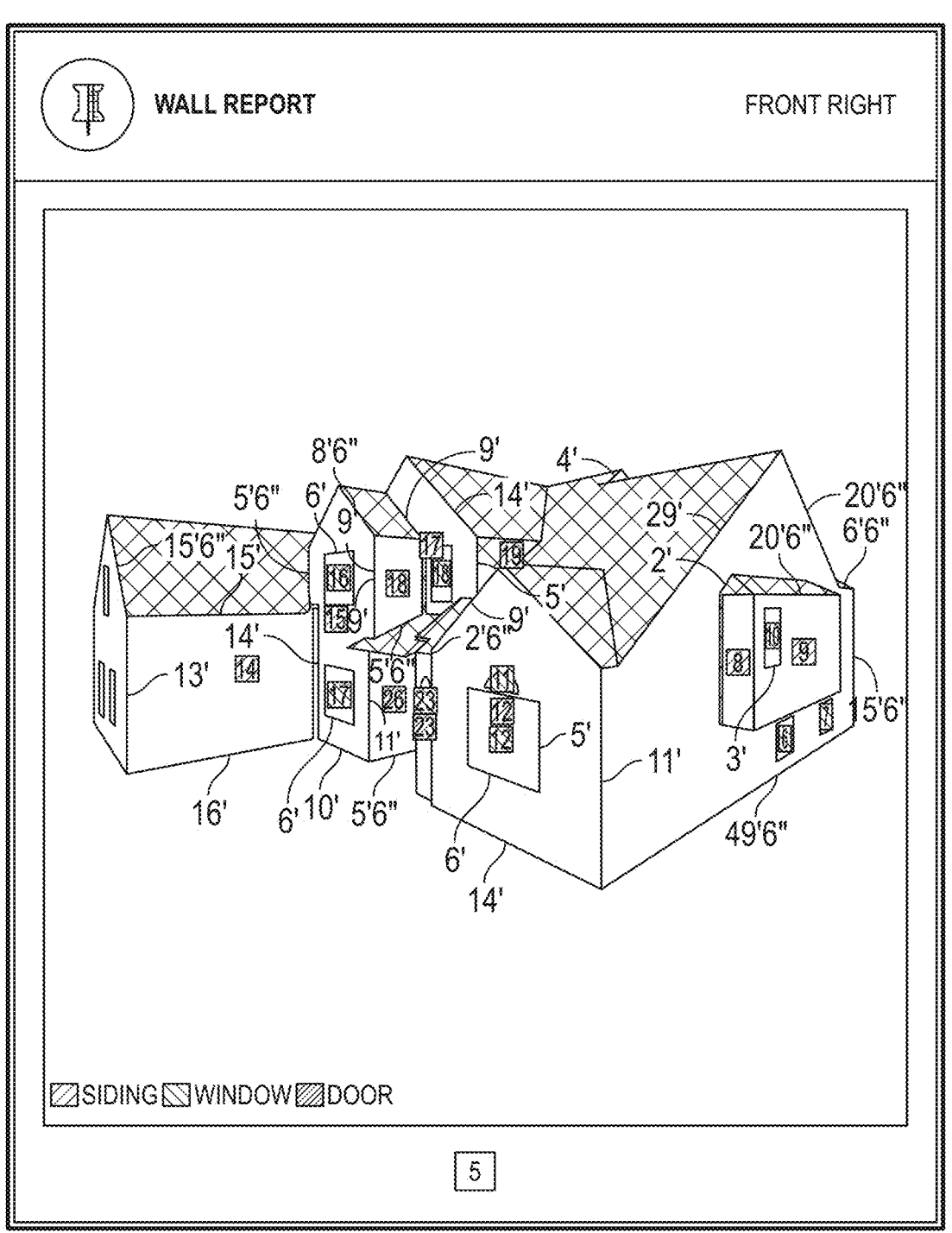
FIG. 41 is a screenshot of a wall report's front right page in an embodiment of the present disclosure.

FIG. 41 is a screenshot of a wall report's front right view page in an embodiment of the present disclosure. This is part of the wall report described in FIG. 9 and may include elements similar to those in the front view page.

Figure 42:
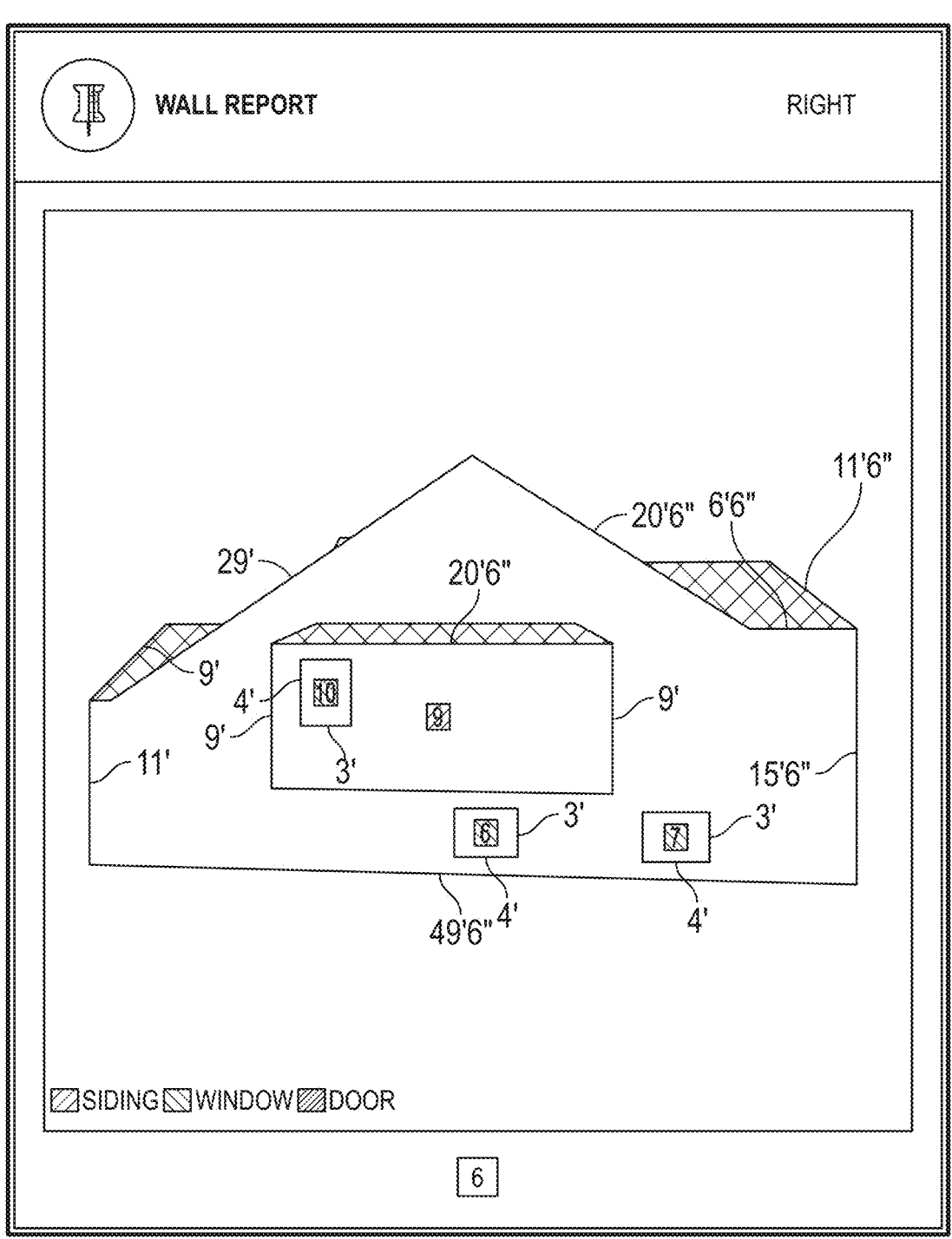
FIG. 42 is a screenshot of a wall report's right page in an embodiment of the present disclosure.

FIG. 42 is a screenshot of a wall report's right view page in an embodiment of the present disclosure. This is part of the wall report described in FIG. 9 and may include elements similar to those in the front view page.

Figure 43:
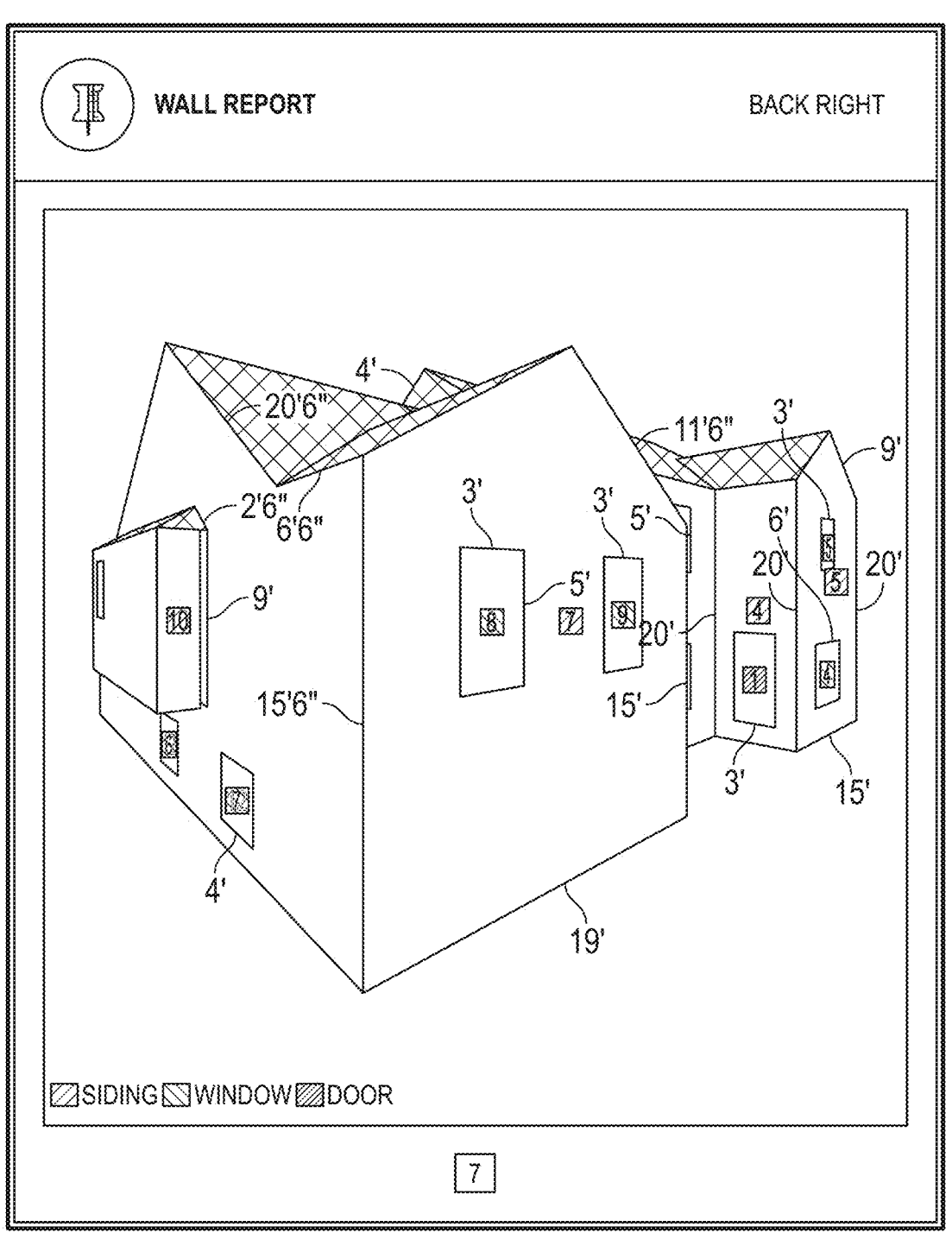
FIG. 43 is a screenshot of a wall report's back right page in an embodiment of the present disclosure.

FIG. 43 is a screenshot of a wall report's back right view page in an embodiment of the present disclosure. This is part of the wall report described in FIG. 9 and may include elements similar to those in the front view page.

Figure 44:
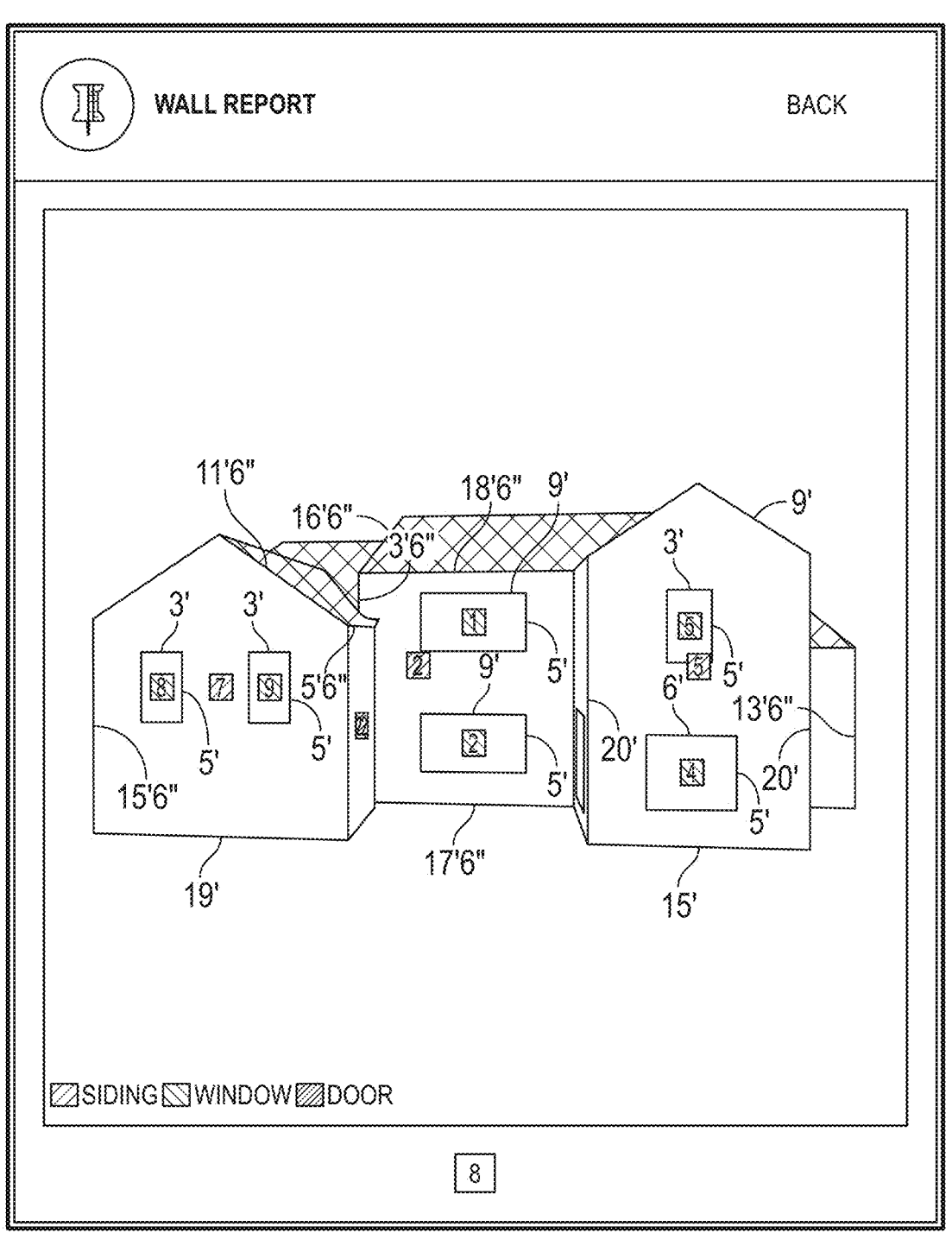
FIG. 44 is a screenshot of a wall report's back page in an embodiment of the present disclosure.

FIG. 44 is a screenshot of a wall report's back view page in an embodiment of the present disclosure. This is part of the wall report described in FIG. 9 and may include elements similar to those in the front view page.

Figure 45:
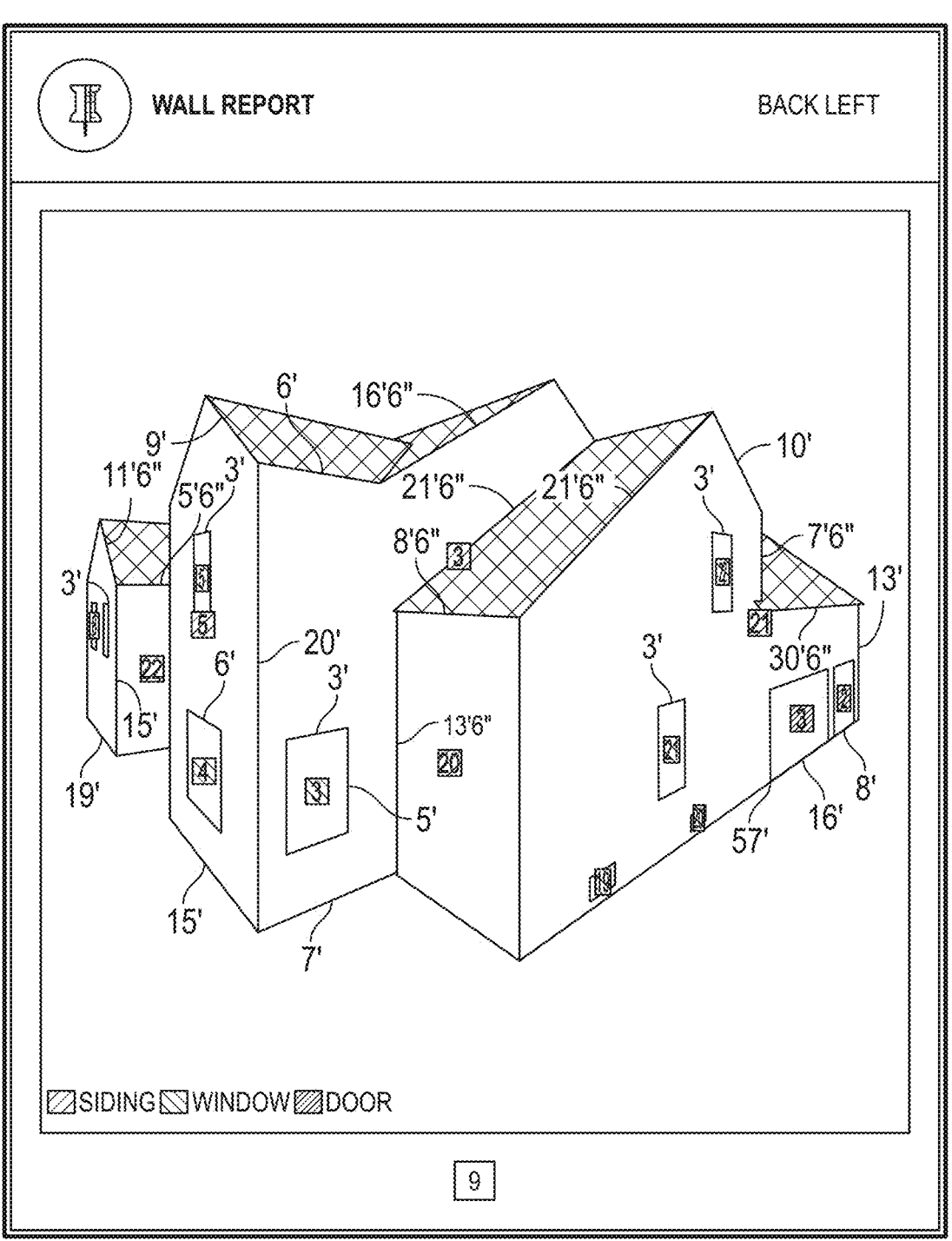
FIG. 45 is a screenshot of a wall report's back left page in an embodiment of the present disclosure.

FIG. 45 is a screenshot of a wall report's back left view page in an embodiment of the present disclosure. This is part of the wall report described in FIG. 9 and may include elements similar to those in the front view page.

Figure 46:
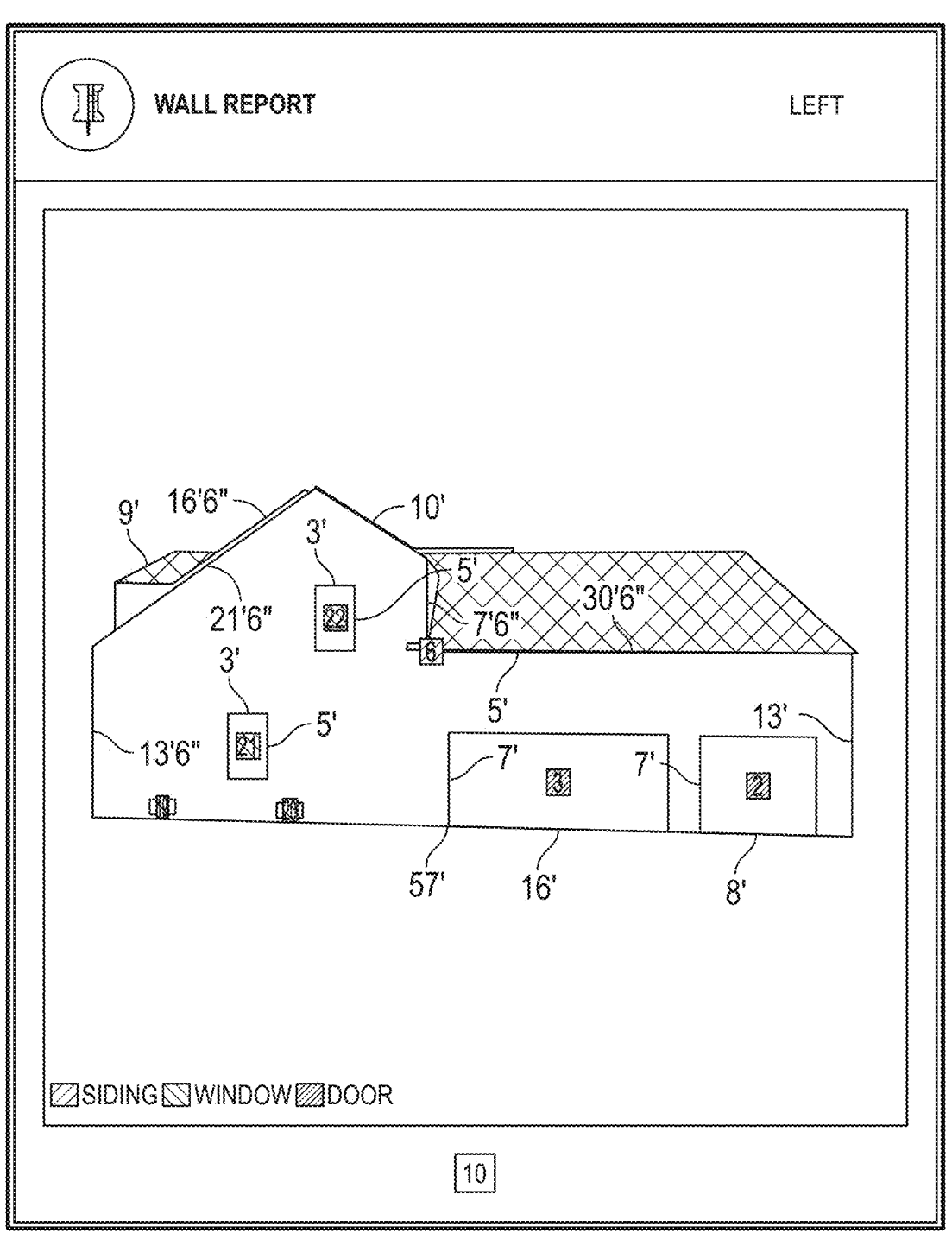
FIG. 46 is a screenshot of a wall report's left page in an embodiment of the present disclosure.

FIG. 46 is a screenshot of a wall report's left view page in an embodiment of the present disclosure. This is part of the wall report described in FIG. 9 and may include elements similar to those in the front view page.

Figure 47:
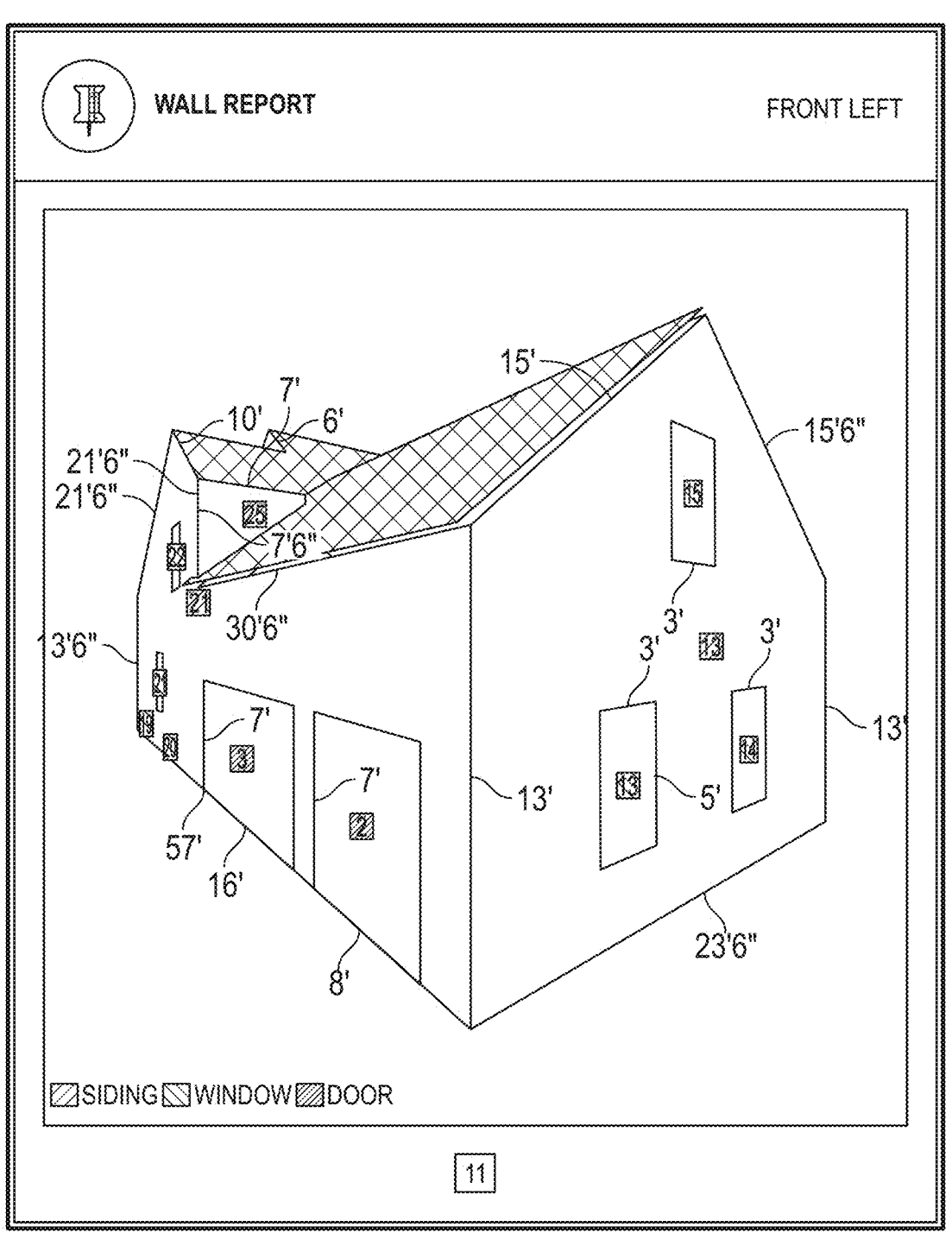
FIG. 47 is a screenshot of a wall report's front left page in an embodiment of the present disclosure.

FIG. 47 is a screenshot of a wall report's front left view page in an embodiment of the present disclosure. This is part of the wall report described in FIG. 9 and may include elements similar to those in the front view page.

FIG. 48 is a screenshot of a wall report's first siding page in an embodiment of the present disclosure. This is part of the wall report described in FIG. 9. The page may include wall numbers and diagrams. The page may also include wall widths, heights, and areas. The page may also include opening count, perimeter, and/or area, as described above. The page may also include totals for wall area, opening count, opening perimeter, and/or opening area, as also described above.

FIG. 49 is a screenshot of a wall report's second siding page in an embodiment of the present disclosure. This is part of the wall report described in FIG. 9 and may include elements similar to those in the first siding page.

Figure 50:
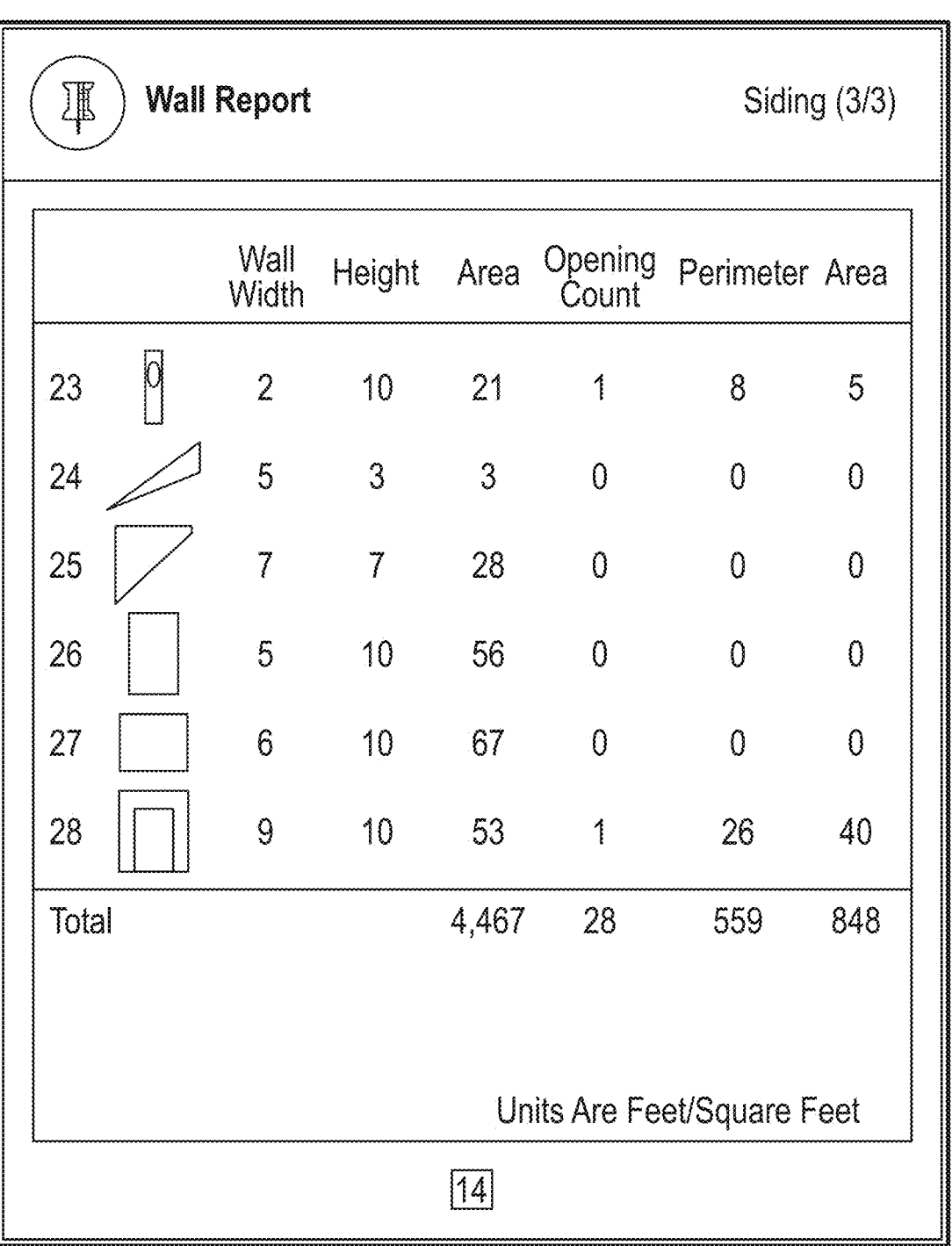
FIG. 50 is a screenshot of a wall report's third siding page in an embodiment of the present disclosure.

FIG. 50 is a screenshot of a wall report's third siding page in an embodiment of the present disclosure. This is part of the wall report described in FIG. 9 and may include elements similar to those in the first siding page.

FIG. 51 is a screenshot of a wall report's first windows page in an embodiment of the present disclosure. This is part of the wall report described in FIG. 9. The page may include window numbers and diagrams. The page may also include window width, height, perimeter, and/or area, as described above. The page may also include totals for window perimeter and/or area, as also described above.

FIG. 52 is a screenshot of a wall report's second windows page in an embodiment of the present disclosure. This is part of the wall report described in FIG. 9 and may include elements similar to those in the first windows page.

Figure 53:
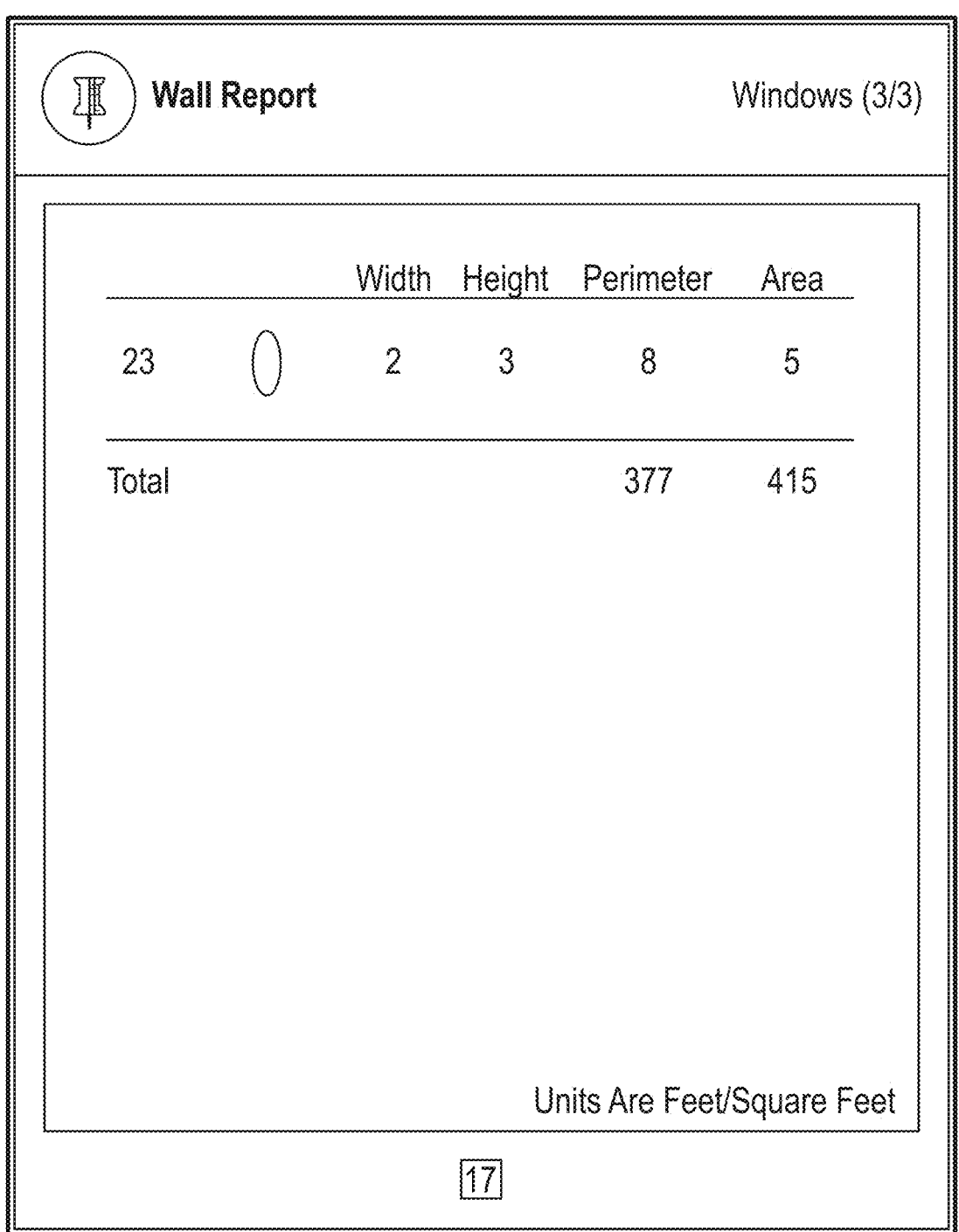
FIG. 53 is a screenshot of a wall report's third windows page in an embodiment of the present disclosure.

FIG. 53 is a screenshot of a wall report's third windows page in an embodiment of the present disclosure. This is part of the wall report described in FIG. 9 and may include elements similar to those in the first windows page.

FIG. 54 is a screenshot of a wall report's doors page in an embodiment of the present disclosure. This is part of the wall report described in FIG. 9. The page may include door numbers and diagrams. The page may also include door width, height, perimeter, and/or area, as described above. The page may also include totals for door perimeter and/or area, as also described above.

FIG. 55 is a screenshot of a wall report's waste page in an embodiment of the present disclosure. This is part of the wall report described in FIG. 9. The page may include waste headings (e.g. 0%, 5%, 10%, 15%, and 20%). The page may also include a siding area based on each waste level. The page may also include the number of siding squares for each waste level (1 square=100 square feet).

FIG. 56 is a screenshot of a wall report's summary page in an embodiment of the present disclosure. This is part of the wall report described in FIG. 9. The page may include the following measurements: wall count, window count, door count, wall area, window area, door area, window perimeter, door perimeter, inside corner count, inside corner length, outside corner count, outside corner length, eaves fascia length, level frieze board length, rakes fascia length, sloped frieze board length, level starter length, sloped trim, and/or vertical trim, as described above.

Figure 57:
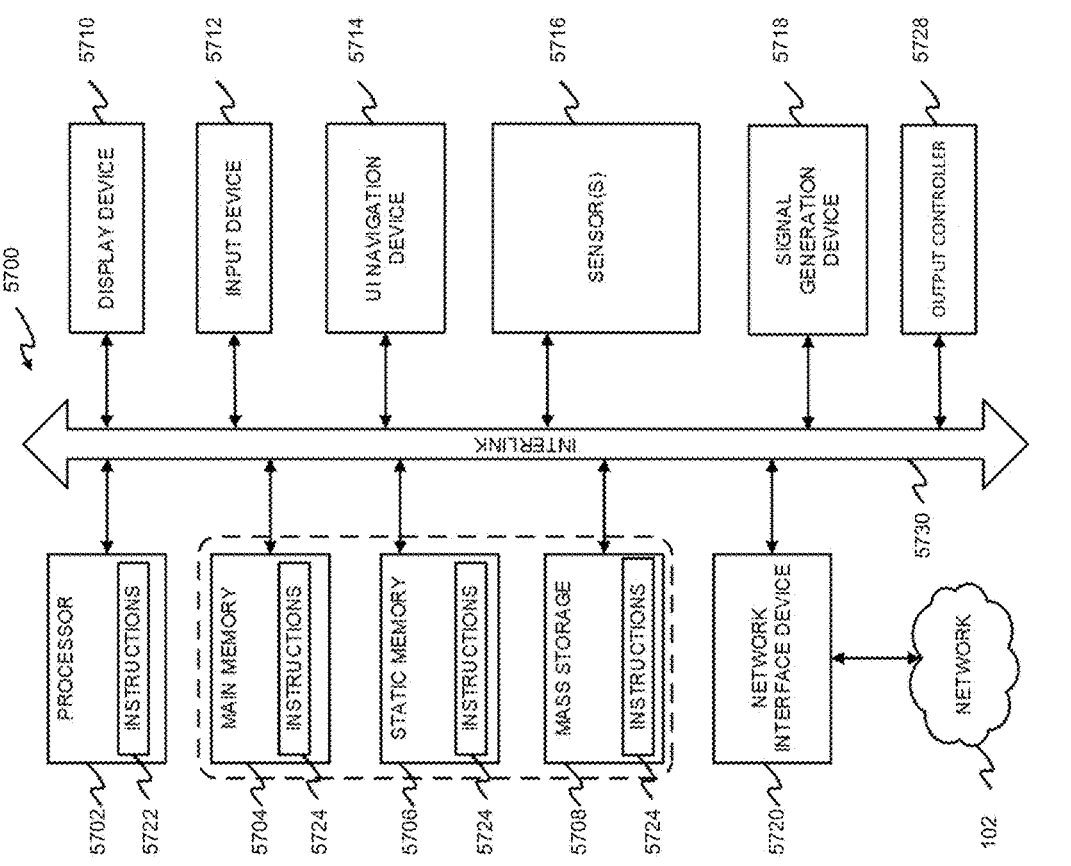
FIG. 57 is a block diagram schematic of various example components of an example machine that can be used as, for example, a client and/or server of the present disclosure.

FIG. 57 illustrates a block diagram schematic of various example components of an example machine 5700 that can be used as, for example, client 100 and/or server 104. Examples, as described herein, can include, or can operate by, logic or a number of components, or mechanisms in machine 5700. Generally, circuitry (e.g. processing circuitry) is a collection of circuits implemented in tangible entities of machine 5700 that include hardware (e.g. simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g. hardwired). In some examples, the hardware of the circuitry can include variably connected physical components (e.g. execution units, transistors, simple circuits, etc.) including a machine readable medium physically modified (e.g. magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g. the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 5700 follow.

In some embodiments, machine 5700 can operate as a standalone device or can be connected (e.g. networked) to other machines. In a networked deployment, machine 5700 can operate in the capacity of a server machine, a client machine, or both in server-client network environments. In some examples, machine 5700 can act as a peer machine in a peer-to-peer (P2P) (or other distributed) network environment. Machine 5700 can be or include a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g. computer system) 5700 can include a hardware processor 5702 (e.g. a central processing unit (CPU), a graphics processing unit (GPU), a hardware processor core, or any combination thereof) and a main memory 5704, a static memory (e.g. memory or storage for firmware, microcode, a basic-input-output (BIOS), unified extensible firmware interface (UEFI), etc.) 5706, and/or mass storage 5708 (e.g. hard drives, tape drives, flash storage, or other block devices) some or all of which can communicate with each other via an interlink (e.g. bus) 5730. Machine 5700 can further include a display device 5710 and an input device 5712 and/or a user interface (UI) navigation device 5714. Example input devices and UI navigation devices include, without limitation, one or more buttons, a keyboard, a touch-sensitive surface, a stylus, a camera, a microphone, etc.). In some examples, one or more of the display device 5710, input device 5712, and UI navigation device 5714 can be a combined unit, such as a touch screen display. Machine 5700 can additionally include a signal generation device 5718 (e.g. a speaker), a network interface device 5720, and one or more sensors 5716, such as a global positioning system (GPS) sensor, compass, accelerometer, or other sensor. Machine 5700 can include an output controller 5728, such as a serial (e.g. universal serial bus (USB), parallel, or other wired or wireless (e.g. infrared (IR), NFC, etc.) connection to communicate or control one or more peripheral devices (e.g. a printer, card reader, etc.).

Processor 5702 can correspond to one or more computer processing devices or resources. For instance, processor 5702 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 5702 can be provided as a microprocessor, Central Processing Unit (CPU), or plurality of microprocessors or CPUs that are configured to execute instructions sets stored in an internal memory 5722 and/or memory 5704, 5706, 5708.

Any of memory 5704, 5706, and 5708 can be used in connection with the execution of application programming or instructions by processor 5702 for performing any of the functionality or methods described herein, and for the temporary or long-term storage of program instructions or instruction sets 5724 and/or other data for performing any of the functionality or methods described herein. Any of memory 5704, 5706, 5708 can comprise a computer readable medium that can be any medium that can contain, store, communicate, or transport data, program code, or instructions 5724 for use by or in connection with machine 5700. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), a solid-state storage device, in general, a compact disc read-only memory (CD-ROM), or other optical or magnetic storage device. As noted above, computer-readable media includes, but is not to be confused with, computer-readable storage medium, which is intended to cover all physical, non-transitory, or similar embodiments of computer-readable media.

Network interface device 5720 includes hardware to facilitate communications with other devices over a communication network, such as network 102, utilizing any one of a number of transfer protocols (e.g. frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g. the Internet), mobile telephone networks (e.g. cellular networks), Plain Old Telephone (POTS) networks, wireless data networks (e.g. IEEE 802.11 family of standards known as Wi-Fi, IEEE 802.16 family of standards known as WiMax), IEEE 802.15.4 family of standards, and peer-to-peer (P2P) networks, among others. In some examples, network interface device 5720 can include an Ethernet port or other physical jack, a Wi-Fi card, a Network Interface Card (NIC), a cellular interface (e.g. antenna, filters, and associated circuitry), or the like. In some examples, network interface device 5720 can include one or more antennas to wirelessly communicate using at least one of single-input multiple-output (SIMO), multiple-input multiple-output (MIMO), or multiple-input single-output (MISO) techniques.

As indicated above, machine 5700 can include one or more interlinks or buses 5730 operable to transmit communications between the various hardware components of the machine. A system bus 5730 can be any of several types of commercially available bus structures or bus architectures.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment, or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various embodiments of the present disclosure have been described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a machine having a particular function, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the disclosure.

Additionally, although flowcharts have been used herein to illustrate methods comprising sequential steps or processes having a particular order of operations, many of the steps or operations in the flowcharts illustrated herein can be performed in parallel or concurrently, and the flowcharts should be read in the context of the various embodiments of the present disclosure. In addition, the order of the method steps or process operations illustrated in any particular flowchart herein may be rearranged for some embodiments. Similarly, a method or process illustrated in any particular flow chart herein could have additional steps or operations not included therein or fewer steps or operations than those shown. Moreover, a method step may correspond to a method, a function, a procedure, a subroutine, a subprogram, etc.

Although specific amounts, distances, percentages, thresholds, or other values are provided as examples herein, other suitable amounts, distances, percentages, thresholds, or other values may be used and are contemplated by the present disclosure.

While often described herein as activating a tool or other feature with a "click" (e.g., a click of a mouse) or pressing a key on a keyboard, it is understood that such tool or feature may be alternatively or additionally activated using any other suitable activation mechanism of a user interface, such as but not limited to, tapping, swiping, pinching, or other touch-screen gesture, pressing a button, double-clicking the tool or feature, etc.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

Additionally, as used herein, the phrases "at least one of [X] and [Y]" and "at least one of [X] or [Y]," where X and Y are different components that may be included in an embodiment of the present disclosure, mean that the embodiment could include component X without component Y, the embodiment could include the component Y without component X, or the embodiment could include both components X and Y. Similarly, when used with respect to three or more components, such as "at least one of [X], [Y], and [Z]" or "at least one of [X], [Y], or [Z]," the phrases mean that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A computer-implemented method for identifying wall features and generating a wall report, the method comprising:

obtaining a 3D mesh of a structure, the 3D mesh generated from 2D imagery of the structure;

overlaying a 3D roof model on the 3D mesh on an electronic display for a user;

receiving input from the user via an electronic interface identifying a ground elevation;

automatically generating a 3D wall model based on the 3D roof model and the ground elevation, wherein automatically generating the 3D wall model comprises:

identifying a disconnected roof facet edge based on the 3D roof model, the disconnected roof facet edge being a facet edge that is not shared by two or more roof facets;

generating a wall top edge aligned with the disconnected roof facet edge;

splitting the wall top edge into a plurality of segments to provide a plurality of wall top positions along the wall top edge; and for each wall top position, providing a corresponding wall bottom position either at a closest roof facet edge below the wall top position or at the ground elevation below the wall top position; and displaying a 3D wall model on the electronic display for the user.

2. The computer-implemented method of claim 1, wherein obtaining the 3D mesh comprises generating the 3D mesh from the 2D imagery.

3. The computer-implemented method of claim 1, wherein displaying the 3D wall model comprises overlaying the 3D wall model on the 3D mesh.

4. The computer-implemented method of claim 1, wherein automatically generating the 3D wall model further comprises generating a first wall side edge connecting a first end of the wall top edge and a first one of the bottom wall positions, and a second wall side edge connecting a second end of the wall top edge and a second one of the bottom wall positions.

5. The computer-implemented method of claim 1, wherein automatically generating the 3D wall model further comprises generating a wall based, at least in part, on the wall top positions and wall bottom positions.

6. The computer-implemented method of claim 5, wherein automatically generating the 3D wall model further comprises generating a wall by connecting at least a portion of the wall top positions and wall bottom positions.

7. The computer-implemented method of claim 1, further comprising receiving input from the user via the electronic interface identifying an opening in at least one wall of the 3D wall model.

8. The computer-implemented method of claim 1, further comprising generating and displaying an electronically viewable wall report based on the 3D wall model and including at least one view of the 3D wall model and an estimate of total wall area of the 3D wall model based, at least in part, on automatically generated wall dimensions of the 3D wall model.

9. A non-transitory computer readable medium comprising executable instructions that, when executed by at least one processor, cause the at least one processor to perform a method comprising:

obtaining a 3D mesh of a structure, the 3D mesh generated from 2D imagery of the structure;

overlaying a 3D roof model on the 3D mesh on an electronic display for a user;

receiving input from the user via an electronic interface identifying a ground elevation;

automatically generating a 3D wall model based on the 3D roof model and the ground elevation, wherein automatically generating the 3D wall model comprises:

identifying a disconnected roof facet edge based on the 3D roof model, the disconnected roof facet edge being a facet edge that is not shared by two or more roof facets;

generating a wall top edge aligned with the disconnected roof facet edge;

splitting the wall top edge into a plurality of segments to provide a plurality of wall top positions along the wall top edge; and for each wall top position, providing a corresponding wall bottom position either at a closest roof facet edge below the wall top position or at the ground elevation below the wall top position; and displaying a 3D wall model on the electronic display for the user.

10. The non-transitory computer readable medium of claim 9, wherein obtaining the 3D mesh comprises generating the 3D mesh from the 2D imagery.

11. The non-transitory computer readable medium of claim 9, wherein displaying the 3D wall model comprises overlaying the 3D wall model on the 3D mesh.

12. The non-transitory computer readable medium of claim 9, wherein automatically generating the 3D wall model further comprises generating a first wall side edge connecting a first end of the wall top edge and a first one of the bottom wall positions, and a second wall side edge connecting a second end of the wall top edge and a second end of the bottom wall positions.

13. The non-transitory computer readable medium of claim 9, wherein automatically generating the 3D wall model further comprises generating a wall based, at least in part, on the wall top positions and wall bottom positions.

14. The non-transitory computer readable medium of claim 13, wherein automatically generating the 3D wall model further comprises generating a wall by connecting at least a portion of the wall top positions and wall bottom positions.

15. The non-transitory computer readable medium of claim 9, further comprising receiving input from the user via the electronic interface identifying an opening in at least one wall of the 3D wall model.

16. The non-transitory computer readable medium of claim 9, further comprising generating and displaying an electronically viewable wall report based on the 3D wall model and including at least one view of the 3D wall model and an estimate of total wall area of the 3D wall model based, at least in part, on automatically generated wall dimensions of the 3D wall model.

\* \* \* \* \*